(12) United States Patent
Foster et al.

(10) Patent No.: US 8,549,993 B2
(45) Date of Patent: *Oct. 8, 2013

(54) COOKING DEVICE WITH SLIDABLE DRAWER

(75) Inventors: Paul Lincoln Foster, Lincoln, RI (US);
Del Moffatt Thornock, Concord, CA (US); Gary Calderwood, Calgary (CA); Shaun Calderwood, Calgary (CA)

(73) Assignee: Spinfry, Inc., New York, NY (US)

(*) Notice: Subject to any disclaimer, the term of this patent is extended or adjusted under 35 U.S.C. 154(b) by 455 days.

This patent is subject to a terminal disclaimer.

(21) Appl. No.: 12/782,875

(22) Filed: May 19, 2010

(65) Prior Publication Data
US 2011/0061545 A1 Mar. 17, 2011

Related U.S. Application Data

(63) Continuation-in-part of application No. 12/193,618, filed on Aug. 18, 2008, now Pat. No. 8,065,954, and a continuation-in-part of application No. PCT/US2009/040451, filed on Apr. 14, 2009.

(60) Provisional application No. 61/044,733, filed on Apr. 14, 2008.

(51) Int. Cl.
*A47J 37/12* (2006.01)

(52) U.S. Cl.
USPC .............................................. 99/409; 99/407

(58) Field of Classification Search
USPC ............ 99/409, 407, 403, 336, 348; 210/167, 210/DIG. 8, 167.28
See application file for complete search history.

(56) References Cited

U.S. PATENT DOCUMENTS

| 241,631 A | 5/1881 | Duffy |
| 1,316,827 A | 9/1919 | Brunner |
| 1,630,787 A | 5/1927 | Cullen |

(Continued)

FOREIGN PATENT DOCUMENTS

| DE | 102005052301 | 5/2007 |
| EP | 1205591 | 5/2002 |

(Continued)

OTHER PUBLICATIONS

Examination Report dated May 26, 2011 for European Patent Application No. 09733043.5.

(Continued)

*Primary Examiner* — Reginald L Alexander
(74) *Attorney, Agent, or Firm* — Snell & Wilmer L.L.P.

(57) ABSTRACT

A food cooking device generally comprises two sections: a cooking section and a liquid removal section. The cooking section houses and/or heats liquid for cooking the food, and the liquid removal section is operable to reduce the liquid content of the food. The cooking device may further comprise a centrifugal liquid removal device locatable within the liquid removal section. The cooking device comprises a slidable drawer for moving the centrifugal liquid removal device into and out of a housing. A frame is disposed within the slidable drawer, and the frame houses the centrifugal liquid removal device. A translational motor moves the food from the cooking section to the liquid removal section when the slidable drawer positions the centrifugal liquid device in the housing. The cooking device further comprises a hinged door that is in a closed position when the centrifugal liquid removal device is in the housing.

12 Claims, 88 Drawing Sheets

(56) References Cited

U.S. PATENT DOCUMENTS

| | | | |
|---|---|---|---|
| 1,759,921 A | 5/1930 | Tarpley | |
| 2,186,345 A | 1/1940 | Reidenbach | |
| 2,568,792 A | 9/1951 | Cripps | |
| 2,628,762 A | 2/1953 | Spalding | |
| 2,674,938 A | 4/1954 | Tagliaferri et al. | |
| 2,858,762 A | 11/1958 | Wade | |
| 3,078,786 A | 2/1963 | Arvan | |
| 3,078,988 A | 2/1963 | Dunning | |
| 3,200,737 A | 8/1965 | Ferenc | |
| 3,279,353 A | 10/1966 | Shelor | |
| 3,357,685 A | 12/1967 | Stephens | |
| 3,380,375 A | 4/1968 | Benson et al. | |
| 3,512,473 A | 5/1970 | Moore et al. | |
| 3,525,299 A | 8/1970 | Gouwens et al. | |
| 3,614,924 A | 10/1971 | Hicket | |
| 3,690,246 A | 9/1972 | Guthrie, Sr. | |
| 3,827,344 A | 8/1974 | Pratolongo | |
| 3,827,985 A | 8/1974 | De Haan | |
| 3,908,531 A | 9/1975 | Morley | |
| 4,187,770 A | 2/1980 | Coffield | |
| 4,196,660 A | 4/1980 | Steinberg | |
| 4,204,464 A | 5/1980 | Strobel | |
| 4,215,629 A | 8/1980 | Janssen | |
| 4,250,803 A | 2/1981 | Wohlfart | |
| 4,294,166 A | 10/1981 | Takeuchi | |
| 4,372,980 A | 2/1983 | Luebke et al. | |
| 4,426,794 A | 1/1984 | Vanderheijden | |
| 4,489,647 A * | 12/1984 | Stamps et al. | 99/336 |
| 4,508,026 A | 4/1985 | Anetsberger et al. | |
| 4,719,850 A | 1/1988 | Sowell | |
| 4,722,267 A | 2/1988 | Galockin et al. | |
| 4,873,920 A | 10/1989 | Yang | |
| 5,010,805 A | 4/1991 | Ferrara | |
| 5,018,438 A * | 5/1991 | Grandi | 99/335 |
| 5,027,697 A | 7/1991 | De Longhi | |
| 5,142,968 A | 9/1991 | Caron et al. | |
| 5,165,330 A | 11/1992 | Glacomini | |
| 5,168,797 A | 12/1992 | Wang | |
| 5,182,982 A | 2/1993 | Hattori et al. | |
| 5,185,168 A * | 2/1993 | Takahashi | 426/233 |
| 5,223,137 A | 6/1993 | Hattori et al. | |
| 5,236,135 A | 8/1993 | Wilson | |
| 5,301,604 A * | 4/1994 | Takahashi | 99/407 |
| 5,351,605 A | 10/1994 | Sai et al. | |
| 5,379,684 A | 1/1995 | Ettridge | |
| 5,403,260 A | 4/1995 | Hensley | |
| 5,469,778 A | 11/1995 | Prudhomme | |
| 5,490,453 A | 2/1996 | Mackay | |
| 5,495,795 A | 3/1996 | Harrison et al. | |
| 5,543,166 A | 8/1996 | Masel | |
| 5,586,486 A | 12/1996 | Nitschke et al. | |
| 5,586,487 A | 12/1996 | Marino | |
| 5,611,265 A | 3/1997 | Ronci | |
| 5,650,187 A | 7/1997 | Franklin | |
| 5,771,781 A | 6/1998 | Sham | |
| 5,937,741 A | 8/1999 | Manger | |
| 5,988,051 A | 11/1999 | Hashiguchi et al. | |
| 5,993,872 A | 11/1999 | Rolle et al. | |
| 6,062,132 A | 5/2000 | Morris | |
| 6,196,115 B1 | 3/2001 | Tsao | |
| 6,322,831 B1 | 11/2001 | Mote et al. | |
| RE37,706 E | 5/2002 | Chung | |
| D462,567 S | 9/2002 | Smith | |
| 6,705,209 B2 | 3/2004 | Yang et al. | |
| 6,732,552 B2 | 5/2004 | Kim et al. | |
| 6,772,677 B2 | 8/2004 | Marotel et al. | |
| 6,834,577 B2 | 12/2004 | Xu | |
| 7,018,326 B2 | 3/2006 | Koch et al. | |
| 7,387,602 B1 | 6/2008 | Kirsch | |
| 7,681,655 B2 | 3/2010 | Biehl | |
| 2002/0088350 A1 | 7/2002 | Backus et al. | |
| 2003/0192435 A1 | 10/2003 | McNair | |
| 2003/0207009 A1 | 11/2003 | Sus et al. | |
| 2004/0007137 A1 | 1/2004 | Hwang | |
| 2004/0031396 A1 | 2/2004 | Van Der Doe | |
| 2004/0055474 A1 | 3/2004 | Lekic et al. | |
| 2004/0060456 A1 | 4/2004 | Chung | |
| 2005/0011370 A1 | 1/2005 | Xu et al. | |
| 2005/0238770 A1 | 10/2005 | Van Der Doe | |
| 2006/0016350 A1 | 1/2006 | Yoshidome | |
| 2006/0207438 A1 | 9/2006 | Currie | |
| 2007/0163450 A1 | 7/2007 | Zaghloul | |
| 2008/0314261 A1 | 12/2008 | Hensel | |
| 2009/0044706 A1 | 2/2009 | Foster | |
| 2009/0304878 A1 | 12/2009 | Loehn et al. | |
| 2010/0037782 A1 | 2/2010 | Foster et al. | |

FOREIGN PATENT DOCUMENTS

| | | |
|---|---|---|
| EP | 1248046 | 10/2002 |
| FR | 2846218 | 4/2004 |
| GB | 1282713 | 7/1972 |
| GB | 1337547 | 11/1973 |
| GB | 2295768 | 6/1996 |
| WO | WO9423625 | 10/1994 |
| WO | WO9617541 | 6/1996 |
| WO | 9619934 | 7/1996 |
| WO | WO9725910 | 7/1997 |
| WO | 9739670 | 10/1997 |
| WO | WO0191580 | 12/2001 |
| WO | 2008103056 | 8/2008 |
| WO | WO2008/103056 | 8/2008 |

OTHER PUBLICATIONS

Examination Report dated Dec. 15, 2011 for European Patent Application No. 09733043.5.
Office Action dated Dec. 19, 2011 in Canadian Application No. 2,681,981.
Non-final Office Action dated Apr. 14, 2011 for U.S. Appl. No. 12/193,618.
Invitation to Pay Additional Fees and Partial Search Report for PCT/US2010/033692.
ISR and WO for PCT/US2007/008222 dated Feb. 6, 2008.
Motion Technology, Inc., Specifications of Ventless Electric Fryer Model MTI-10, 1 Page.
Moriera, Rosana G.; Castell-Perez, M. Elena; Barrufet, Maria A., Oil Absorption in Porous Food During Cooling, Deep Fat Frying, Jun. 1, 1999, pp. 202-221, Luwer Academic Pub.
ISR and WO for PCT/US2009/040451 dated Sep. 28, 2009.
Office Action dated Jul. 22, 2009 for U.S. Appl. No. 11/693,143.
IPRP for PCT/US2007/008222 dated Oct. 8, 2009.
Final Office Action dated Dec. 24, 2009 for U.S. Appl. No. 11/693,143.
Advisory Action dated Feb. 3, 2010 for U.S. Appl. No. 11/693,143.
Examiner's Answer to Appeal Brief, dated Jun. 23, 2010 for U.S. Appl. No. 11/693,143.
Final Office Action dated May 24, 2012 in U.S. Appl. No. 12/193,615.
Office Action dated Jun. 4, 2012 in U.S. Appl. No. 12/623,868.
Notice of Allowance dated Jul. 25, 2012 in U.S. Appl. No. 12/193,615.
Notice of Grant of European Application No. 09733043.5 dated Jul. 13, 2012.
Office Action dated Aug. 24, 2012 in U.S. Appl. No. 12/691,064.
International Search Report and Written Opinion dated Aug. 31, 2012 in Application No. PCT/US2012/25565.
Office Action dated Sep. 24, 2012 in U.S. Appl. No. 13/280,177.
Examination Report dated Jul. 18, 2011 for European Patent Application No. 07754706.5.
Notice of Allowance for U.S. Appl. No. 12/193,618 dated Sep. 21, 2011.
IPRP dated Oct. 28, 2010 for International Application No. PCT/US2009/040451.
International Preliminary Report on Patentability for PCT/US2010/033692 dated Nov. 17, 2011.
Non-Final Office Action for U.S. Appl. No. 12/193,615 dated Nov. 21, 2011.
Extended Search Report dated Sep. 17, 2012 in European Application No. 11009714.4.

(56) References Cited

OTHER PUBLICATIONS

Office Action dated Oct. 5, 2012 in Canadian Application No. 2,681,981.
Examination Report dated Nov. 13, 2012 in EP Application No. 07754706.5.
Notice of Allowance dated Nov. 23, 2012 in U.S. Appl. No. 12/691,064.
Office Action Restriction dated Dec. 5, 2012 in U.S. Appl. No. 13/030,792.
Office Action dated Jan. 16, 2013 in U.S. Appl. No. 13/030,792.
Final Office Action dated Feb. 25, 2013 in U.S. Appl. No. 12/623,868.
Morice Equipment, English Abstract of FR2846218, dated Apr. 30, 2004, 1 page.
Dartenne Reiner, English Abstract of DE102005052301, dated May 3, 2007, 1 pages.

\* cited by examiner

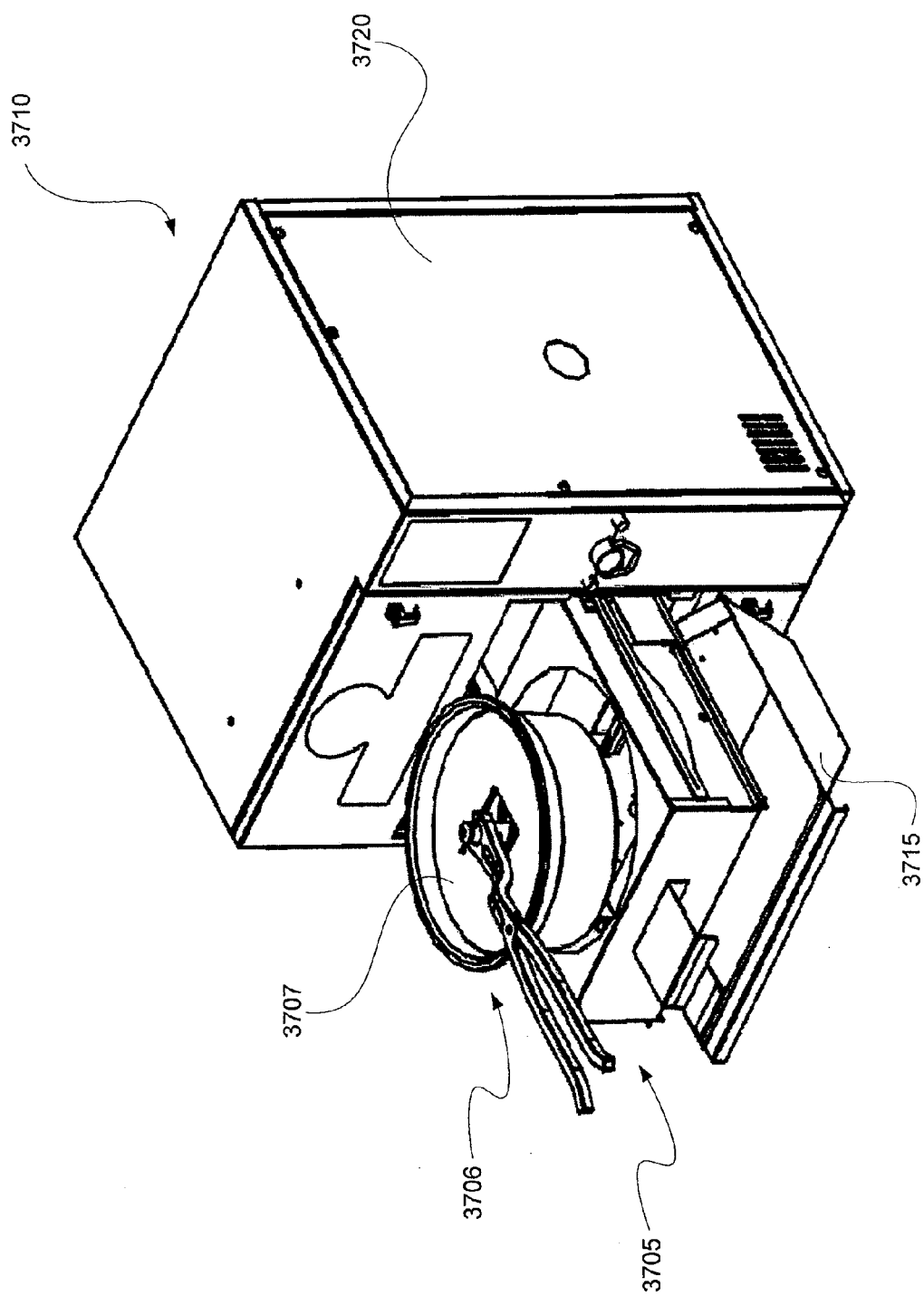

COOKING DEVICE WITH SLIDABLE DRAWER

CROSS REFERENCE TO RELATED APPLICATIONS

This application is a continuation-in-part of U.S. Ser. No. 12/193,618, filed on Aug. 18, 2008, which is a non-provisional of U.S. Ser. No. 61/044,733, filed on Apr. 14, 2008. This application is also a continuation-in-part of PCT/US09/40451, filed on Apr. 14, 2009. All of the above are incorporated herein by reference.

FIELD OF THE INVENTION

The present invention relates to a cooking device. More specifically, the present invention relates to a cooking device with a slidable drawer that is capable of at least partially removing a liquid from a cooked food.

BACKGROUND OF THE INVENTION

A popular method of cooking many food items is to fry or deep fry them. A brief list of foods that may be deep fried include french fries, potato chips, chicken, pork, beef, candy bars, ice cream, etc. Many other types of food are amenable to deep frying. Deep frying generally involves immersing the food item in a high-temperature, fat-based solution, such as cooking oil (e.g., canola oil, peanut oil, vegetable oil, olive oil, liquefied shortening etc.) until the food is cooked. These and other foods may be cooked in other cooking liquids. For example, water may be used to steam, blanch, and boil certain foods While fried foods have a certain appeal due to the particular taste and texture imparted to foods that are deep fried, such fried foods have some undesirable characteristics. For example, immersing foods in cooking oil results in additional fat being introduced into the food, and this fat is not generally beneficial to the person consuming the food. Furthermore, conventional deep frying methods generally do not attempt to remove this added fat. The added fat that is consumed with fried foods raises health concerns because a high level of fat in one's diet is generally not recommended for good health and nutrition. High quantities of saturated and trans fats such as those found in fried foods have been linked to adverse medical conditions. When cooking other foods in a liquid, such as cooking pasta in water, it may also be desirable to remove excess cooking liquid from the cooked food prior to serving or consuming the cooked food.

Thus, some attempts have been made to remove fat from fried foods or other cooking liquids from cooked foods prior to serving the foods. These attempts, however, require some intervening process between the time the food is removed from the high-temperature oil and the time when the food is served to a consumer. The longer the time between removal from the oil and service to the consumer, the cooler the fried food becomes. As the fried food cools, the freshness and desirability of the fried food decreases at least in part to the change in texture of the fried food because of oil absorption. For example, when french fries begin to cool after being removed from the cooking oil, the outside of the french fries cools more rapidly than the inside. This difference in cooling rates between the outside and inside results in the oil soaking in and collecting in the center of the french fries, which results in soggy french fries containing excess oil. Studies of fried foods have shown that as much as eighty percent of the oil absorbed by the fried food is absorbed during this cooling process.

The prior art has attempted to introduce various means of removing oil from newly fried foods. However, there continues to be a need for removing oil from fried foods in a device that is suitable for commercial and/or home use, for example, using a drawer.

SUMMARY OF THE INVENTION

As set forth in the detailed description, in accordance with various embodiments of the present invention, systems, methods and devices for cooking food and removing liquid content therefrom are disclosed. The food cooking device generally comprises two sections: a cooking section and a liquid removal section; other embodiments, however, may provide the liquid removal section without providing the cooking section. The cooking section houses and/or heats liquid for cooking the food, and the liquid removal section is operable to reduce the liquid content of the food. The cooking device may further comprise a centrifugal liquid removal device locatable within the liquid removal section and a mechanism configured to move the food from the cooking section to the liquid removal section. Various aspects of the cooking device are subject to being automated.

In an embodiment, the cooking device comprises a slidable drawer for moving the centrifugal liquid removal device into and out of a housing. A frame is disposed within the slidable drawer, and the frame houses the centrifugal liquid removal device. A translational motor may move the food from the cooking section to the liquid removal section when the slidable drawer positions the centrifugal liquid device in the housing. A drawer motor may be utilized to automatically move the slidable drawer into and out of the housing The cooking device further comprises a hinged door that is in a closed position when the centrifugal liquid removal device is in the housing. Also, the hinged door is in an open position when the centrifugal liquid removal device is out of the housing. The hinged door may facilitate moving the slidable drawer into and out of the housing.

In an embodiment, a spin motor is coupled to a drive shaft in the centrifugal liquid removal device to facilitate spinning the centrifugal liquid removal device. A spin motor gear may be coupled to the spin motor for spinning the drive shaft via a drive shaft key. In an embodiment, the drive shaft key couples to the spin motor gear via electromagnetic coupling. The drive shaft may be configured to facilitate removal of the centrifugal liquid removal device using a basket removal tool.

BRIEF DESCRIPTION OF THE DRAWINGS

The subject matter of the invention is particularly pointed out and distinctly claimed in the concluding portion of the specification. The invention, however, both as to structure and method of operation, may best be understood by reference to the following description taken in conjunction with the claims and the accompanying drawing figures, in which like parts may be referred to by like numerals.

FIG. 37C illustrates a perspective view of a cooking device with a slidable drawer according to a further embodiment of the present invention.

DETAILED DESCRIPTION

Figure 1:
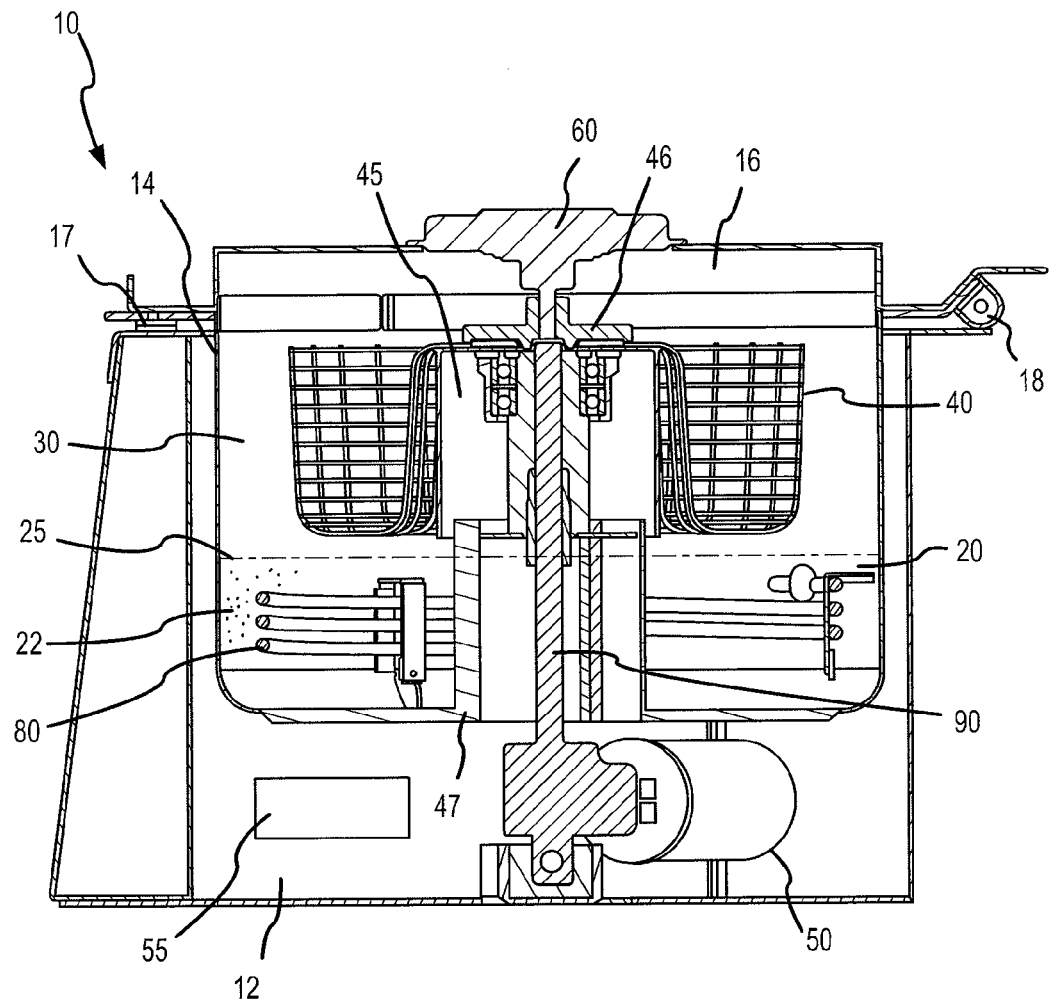
FIG. 1 illustrates a cross-section of a cooking device according to an embodiment of the present invention.

The detailed description herein makes use of various embodiments to assist in disclosing the present invention. While these embodiments are described in sufficient detail to enable those skilled in the art to practice the invention, it should be understood that other embodiments may be realized and that modifications of structures, arrangements, applications, proportions, elements, materials, or components used in the practice of the instant invention, in addition to those not specifically recited, can be varied or otherwise particularly adapted to specific environments, manufacturing specifications, design parameters or other operating requirements without departing from the scope of the present invention and are intended to be included in this disclosure. Thus, the detailed description herein is presented for purposes of illustration only and not of limitation.

In accordance with various embodiments of the present invention, systems, methods and apparatuses for cooking food and removing liquid content therefrom are disclosed. The food cooking apparatus generally comprises two sections: a cooking section and a liquid removal section; other embodiments, however, may provide the liquid removal section without providing the cooking section. The cooking section houses and/or heats liquid for cooking the food, and the liquid removal section is operable to reduce the liquid content of the food. A basket located within the apparatus may be moved between the two sections. Such movement may be accomplished manually or automatically, for example, by a motor and/or controller.

According to a further embodiment of the invention, the cooking device provides a method for frying foods which comprises removing excess and/or unwanted fat, grease, oil, and the like, and simultaneously maintaining a desirable temperature within the food that is being cooked. The terms "cooking" and "frying" and formatives thereof are used interchangeably herein. Other mechanisms for cooking food besides frying fall within the scope of the present invention, such as boiling, blanching, steaming, poaching, simmering, steeping, and the like. For consistency, "frying" and/or "cooking" will be used throughout without limiting the methods of cooking for use in conjunction with embodiments of the present invention. Similarly, while "cooking device" may be used in this specification, it should be understood that any device capable of cooking and/or removing a liquid from a cooked food, such as a fryer device, is contemplated within the scope of the invention.

Additionally, in certain embodiments of the invention, water may be used in place of cooking oil in order to boil, poach, blanch, steam, or otherwise cook certain foods, such as pasta and vegetables. The foods are housed within the basket and cooked in heated water (or exposed to steam) from the water section, where the water section takes the place of the oil section. After cooking in the water, the basket is moved to the spinning section where excess water is removed so that the food does not get soggy from the excess water. Spinning and/or agitating the food also aids in preventing the food from sticking to itself. In other embodiments, water may be introduced to the cooking device during the spinning process in order to rinse starches and other products of the boiling process from the boiled food. In other embodiments, mixtures may be used, such as a water and oil mix (such as garlic oil, olive oil, butter or the like). Such foods that may be cooked by this process comprise pasta products and vegetables.

In accordance with an embodiment of the present invention, a cooking device comprises an oil section where a food item is fried, and a spinning section where excess oil, grease, fat and the like are removed from the food while, at the same time, providing some degree of convection type cooking. The food is housed within a basket, and the basket is selectively movable between the oil section and the spinning section. A mechanism is employed that allows allowing movement of the basket between the oil section and the spinning section. At least one motor is employed to control operation of the cooking device. For example, in certain embodiments, one motor controls the movement of the basket between sections, and another motor controls the spinning of the basket. In various embodiments, the cooking device has a lid which is closed during the frying and spinning processes. In further embodiments, the cooking device comprises a drawer, and in still further embodiments, the cooking device does not comprise a cover and/or a drawer. In other embodiments, the cooking device comprises a filtering system for removing unwanted particles and debris from the cooking oil. In some embodiments of the invention, the cooking device further comprises various mechanisms for automating the processes involved with the cooking device. In yet other embodiments of the invention, a controller is provided which controls the operation of the various motors and processes to allow for substantially complete automation of the cooking device. In some embodiments, a solid shield or wall is employed around the basket well so as to detain and return oil and fat removed during the spin and/or oil removal cycles and then direct the return of that oil or fat to the frying vessel below.

As noted above, foods that are fried tend to have excess oil at the surface as well as throughout the fried food. As the fried food cools, the outside of the food tends to cool first. The warmer inside temperature of the food draws the excess oil on the surface of the fried food to the inside of the food, resulting in an undesirable texture and taste of the fried food as well as limiting the shelf life of the food. This cooling process increases the amount of oil within the fried food, contrary to many health trends. Various embodiments of the present invention provide a mechanism for reducing this unwanted cooling during the excess oil removal process, leaving the excess oil at the surface of the fried food to be removed before it is drawn towards the center of the fried food, thereby resulting in a fried food that is healthier and more desirable than fried food produced by current methods.

According to various embodiments of the present invention, the cooking device is available in numerous sizes and/or capacities. For example, the cooking device is available in commercial sizes for use by restaurants and other food-frying establishments that must produce hundreds of pounds of fried food every day. Commercial cooking devices also range in size depending on the desired capacity for the commercial fryer. Other embodiments of the invention provide a cooking device that is amenable to use in a user's home. For example, the cooking device for personal use may produce as little as one serving of fried food. Such a personal cooking device may be configured to sit on a countertop in a personal residence. All sizes and capacities of the cooking device are contemplated within the scope of the present invention.

With reference to FIG. 1, an embodiment of the cooking device is now described. Cooking device 10 comprises a device housing 12 and a top cover 16. Top cover 16 comprises a spin motor 60. Device housing 12 comprises a frying vessel 14, a linear motor 50, and a controller 55. Frying vessel 14 comprises an oil section 20, a spinning section 30, a heating element 80, and a basket 40. A guide shaft 90 is configured to operate in conjunction with linear motor 50 and basket 40 to facilitate movement of basket 40 between oil section 20 and spinning section 30. In other embodiments, with momentary reference to FIGS. 6A-6C, frying vessel 14 may comprise a plurality of guide shafts 691, and other motors, gears, and mechanisms configured to facilitate movement of basket 40 (not shown in FIGS. 6A-6C) as discussed further below.

With reference again to FIG. 1, according to various embodiments of the invention, device housing 12 houses the components of cooking device 10 and protects the environment within cooking device 10 to enable the frying of the food within cooking device 10, and to protect a user from the high temperatures within cooking device 10. In some embodiments, device housing 12 comprises a thermal insulation material to maintain the outside of cooking device 10 at a reasonable and safe operating temperature.

In accordance with further embodiments of the invention, oil section 20 is located within device housing 12 and is configured to receive basket 40 in order to fry the food contained in basket 40. Oil section 20 is further configured to heat any type of oil that is capable of frying food in a manner that renders the food edible. Such oil may be cooking oil, vegetable oil, corn oil, peanut oil, canola oil, olive oil, and the like. Examples of food that may be cooked in cooking oil 22 are potatoes, chicken, pork, beef, candy bars, ice cream, etc. As noted above, the cooking device may be configured to cook a variety of foods in different cooking liquids. For example, water may be used to steam, blanch, poach, boil, and the like, various foods such as pasta and vegetables.

An exemplary basket 40 may be adaptable to receive any type of food that may be cooked in oil section 20, and in various embodiments, different types, shapes, sizes, and/or configurations of baskets are available to cook different types of food in a manner configured to be suitable for serving and/or consumption. An oil level 25 is maintained in oil section 20 in order to allow for the sufficient immersion of basket 40 and/or the food to be cooked within cooking oil 22.

According to other embodiments of the invention, a mechanism for heating cooking oil 22 is provided. In embodiments, an immersion coil, such as heating element 80 is in thermal contact with cooking oil 22 and is operable to heat cooking oil 22. In some embodiments, heating element 80 is also in physical contact with cooking oil 22, for example, heating element 80 may be located within oil section 20. In other embodiments of the invention, a thermally conductive material may be present between heating element 80 and cooking oil 22. For example, heating element 22 may be located outside of, but in thermal contact with frying vessel 14 which may have thermally conductive walls, or may have a partially thermally conductive wall proximate heating element 22. In yet other embodiments, where heating element 80 is located within oil section 20, frying vessel 14 may be thermally insulated in order to aid in maintaining the outside of cooking device 10 at a safe operating temperature. The heating element is operable to be driven by electricity, gas, solar power, and the like. The heating element may be removably or permanently secured within cooking device 10.

Although a heating element has been discussed, it should be understood that any method of heating the cooking liquid is contemplated within the scope of the present disclosure. For example, the cooking liquid and/or the vessel in which the cooking liquid is contained may be exposed to a gas flame that is configured to heat the cooking liquid. In other embodiments, tubes running through the cooking liquid may be heated by means other than electricity. For example, the tubes may carry a heated liquid that is configured to heat the cooking liquid.

In other embodiments, heating element 80 is located within spinning section 80 and/or is located both within the spinning and oil sections. In still other embodiments, two heating elements may be used. For example, one heating element may be used to heat the oil in the oil section, and a second heating element may be used to aid in maintaining a desirable temperature in the spinning section. Employing a second heating element for heating the spinning section aids in increasing the amount of oil removed from the fried food. The higher the temperature during spinning, the less viscous the oil will be, so it is easier to spin the oil off. And the higher the temperature, the less oil that has been drawn to the center of the fried food. Thus, where spinning occurs at higher temperatures, more oil is available to be spun off the fried food because of the viscosity of the oil and because the food, in a heated state, is more able to shed the oil in and on it.

In accordance with another embodiment of the invention, spinning section 30 is operable to remove excess oil from the surface of the fried food at an elevated temperature. In such an embodiment, basket 40 may be a food spinner wherein the fried food is spun to remove the excess oil. In other embodiments, basket 40 is a centrifugal oil removal device, because the rotation of basket 40 aids in removing oil from the fried food. Spinning section 30 is proximate oil section 20 within frying vessel 14, and is disposed between oil section 20 and top cover 16. After food has been cooked in oil section 20, basket 40 is moved into spinning section 30 to facilitate removing excess oil from the cooked food. As the oil is removed from the food, the removed oil returns to oil section 20 for further use in frying, for removal from cooking device 10 and/or for filtering in order to reclaim the used oil.

According to other embodiments of the invention, with reference to FIGS. 6A-6C, 7A, 7B, 8 and 9, basket 640, 740, 840, 940 may be configured to reside within a basket well 642, 742, 842, 942. The basket well is configured to provide support to the basket and the food, and to allow the basket to be rotated to facilitate the removal of the oil from the fried food. For example, the basket well may comprise a shape similar to that of the basket so that the basket nests within the basket well. In certain embodiments, the basket well may comprise bottom members 643, 743, 843, 943 and side members 644, 744, 844, 944, and in other embodiments, the basket well may comprise only side members.

The basket well may further comprise a particle basket that is configured to catch food residue that might be removed from the fried food product during the spinning stage. For example, with reference to FIGS. 18A-18D, various basket configurations comprise baskets with different mesh sizes. Basket 1840 may comprise a fine mesh portion 1873 and a coarse mesh portion 1874. These various mesh portions may allow basket 1840 to hold the food being cooked, they may allow the cooking liquid to cook the food, and they may allow certain food residue to remain in basket 1840 while other food residue is removed. Basket 1840 may further be configured to fit within a particle basket 1875. Particle basket 1875 may be configured to prevent certain food residue from remaining in the cooking liquid after basket 1840 is removed from the cooking liquid. Particle basket 1875 may comprise a mesh that is finer than the mesh in coarse mesh portion 1874 so that some food residue that does not remain in basket 1840 may be captured in particle basket 1875. In various embodiments, basket 1840 may be removed from the cooking device without removing particle basket 1875. Particle basket 1875 may also be removable from the cooking device in order to facilitate cleaning food particles out of particle basket 1875.

In accordance with various embodiments, the food basket and/or particle basket may comprise various mesh sizes. For example, the bottom of the basket may comprise a finer mesh than the sides of the basket to facilitate preventing food particles from leaving the bottom of the basket. The top edge of the basket may be a finer mesh to aid in preventing food particles from drifting out of the basket when it is lowered into the cooking liquid.

In other embodiments, the basket well may be surrounded by a solid wall concentric with the basket well, wherein the solid wall is configured to redirect oil spun off of the cooked food so that the oil returns to the oil section. Such a configuration may also protect sensitive components of the cooking device from the hot oil. In still other embodiments, the cooking device may not comprise a food basket; rather, the mesh basket and/or other screen-type material or structure may be part of the basket well such that the basket wall may be configured to hold the food to be cooked.

According to yet other embodiments, the cooking basket may include a solid bottom covered in a non-stick material so that wet battered food products may be placed in the basket with a reduced chance that the food will stick or weld themselves to the bottom of the basket. For example, as wet battered products are placed in the basket, the batter may drip into holes in the basket, and this batter may solidify when cooked, thereby increasing the difficulty of removing the cooked food products from the basket. The solid bottom may facilitate easier removal of the cooked food from the basket. In accordance with other embodiments, various other portions of the basket may be made of non-stick material to facilitate easier removal of the cooked food from the basket.

In various embodiments, the basket well may comprise steel, stainless steel, ceramic material, composite materials, metals, and combinations thereof. In other embodiments, the basket well may comprise any material and any configuration capable of providing support to the basket and allowing the basket to be rotated to facilitate the removal of oil from the fried food.

In a further embodiment of the invention, and with reference to FIGS. 9 and 10A-10C, basket 940, 1040 may be configured to interface with basket-well 942 in order to facilitate the rotation of basket 940, 1040. Basket 1040 may comprise a key and/or keys 1041 that are configured to interface with bottom members 943 and/or side members 944 of basket well 942. For example, one embodiment is configured to allow keys 1041 to interface with bottom members 943 such that when basket well 942 rotates, bottom members 943 abut keys 1041 causing basket 940 to rotate. In another embodiment, keys 1041 are configured to interface with side members 944 such that when basket well 942 rotates, side members 944 abut keys 1041 causing basket 940 to rotate. In further embodiments, basket well 942 may comprise a female and/or male key and basket 940 may comprise a corresponding male and/or female key such that basket 940 is configured to rotate when basket well 942 rotates and when the corresponding male and female keys mate. While keys have been described, it should be understood that any other mechanism and/or structure configured to allow basket 940 to be removable from basket well 942 and to allow basket 940 to rotate when basket well 942 rotates are contemplated within the scope of the present invention. For example, keys 1041 may comprise fins, rods, pins, buttons, clips, snaps, fasteners, adhesives, and any other means now known or hereafter developed for removably allowing basket 940 to interface with basket well 942. However, in other embodiments, it may not be necessary for basket 940 to be removable from basket well 942. Moreover, the cooking device may not comprise basket 940, for example, where the basket well is configured to maintain the food within the basket well.

According to other embodiments of the invention, the basket well may reside within a frame structure disposed within the cooking device. As will be discussed further below, the frame structure may be configured to facilitate the rotation of the basket well and/or the translation of the basket well between the oil section and the spinning section. For example, the frame structure may comprise bearings, tracks, guide shafts, gears, belts, and the like for facilitating movement of the basket well. In other embodiments, the frame structure provides support for the basket well and the basket, such that the frame structure is configured to reduce or more evenly distribute vibration in the cooking device during the oil removal process, particularly when the food may be in an unbalanced position in the food basket. The frame structure may comprise any material suitable for providing the support and reducing the vibration discussed above, and for containing the components necessary to facilitate such purposes.

Figure 19A:
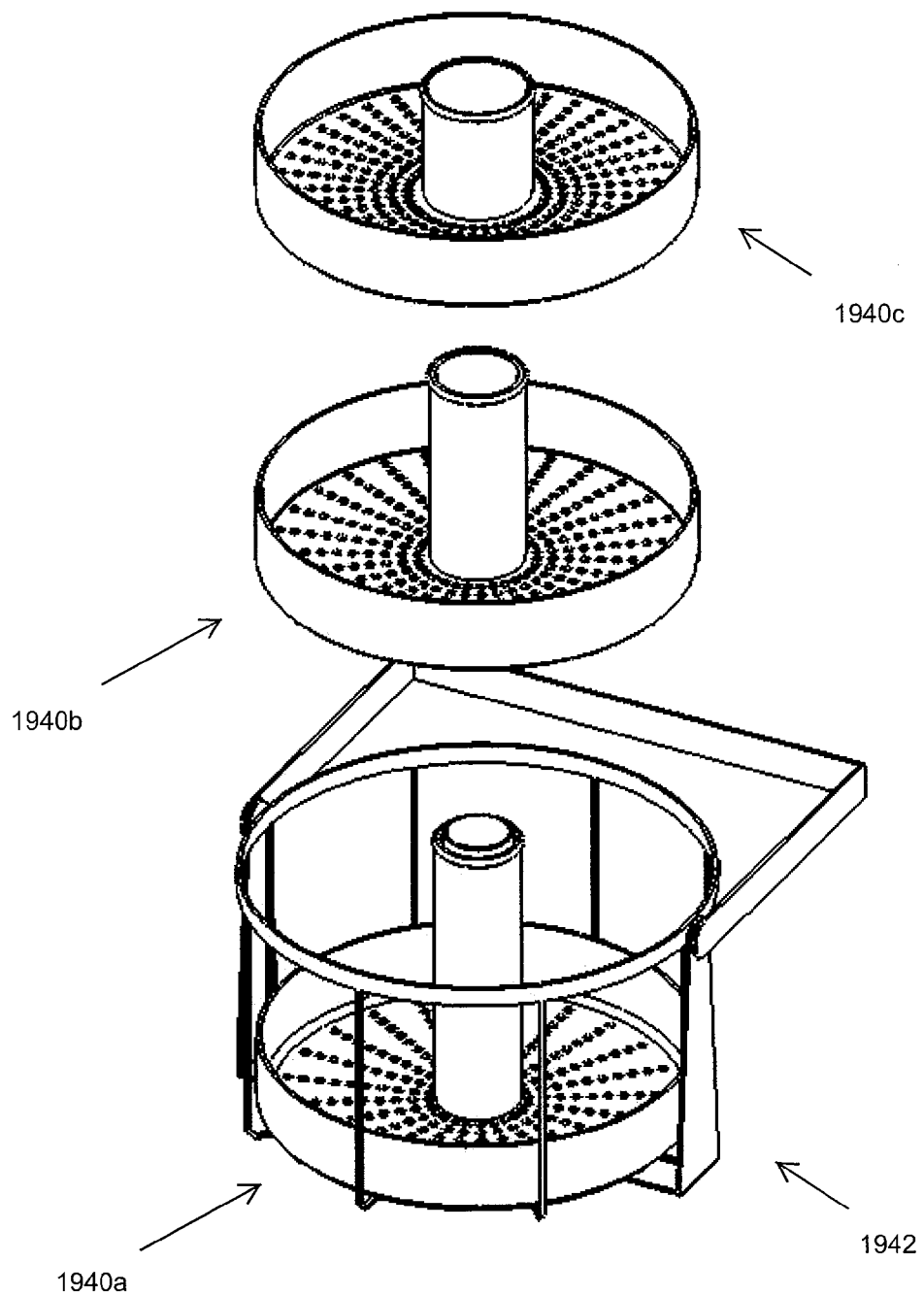
FIG. 19A illustrates an exploded, perspective view of a stackable basket according to an embodiment of the invention.
Figure 19B:
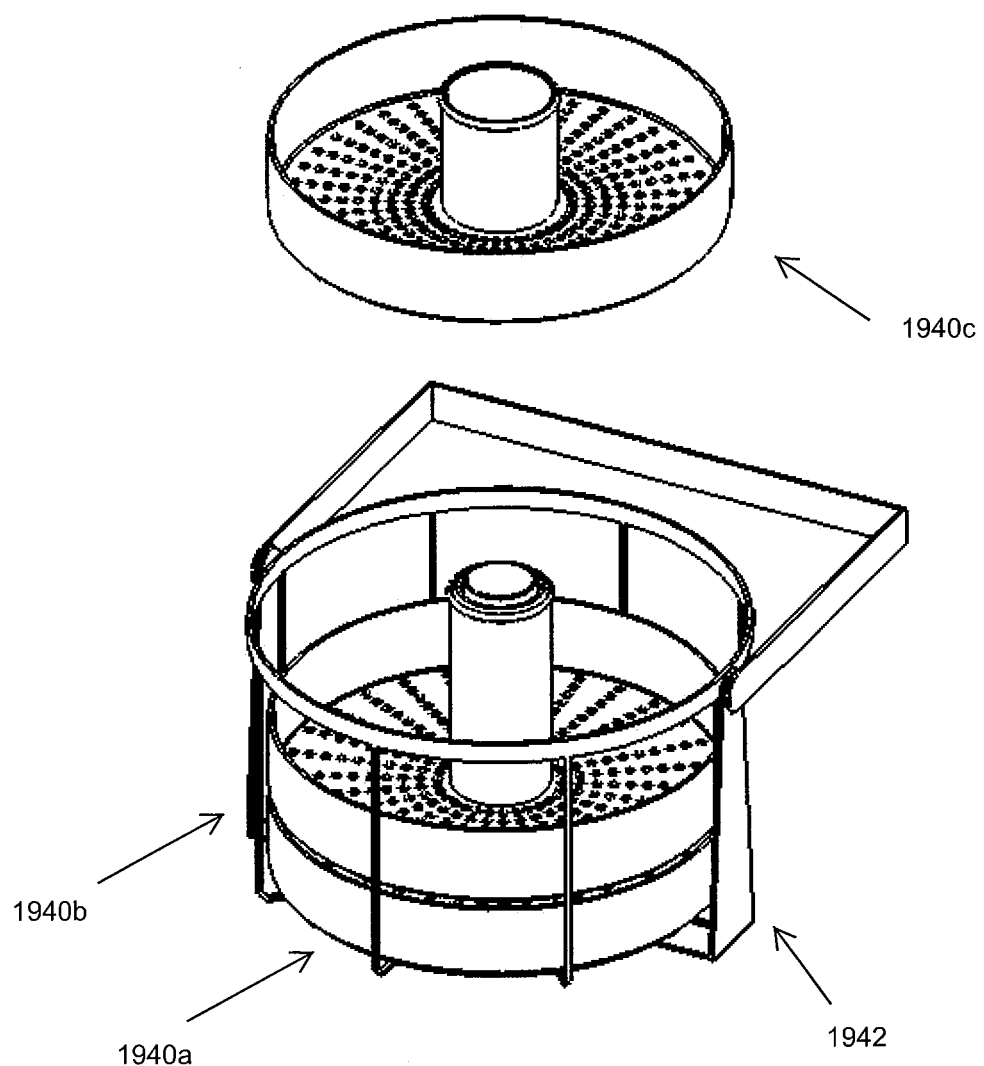
FIG. 19B illustrates another exploded, perspective view of the embodiment illustrated in FIG. 19A.
Figure 19C:
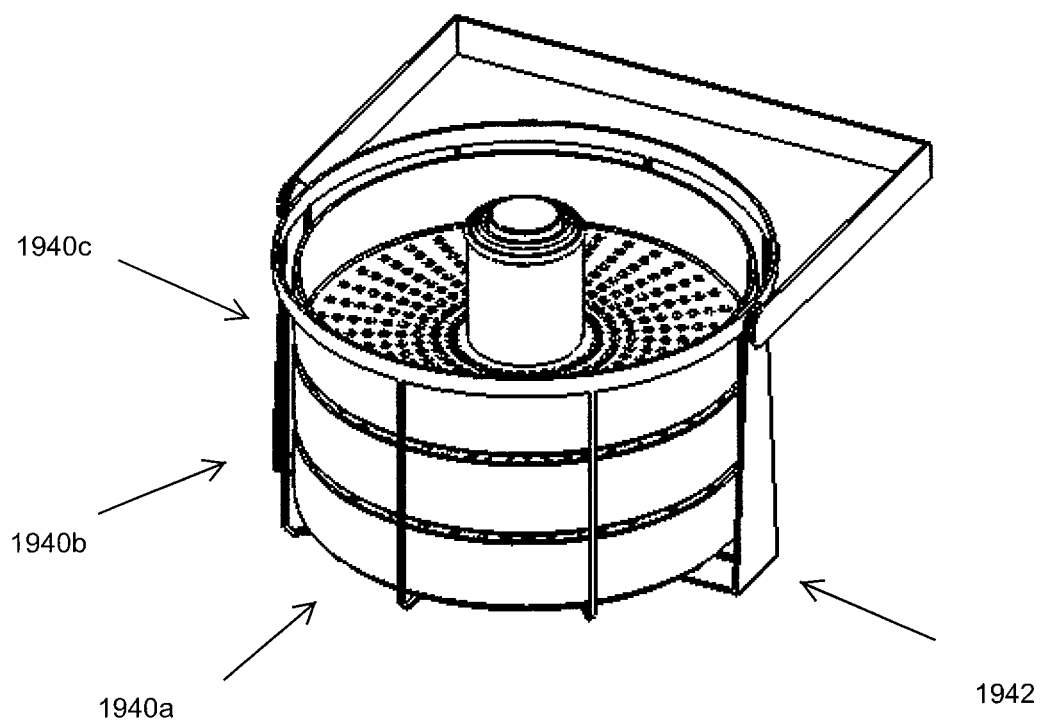
FIG. 19C illustrates a perspective view of the embodiment illustrated in FIG. 19A.

In accordance with other embodiments of the invention, the cooking basket may be configured to allow more than one type of food to be cooked at the same time. For example, with reference to FIGS. 19A-19C, a segmented basket is disclosed. Instead of a single basket, the cooking device may comprise a plurality of baskets 1940a, 1940b, 21940c. Basket portion 1940c may be configured to nest within basket well 1942, basket portion 1940b may be configured to nest within basket well 1942 on top of basket portion 1940c, and basket portion 1940a may be configured to nest within basket well 1942 on top of basket portion 1940b. Such a configuration facilitates cooking more than one type of food at the same time. Such a configuration may further facilitate cooking different types of foods for different lengths of time. For example, food that needs to be cooked for the least amount of time may be placed in basket portion 1940a so that it may removed from the cooking device first.

It should be noted that although a substantially circular basket and/or circular basket portion has been disclosed, any basket shape may be employed with various embodiments of the present invention. For example, the basket and/or basket portion may be hexagonal, octagonal, triangular, and the like. Any shape may be employed that allows the cooking device to function according to the various methods and processes disclosed herein.

Figure 20A:
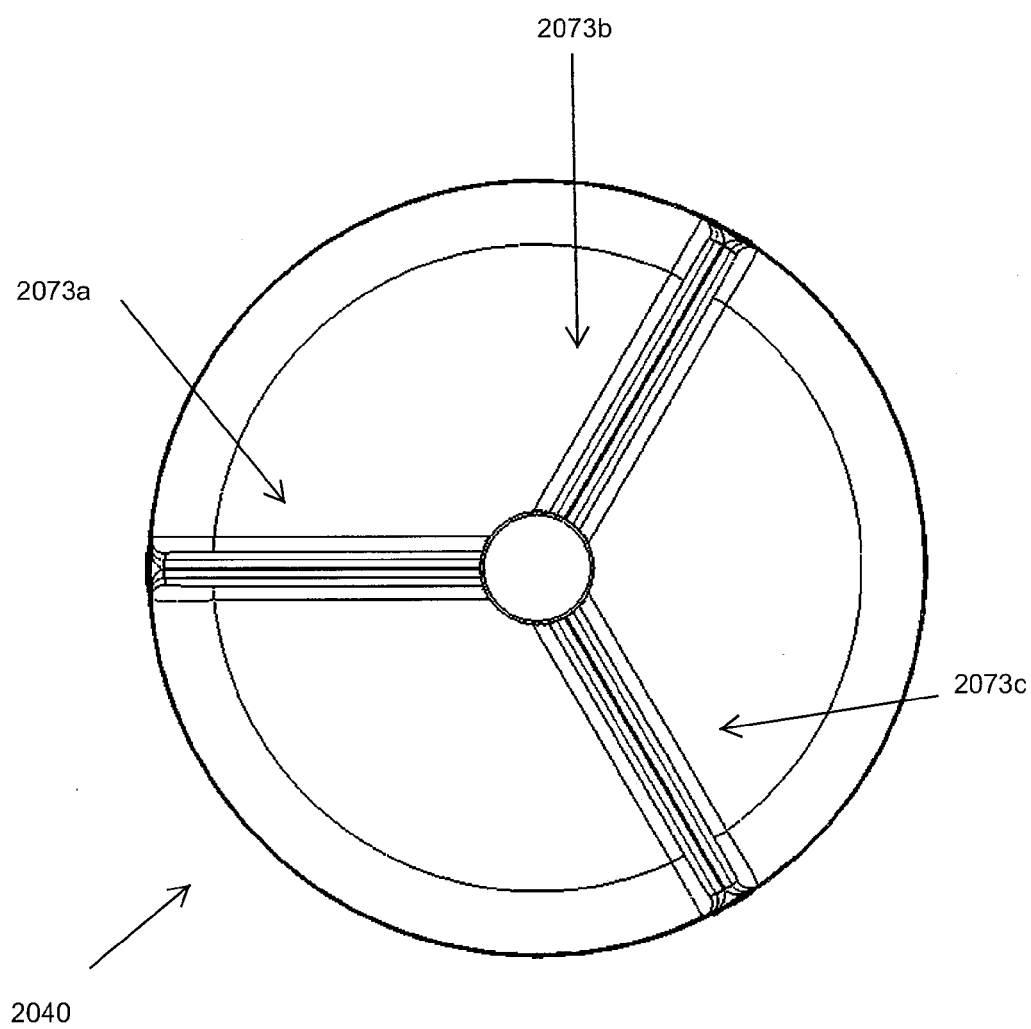
FIG. 20A illustrates a top view of a segmented basket according to an embodiment of the invention.
Figure 20B:
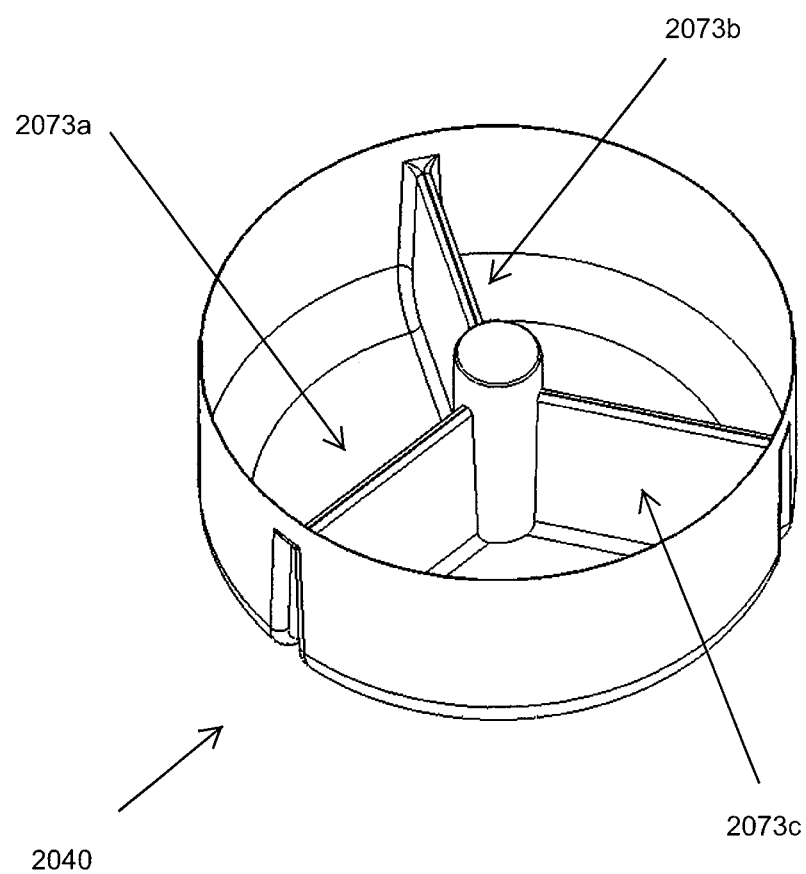
FIG. 20B illustrates a perspective view of the embodiment illustrated in FIG. 20A.

In another embodiment, as illustrated in FIGS. 20A-20B, basket 2040 may comprise a plurality of dividers 2073a-c. Dividers 2073a-c may be configured to allow different types of food to be cooked in each of the sections defined by dividers 2073a-c at the same time within basket 2040.

Figure 21A:
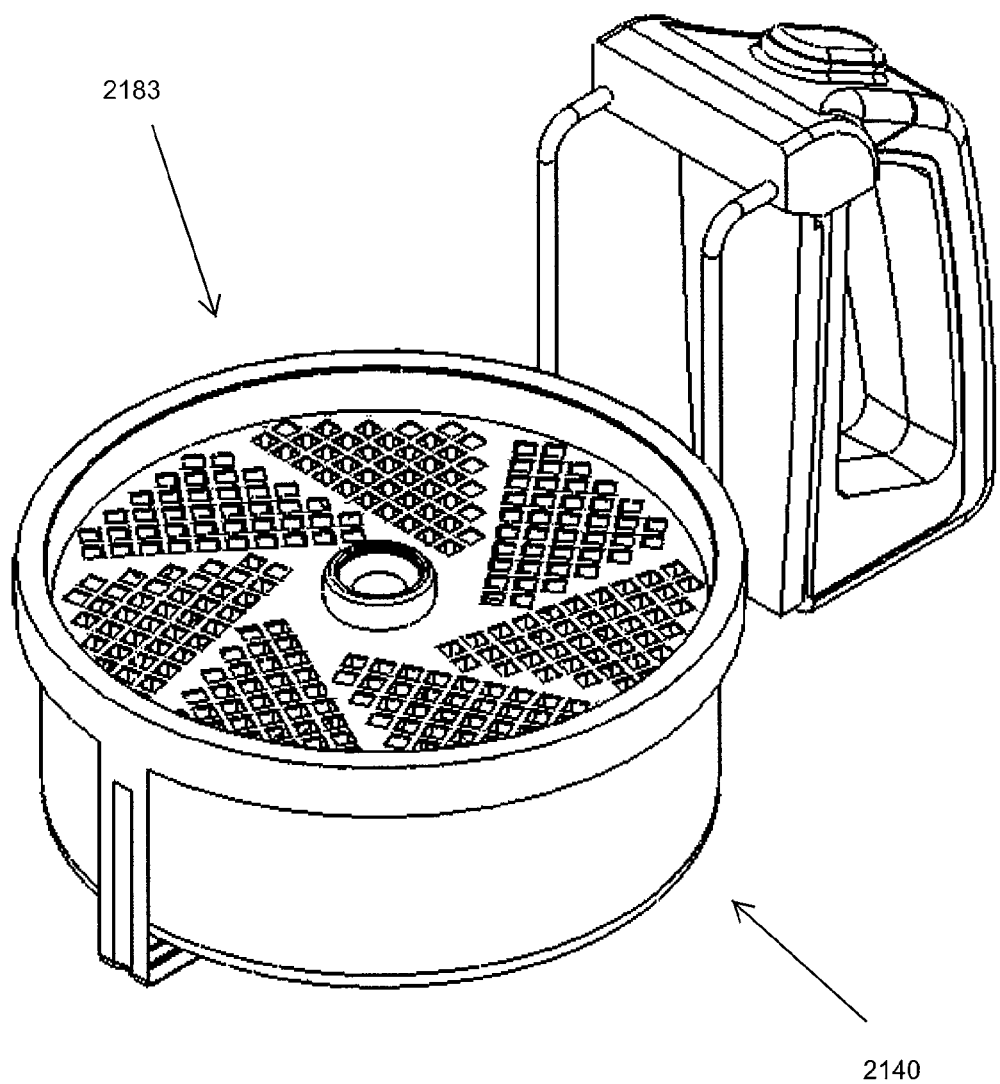
FIG. 21A illustrates a perspective view of a submerser plate according to an embodiment of the invention.
Figure 21B:
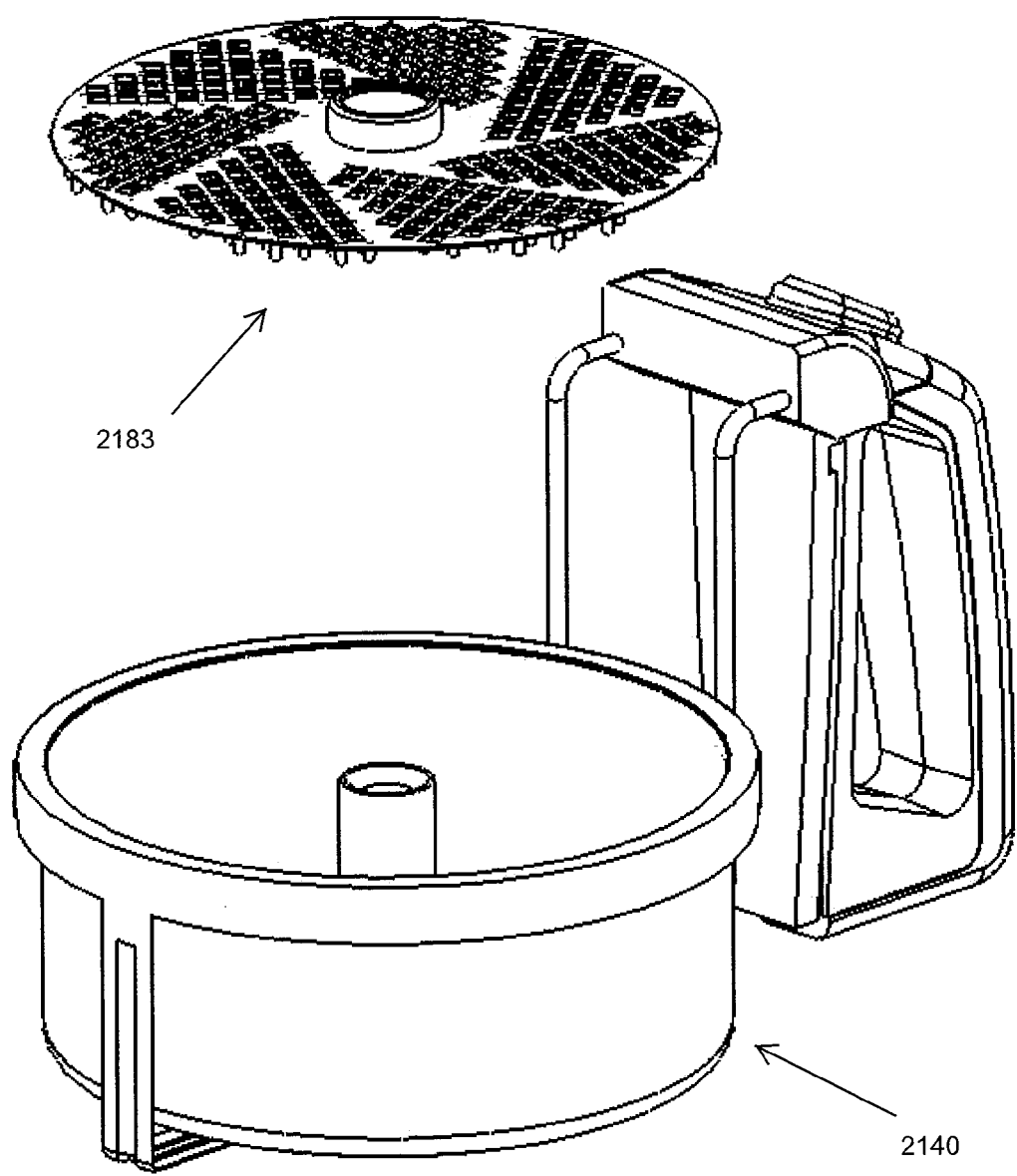
FIG. 21B illustrates an exploded, perspective view of the embodiment illustrated in FIG. 21A.

According to other embodiments, and with reference to FIGS. 21A-21B, the cooking device may comprise a submerser plate 2183 that is configured to facilitate maintaining the food within basket 2140. After food is lowered into basket 2140, submerser plate 2183 may be lowered over the food to maintain the food within basket 2140. For example, it may be desirable to keep the food completely submerged within the cooking liquid to facilitate more efficient and/or uniform cooking.

Further embodiments of the invention, with reference back to FIG. 1, provide a top cover 16 that is operable to maintain an elevated temperature within spinning section 30. Top cover 16 is proximate device housing 12, frying vessel 14, and spinning section 30. Top cover 16 is operable to separate the frying environment within cooking device 10 from the environment outside cooking device 10. Top cover 16 comprises a thermally insulating material that reduces temperature loss to the outside of cooking device 10 and that reduces the energy required to maintain cooking device 10 at a desirable operating temperature. The thermal insulating material also maintains the outside surface of top cover 16 at a temperature that is amenable to being touched by a user without injuring the user. Top cover 16 may further comprise a lip and/or edge that is configured to protrude into the cooking device to facilitate preventing cooking liquid from exiting the device. Top cover 16 may also comprise a shock mount 17 that is operative to reduce vibration, shaking, movement and the like and a pivot 18 which is operative to provide rotational movement of top cover 16. Top cover 16 facilitates the maintenance of a desirable temperature within the food that is cooked by cooking device 10 while oil is being removed from the cooked food. For example, top cover 16 is designed to allow basket 40 to rotate within spinning section 30 while top cover 16 remains closed. It is not necessary, according to various embodiments of the invention, to open top cover 16 between frying the food and removing the oil from the food. In some embodiments of the invention, top cover 16 comprises spin motor 60 to facilitate spinning of basket 40 to remove oil from the food. In various embodiments, spin motor 60 may be powered by batteries, direct current, alternating current, solar power, gasoline, and the like.

Figure 35A:
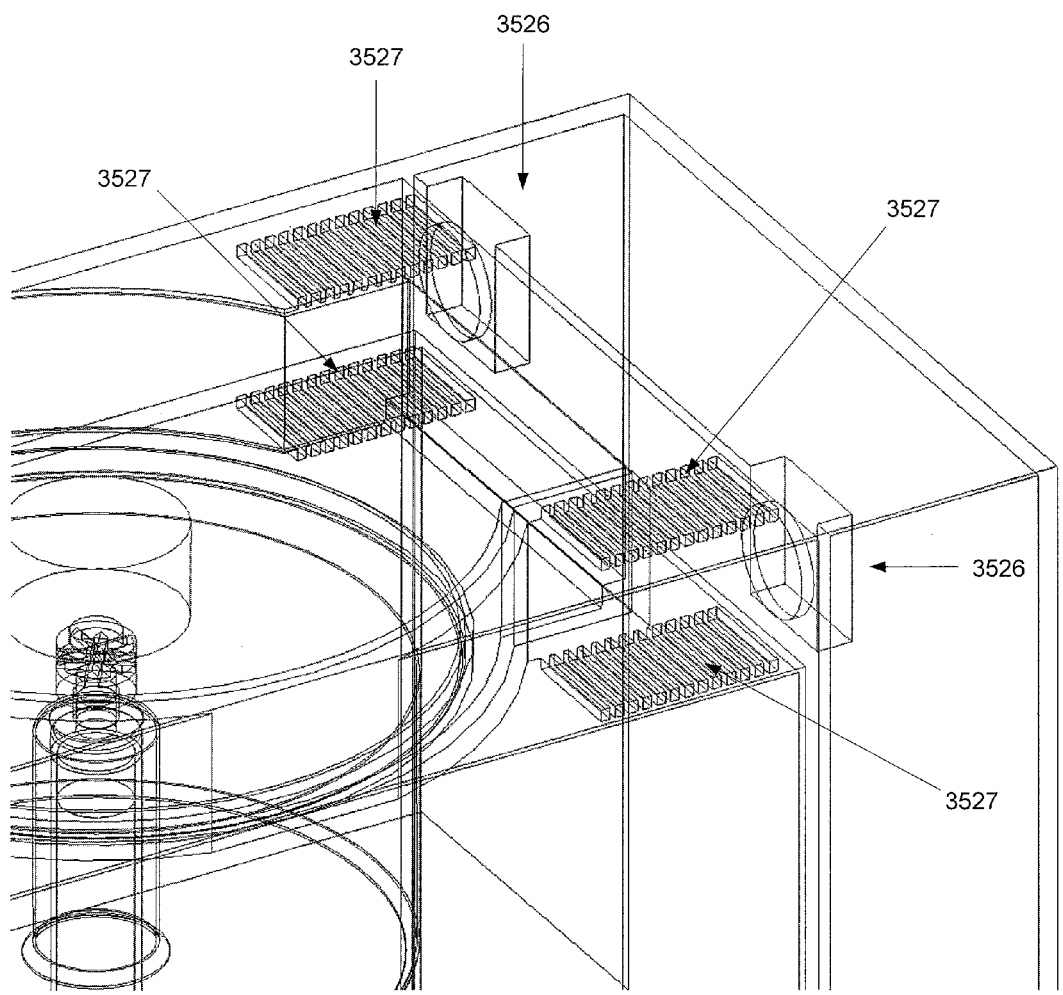
FIG. 35A illustrates a perspective view of a cooking device comprising a hood with a venting system according to an embodiment of the invention.
Figure 35B:
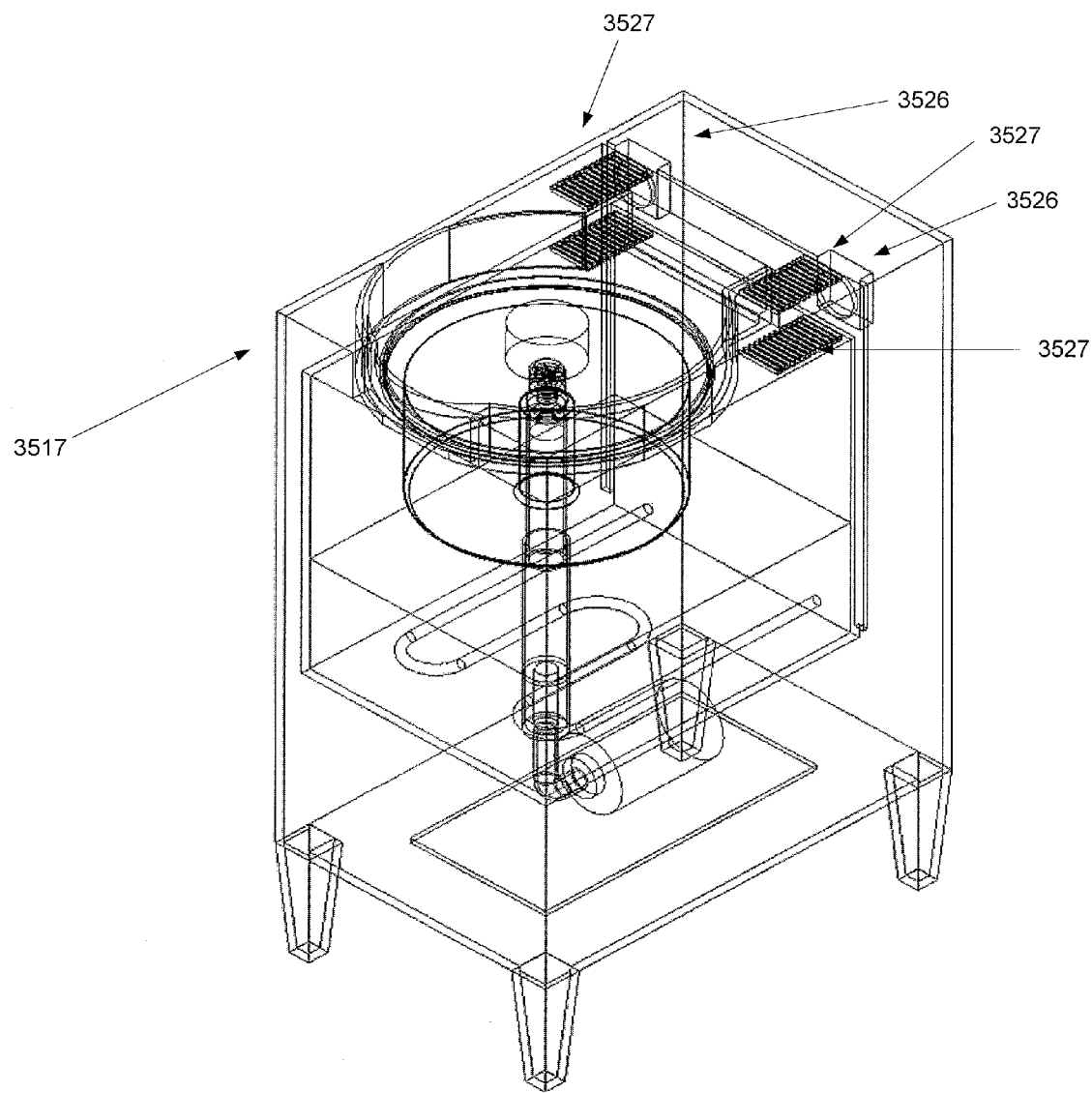
FIG. 35B illustrates another perspective view of the embodiment illustrated in FIG. 35A.

In some embodiments, the cooking device may comprise a hood. The hood may operate in conjunction with the top cover discussed above. The hood may be flush mounted and/or may rise above the cooking device to create additional space for spinning and convection cooking. The hood may also comprise a pressure relief system to facilitate venting the cooking device. The hood may further comprise a fan that is configured to maintain a desired temperature in the cooking section, and the fan may also facilitate moving air over the food to cook the food by convection. As with other aspects of the cooking device, the fan may be a variable speed fan that may be manually and/or automatically controlled to facilitate achieving the optimum outcome for the cooked food. The hood structure may be removable from the cooking device. For example, it may be hinged from the front and/or rear of the cooking device, or the hood may be entirely removable from the cooking device. In one embodiment, with reference to FIGS. 35A-35B, a hood 3517 may comprise a plurality of vents 3527 configured to vent the cooking space within the cooking device (where the cooking space comprises the spinning section and the cooking section). Hood 3517 may comprise a hollow portion, and a fan or fans 3526 may be configured to cause air to flow in the hollow portion. As air flows in the hollow portion, air from the cooking device is vented through hood 3517 to the surrounding environment.

Figure 11:
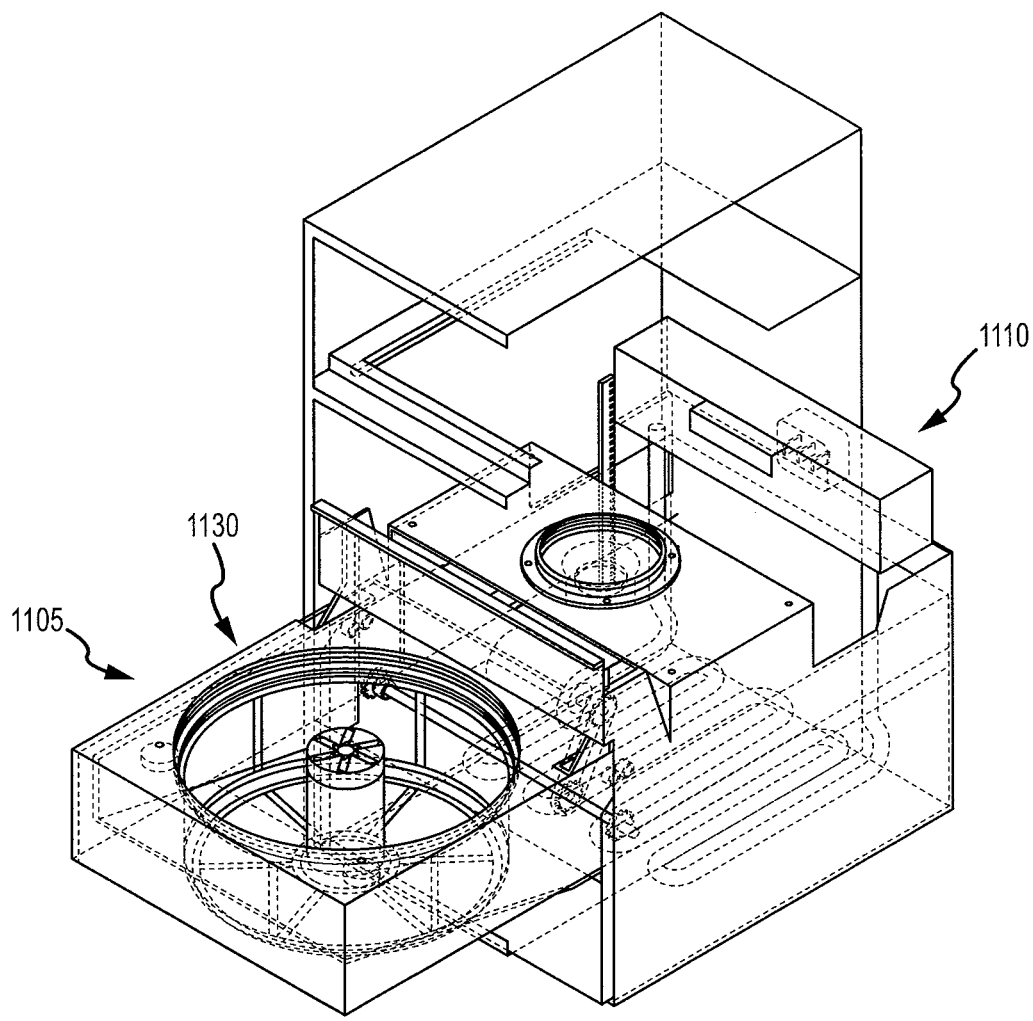
FIG. 11 illustrates a perspective view of a cooking device according to an embodiment of the present invention.
Figure 16:
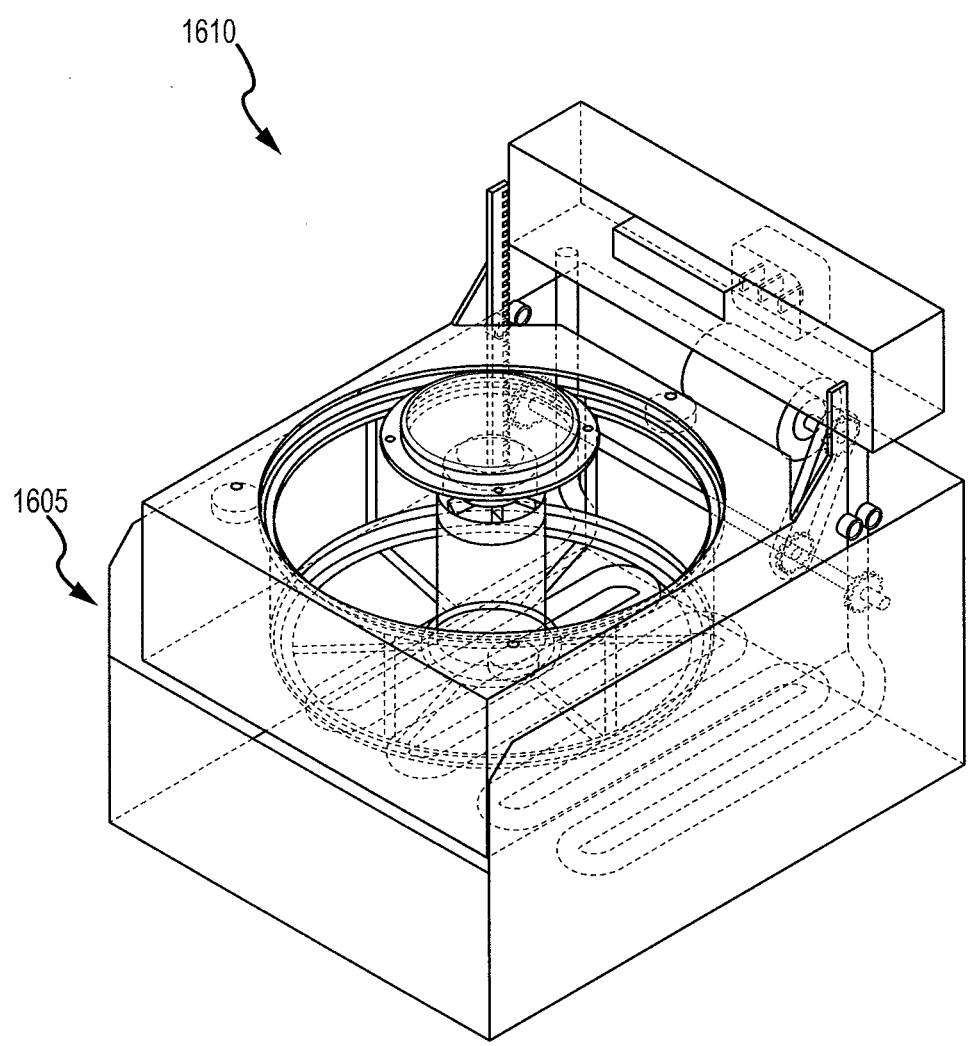
FIG. 16 illustrates a perspective view of a cooking device according to an embodiment of the present invention.
Figure 17:
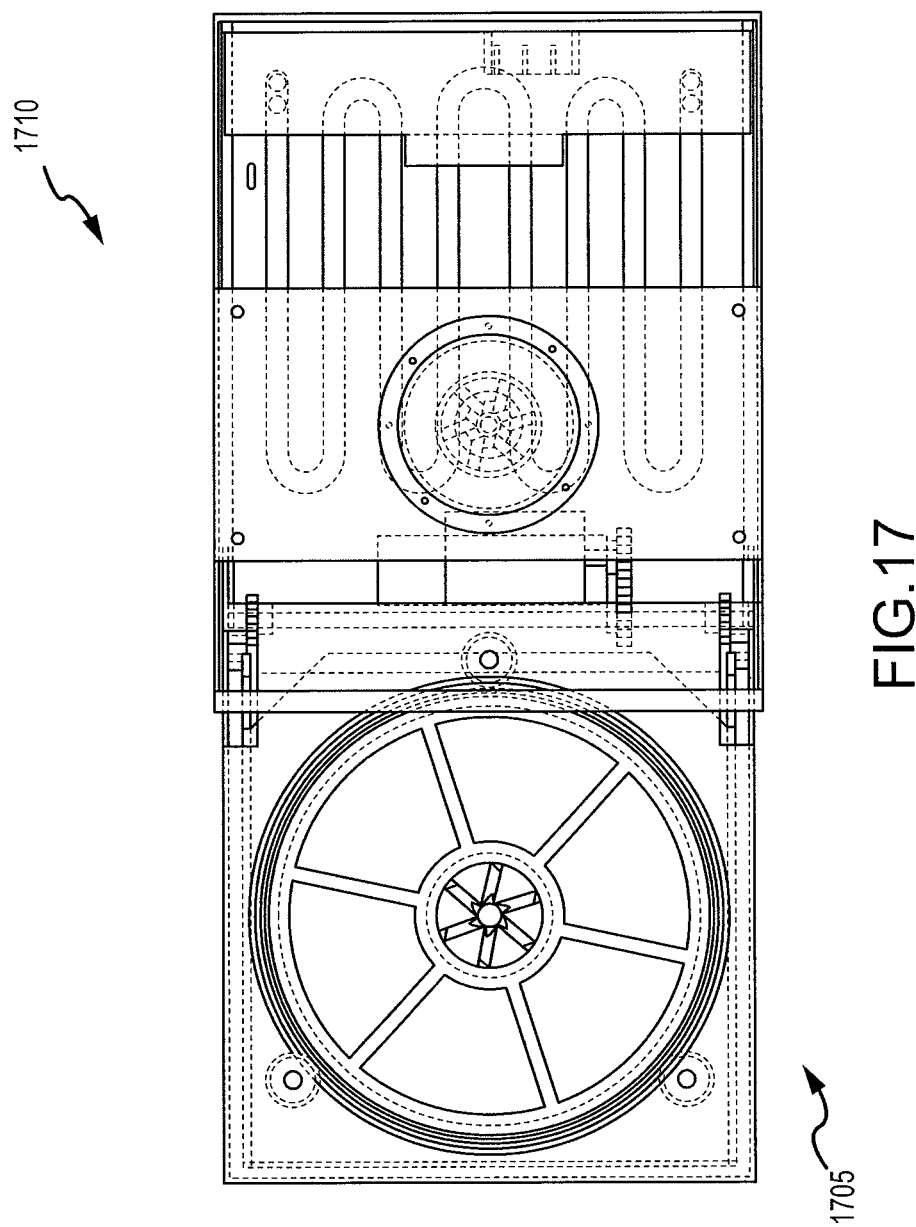
FIG. 17 illustrates a top view of a cooking device according to an embodiment of the present invention.
Figure 18A:
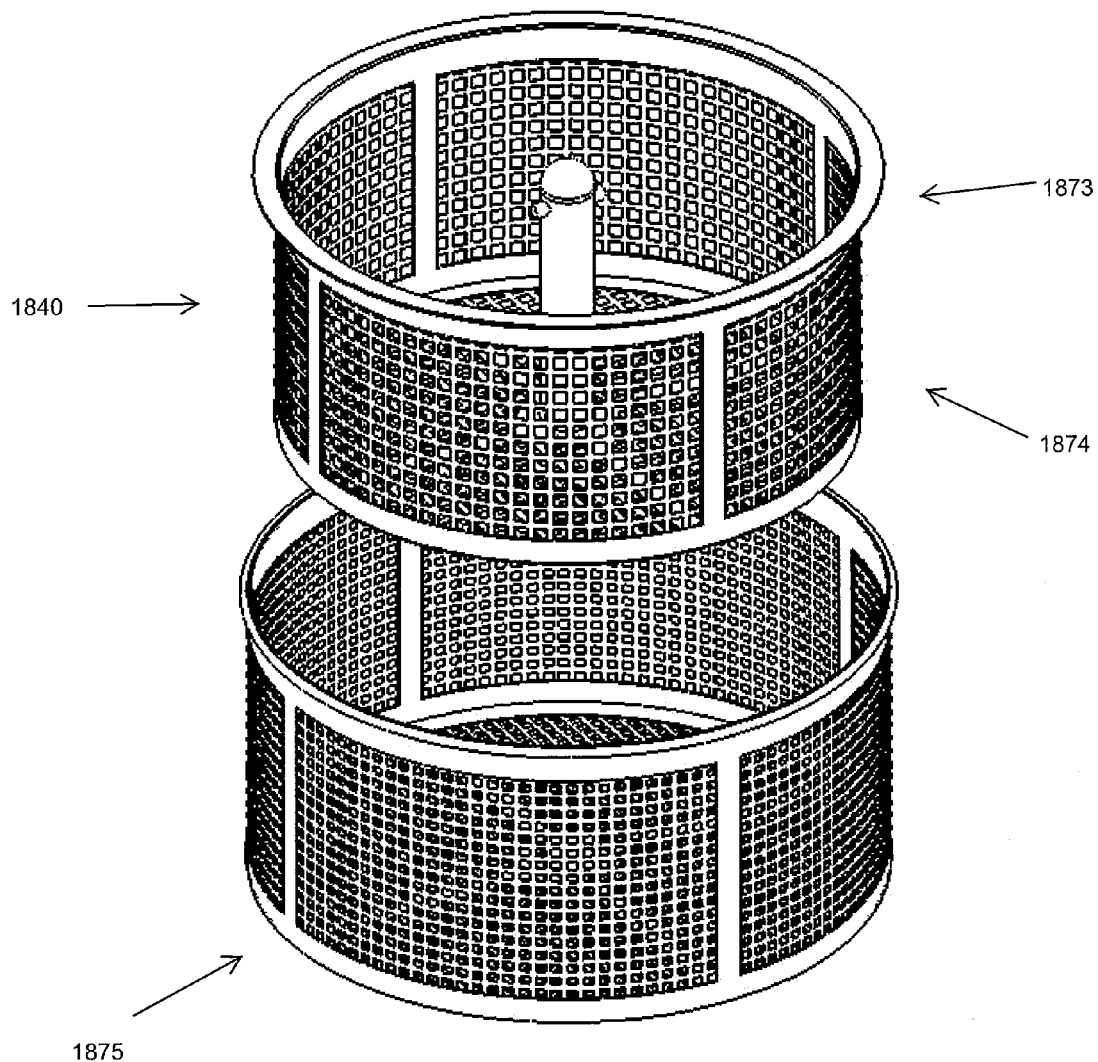
FIG. 18A illustrates an exploded, perspective view of a basket and a particle basket according to an embodiment of the present invention.
Figure 18B:
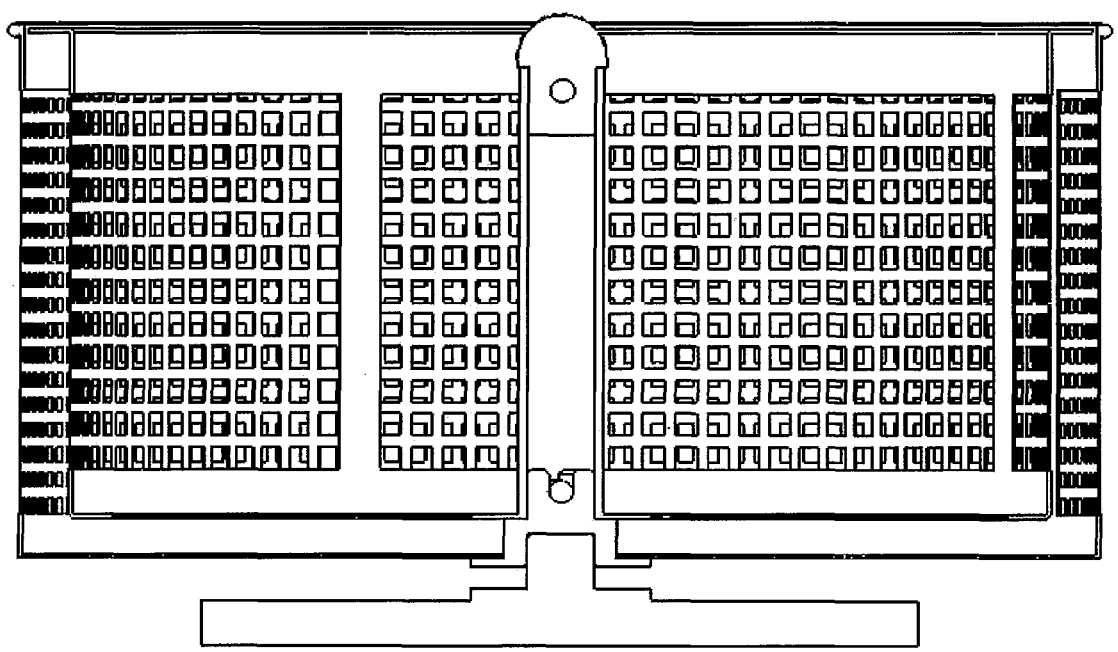
FIG. 18B illustrates a side view of the embodiment illustrated in FIG. 18A.
Figure 18C:
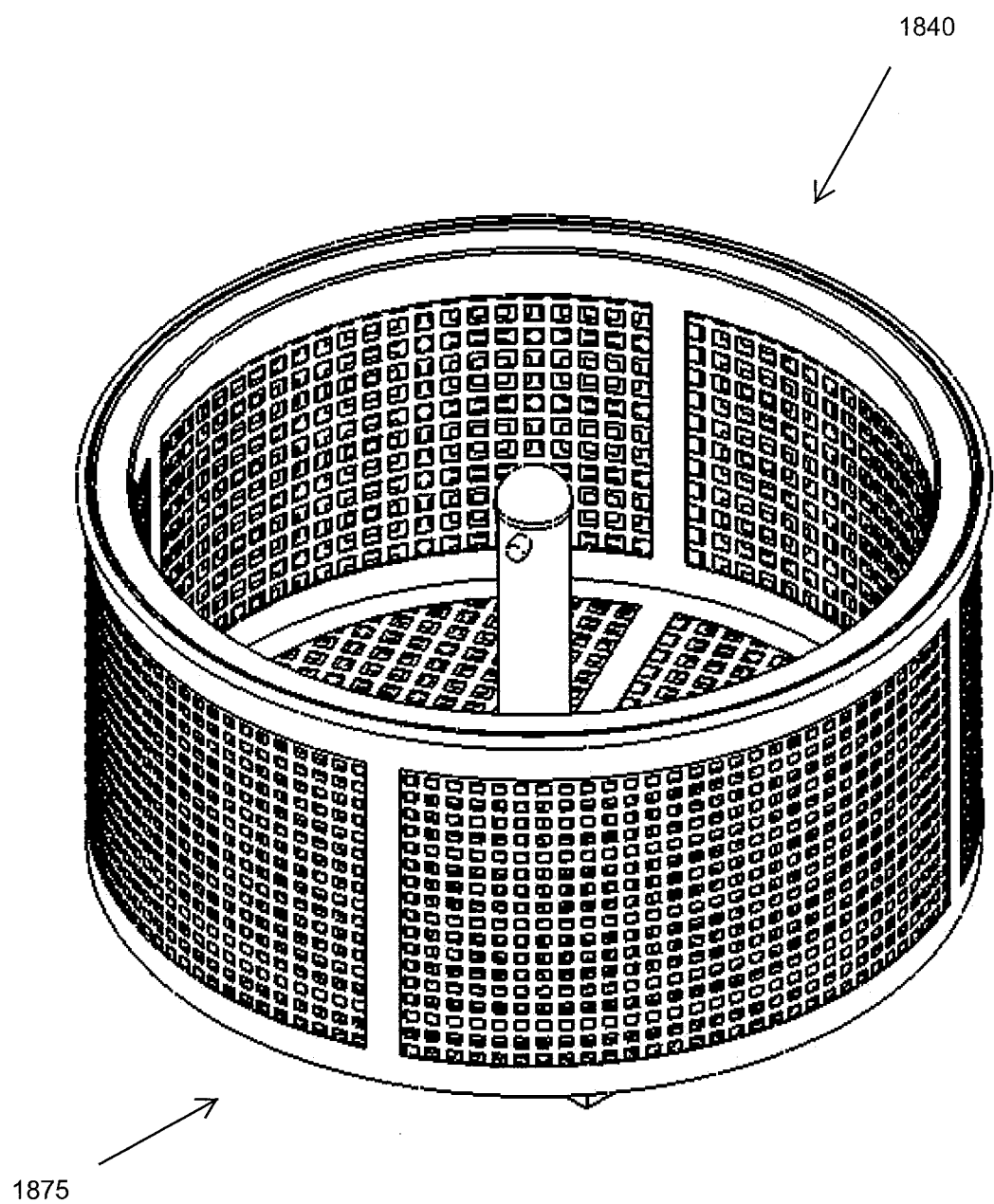
FIG. 18C illustrates a perspective view of the embodiment illustrated in FIG. 18A.

Other embodiments of the invention do not comprise top cover 16. Certain embodiments comprise a drawer 1105 configured to be slidably removable from cooking device 1110. For example, with reference to FIG. 11, drawer 1105 may be configured to comprise any of the components located in spinning section 1130. Drawer 1105 may also be configured to comprise any components utilized in the spinning of the oil from the fried food. In certain other embodiments, and as will be discussed below, drawer 1105 may be configured to allow the retrofitting of portions of the cooking device 1110, including but not limited to the portions of spinning section 1130, on to existing frying apparatuses. Drawer 1105 may be configured to comprise bearings to facilitate slidable movement of the drawer with respect to cooking device 1110. Cooking device 1110 may also comprise motors and/or gears to facilitate the automated movement of drawer 1105. In other embodiments, drawer 1105 may be manually slidable with respect to cooking device 1110. In further embodiments, drawer 1105 may contain the frame structure discussed above such that the components configured to allow movement of the basket well and the basket are removable from the cooking device when drawer 1105 is opened. Still other embodiments of the drawer are illustrated in FIGS. 16-17.

Figure 22A:
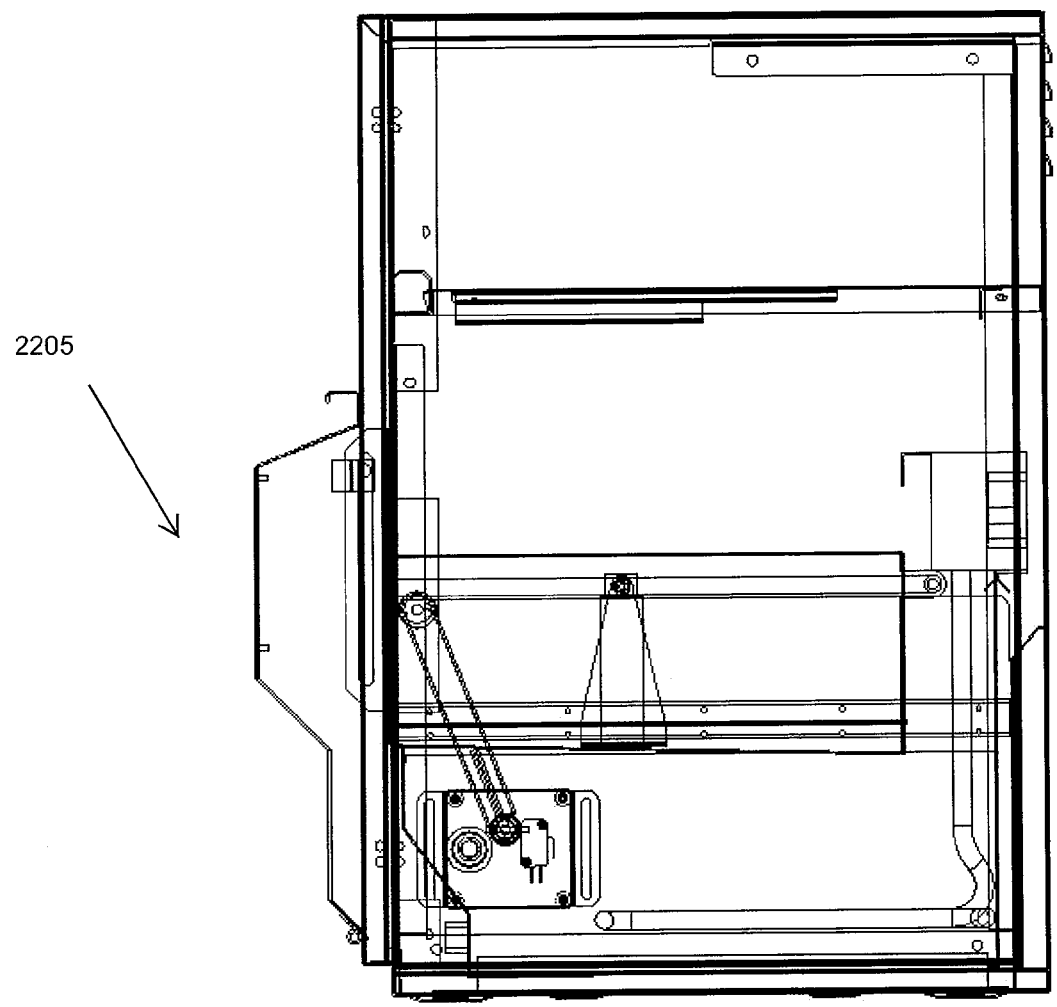
FIG. 22A illustrates a side cross-sectional view of a cooking device with a door according to an embodiment of the invention.
Figure 22B:
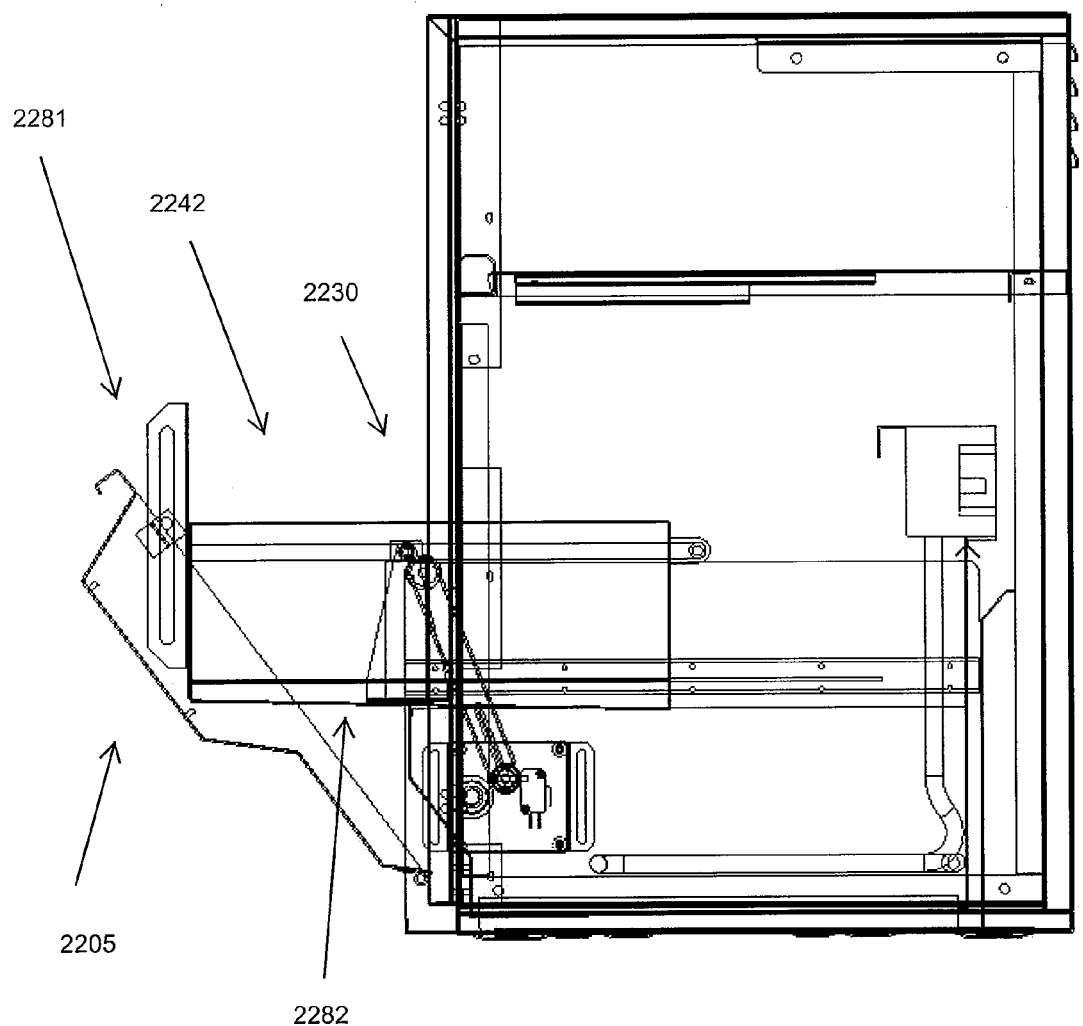
FIG. 22B illustrates a side cross-sectional view of the embodiment illustrated in FIG. 22A with the door partially open.
Figure 22C:
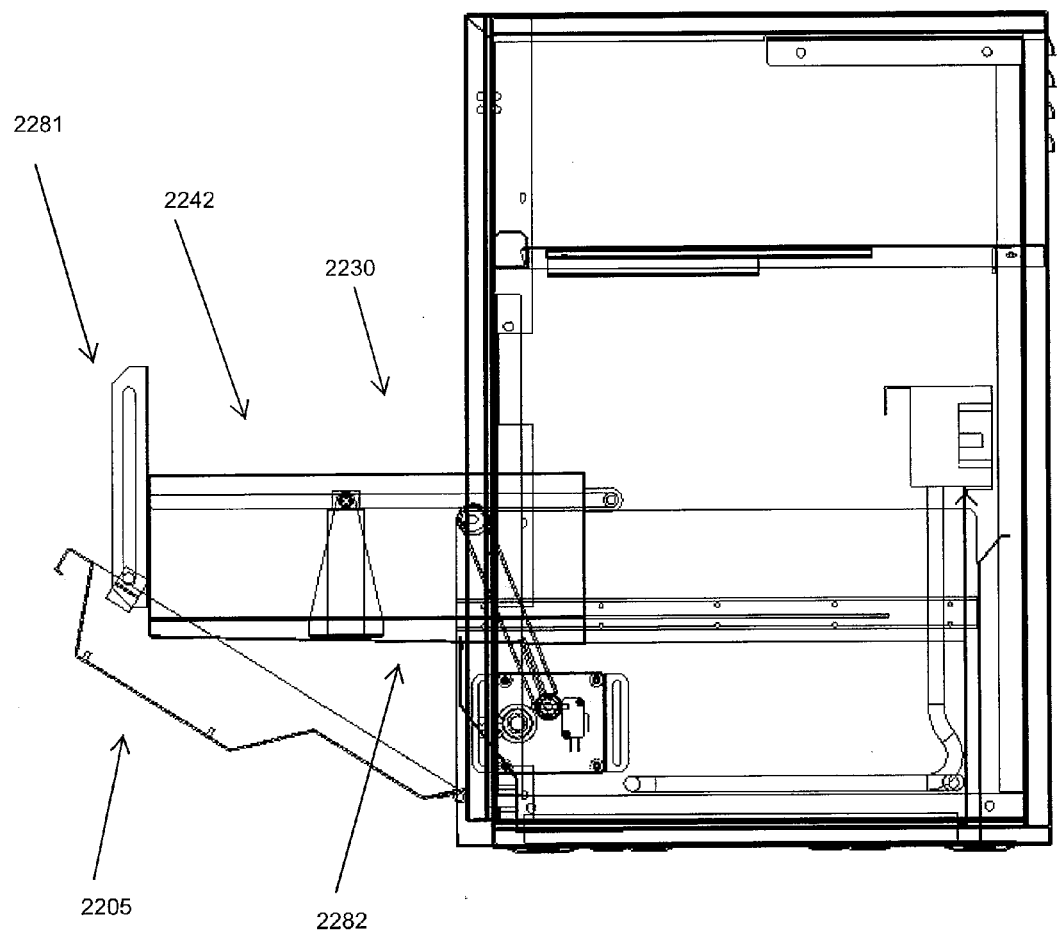
FIG. 22C illustrates a side cross-sectional view of the embodiment illustrated in FIG. 22A with the door open.

With reference to FIGS. 22A-22C, a further configuration for the cooking device is disclosed. The cooking device may comprise a hinged door 2205 that is configured to facilitate removing various components from the cooking device that are located in spinning section 2230 when door 2205 is opened. Basket well 2242, the cooking basket, and various associated components may be slidably mounted on vertical rails 2281 and horizontal rails 2282, such that when door 2205 is opened, basket well 2242 and associated components are removed from the cooking device. Gears, bearings, and or other components may be used to facilitate moving the components outside of the cooking device. Door 2205 may be automated in conjunction with a motor to facilitate automatic opening of door 2205 when the cooking process is finished.

In another embodiment, and with reference to FIGS. 37A-37D, a cooking device 3710 with a drawer 3705 is illustrated. Drawer 3705 comprises rails and/or bearings 3703 that slidably couple to cooking device 3710 via tracks and/or bearing surfaces 3704. Rails 3703 and tracks 3704 allow drawer 3705 to move into and out of a housing 3720 of cooking device 3710.

A drawer motor 3740 may be used to automatically move drawer 3705 into and out of housing 3720. An arm 3741, with a cam 3742 that interfaces with a cam surface 3743, may be coupled to drawer motor 3740. As drawer motor 3740 moves drawer 3705 into or out of housing 3720, cam 3742 causes drawer 3705 to move up and down (e.g., through rotation and/or translation) due to the curvature of cam surface 3743. Cam surface 3743 and cam 3742 facilitate maneuvering drawer 3705 into and out of housing 3720 without contacting certain portions of housing 3720 and cooking device 3710. For example, a cooking liquid bay 3746 may have a lip, and cam surface 3743 and cam 3742 may facilitate moving drawer 3705 up and over the lip so that drawer 3705 does not contact the lip.

In an embodiment, a door 3715 is rotatably coupled to housing 3720 to open when drawer 3705 removes basket 3706 from housing 3720 and to close when drawer 3705 moves basket 3706 into housing 3720. In another embodiment, door 3715 may also be coupled to drawer 3705 to facilitate sliding drawer 3705 into and out of housing 3720.

According to various embodiments, drawer 3705 further comprises a frame 3702 for housing a centrifugal liquid removal device such as a basket 3706. Basket 3706 is rotatably coupled to frame 3702 so that basket 3706 may rotate to facilitate removing excess liquid from a cooked food. A cover 3707 may be placed over basket 3706 to facilitate maintaining the food in basket 3706 during cooking and/or spinning.

Basket 3706 further comprises a drive shaft 3764 to facilitate driving basket 3706 with a spin motor 3760. Spin motor 3760 couples to a drive shaft key 3766 on drive shaft 3764 with a spin motor gear 3762. Spin motor gear 3762 may be configured to automatically couple to drive shaft key 3766, for example, via electromagnetic coupling.

In an embodiment, basket 3706 comprises a food distribution and/or mixing mechanism 3750. Food distribution mechanism 3750 is configured to move the food during cooking and/or spinning to facilitate better cooking of the food and/or better liquid removal from the food. Moving the food may also prevent the food from sticking to basket 3706 and to other food items being cooked.

In another embodiment, a basket removal tool 3730 may be utilized to remove basket 3706 from cooking device 3710. Basket removal tool 3730 couples to drive shaft 3764, for example, by clamping, in order to remove basket 3706 from cooking device 3710 and/or drawer 3705. After cooking, basket 3706 may be at an elevated temperature, and basket removal tool 3730 may provide for safer removal of basket 3706. Further, basket 3706 with the cooked food may be heavy, and basket removal tool 3730 may provide sufficient leverage to facilitate removing basket 3706 from cooking device 3710.

With reference back to FIG. 1, in some embodiments of the invention that comprise top cover 16, pressure may build within cooking device 10 during the frying and spinning processes. In order to relieve and/or release this pressure from cooking device 10, some embodiments comprise a mechanism to relieve the pressure, such as a pressure-relief valve 799 illustrated in FIG. 7C. Pressure-relief valve 799 is configured to substantially equalize the pressure between an internal portion of cooking device 10 and an external portion of cooking device 10. Any mechanism configured to substantially equalize the pressure may be used without departing from the scope of the present invention. Pressure relief valve 799 may be located anywhere on and/or in cooking device 10 that is configured to facilitate the substantial equalization of the pressure between the internal portion and the external portion. In another embodiment, and with reference to FIGS. 34A-34D, a cooking device may comprise a pressure release valve 3423 that comprises a ball 3426, such as a heavy ball bearing. Ball 3426 is configured to move up in valve 3423 in order to release pressure in the cooking device, in response to a sufficient pressure being exerted on ball 3426. The cooking device may comprise a vent 3427 that is configured to allow air from inside the cooking device to be routed to valve 3423 in order to facilitate releasing pressure from valve 3423.

Various components are operable to move basket 40 during the food frying and oil removal processes. In an embodiment of the invention, the motion of basket 40 within frying vessel 14 is controlled by linear motor 50, spin motor 60, guide shaft 90, basket support 45, basket coupling 46, basket lift mechanism 47, and controller 55. Basket 40 is coupled to basket support 45 which is coupled to basket lift mechanism 47. Basket lift mechanism 47 is coupled to linear motor 50, and linear motor 50 acts on lift mechanism 47 to facilitate moving basket 40 between oil section 20 and spinning section 30. For example, where oil section 20 is vertically-oriented with respect to spinning section 30, linear motor 50 vertically translates basket 40 between the two sections. In certain embodiments of the invention, linear motor 50 comprises a helical drive. In further embodiments, linear motor 50 comprises a direct drive motor, such that pulleys, belts, chains, and the like are not necessary for the motor to drive basket 40. In other embodiments, linear motor 50 comprises any device capable of automatically moving basket 40 between oil section 20 and spinning section 30. In yet other embodiments, basket 40 may be manually moved between the sections. In various embodiments, linear motor 50 may be powered by batteries, direct current, alternating current, solar power, gasoline, and the like.

With continued reference to FIG. 1, basket lift mechanism 47 sealably nests within basket support 45 so as to prevent cooking oil 22 from exiting oil section 20 and contaminating the basket lift mechanism. Basket 40 is attached to and receives basket support 45, thereby allowing linear motor 50 to move basket 40 between oil section 20 and spinning section 30. In accordance with various embodiments of the invention, basket 40 is cylindrical in shape, and basket support 45 is located centrally within basket 40. Guide shaft 90 runs centrally through basket 40, basket support 45, and basket lift mechanism 47 to facilitate the vertical movement of basket 40 between oil section 20 and spinning section 30.

Other embodiments of the present invention comprise a basket coupling 46 which interfaces with basket support 45 and spin motor 60 in order to allow spin motor 60 to rotate basket 40 about the basket's vertical axis. Basket coupling 46 interfaces with guide shaft 90, which causes basket support 45 to appropriately contact basket coupling 46 in order to allow spin motor 60 to rotate basket 40. In certain embodiments of the invention, spin motor 60 is a pancake-type motor. In other embodiments of the invention, spin motor 60 is any device capable of automatically rotating basket 40 within spinning section 30. In further embodiments, basket 40 may be manually rotated.

Figure 2:
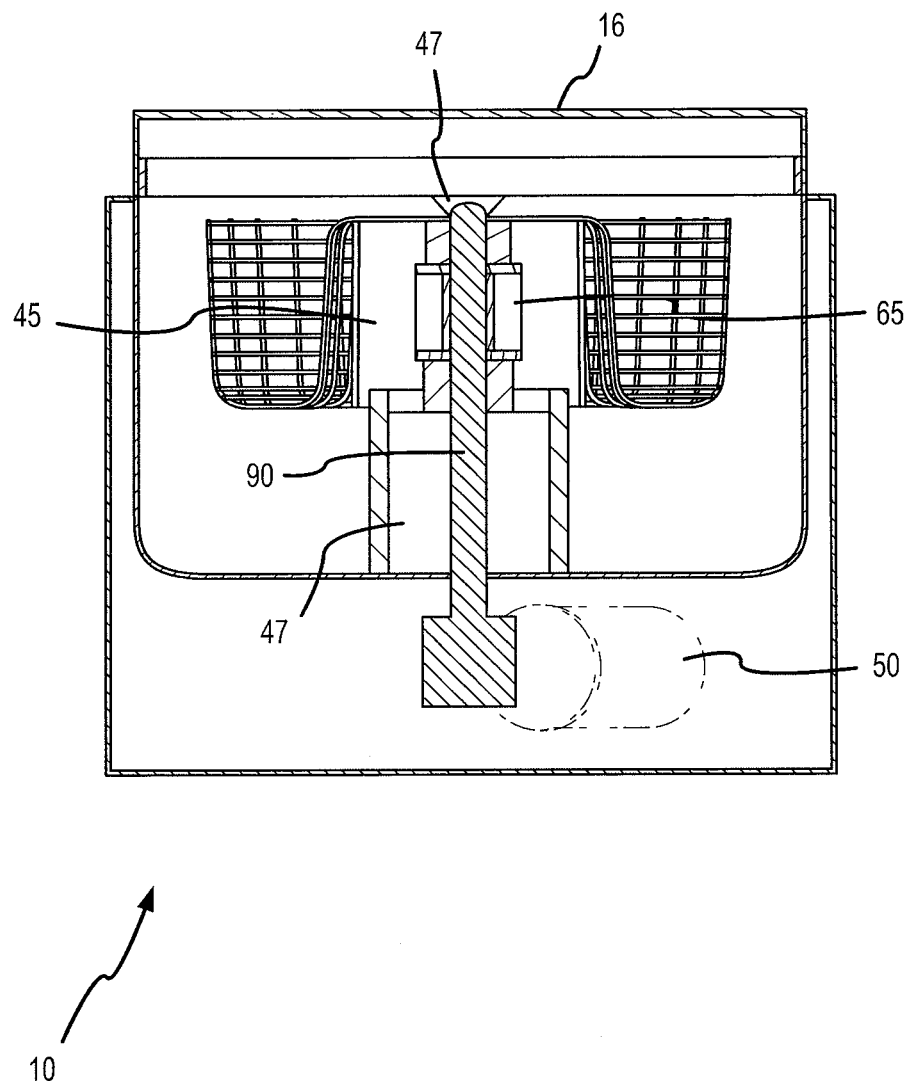
FIG. 2 illustrates a cross-section of a cooking device according to an embodiment of the present invention.

In other embodiments of the invention, other motor configurations are contemplated. With reference to FIG. 2, another embodiment of the present invention is shown. In this embodiment, spin motor 60 is not present within top cover 16; rather, rotational motor 65 is disposed within basket support 45 and/or basket lift mechanism 47. In such an embodiment, basket 40 is capable of rotating both in spinning section 30 and in oil section 20. Spinning may occur in both sections during the same frying process without removing top cover 16.

Figure 8:
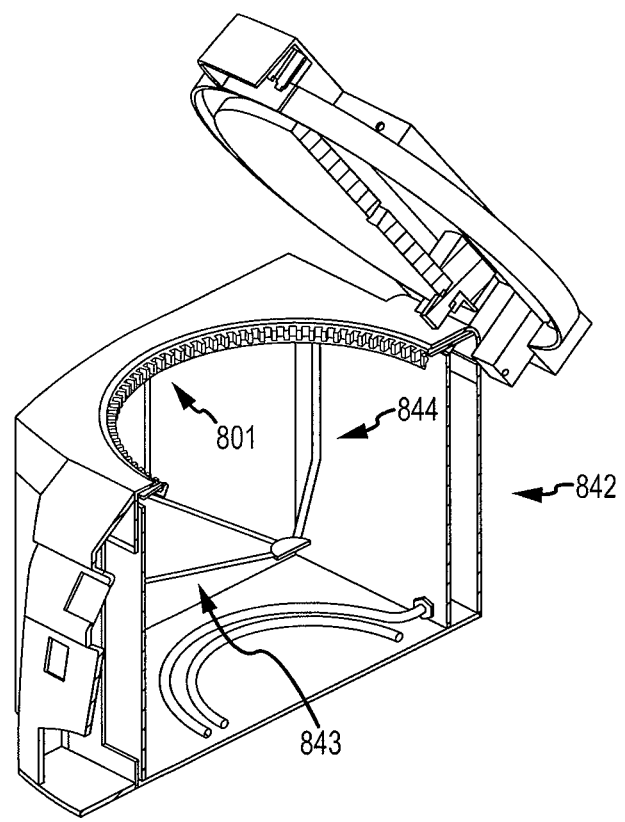
FIG. 8 illustrates a cut-away view of an embodiment of the present invention.
Figure 9:
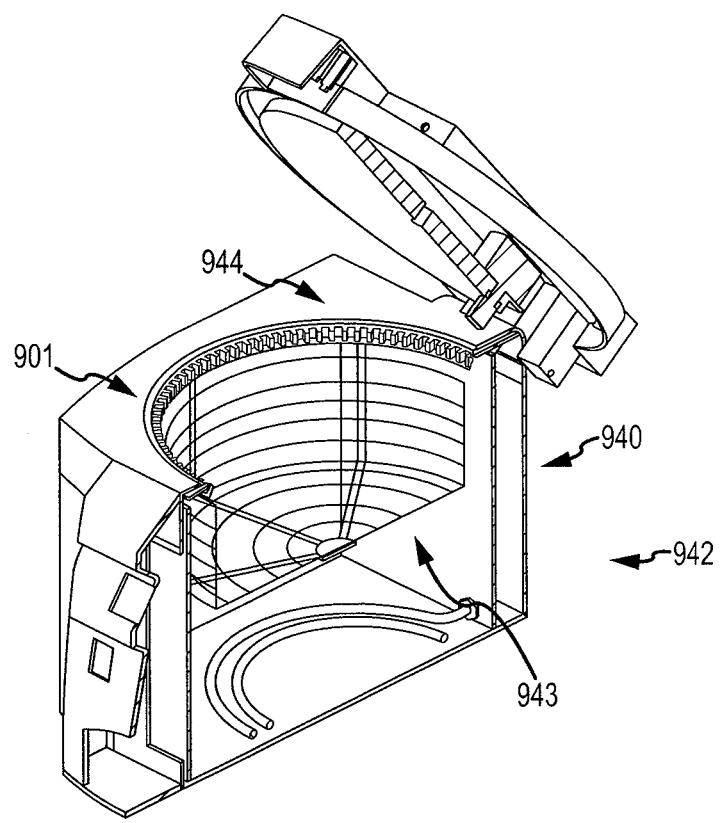
FIG. 9 illustrates a cut-away view of an embodiment of the present invention.
Figure 10A:
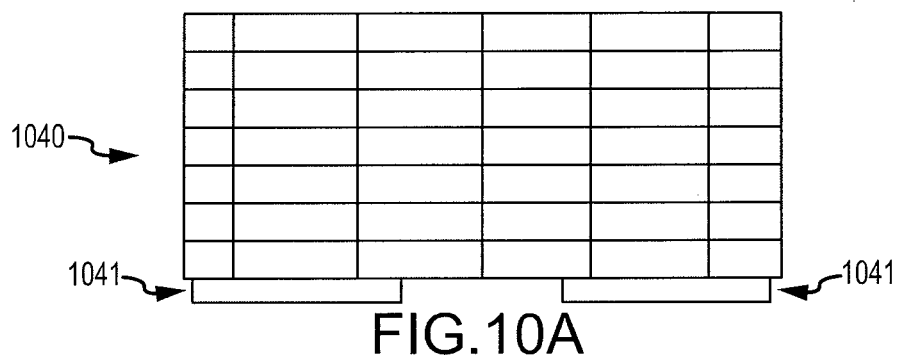
FIG. 10A illustrates a side view of a basket according to an embodiment of the present invention.
Figure 10B:
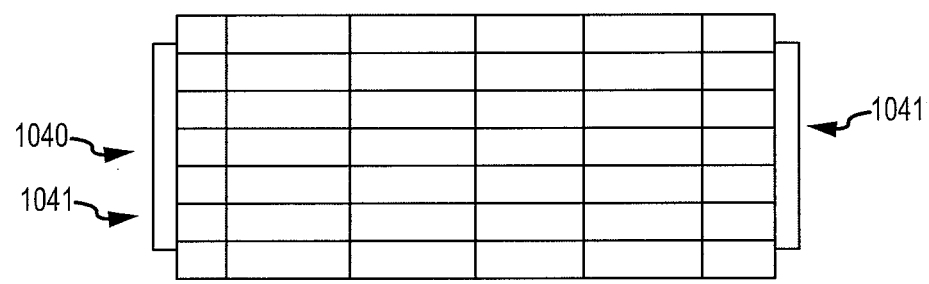
FIG. 10B illustrates a side view of a basket according to an embodiment of the present invention.
Figure 10C:
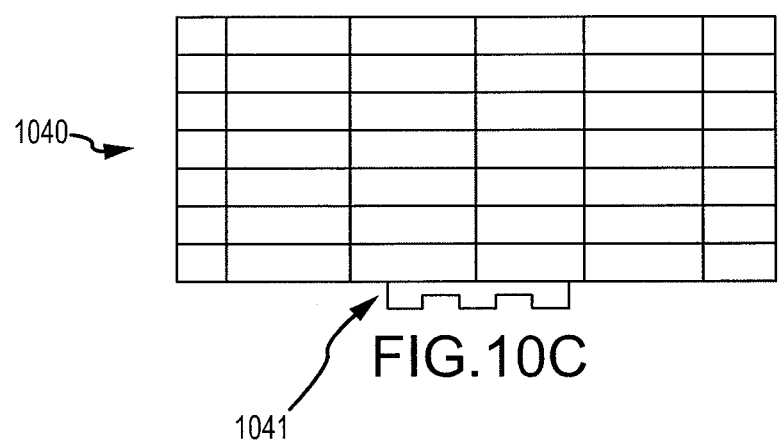
FIG. 10C illustrates a side view of a basket according to an embodiment of the present invention.

In still other embodiments of the invention, further motor configurations are contemplated. For example, with reference to FIGS. 6A-6C and 14, where the basket is configured to nest within basket well 642, a circumferential motor 662 may be configured to interface with basket well 642 in order to rotate basket well 642. With reference also to FIGS. 8 and 9, the basket well may comprise a track 801, 901 comprising a plurality of teeth disposed around the circumference of the basket well. Track 801, 901 may be thus configured to interface with a spinning gear 604 of circumferential motor 662, such that motor 662 causes basket well 642 to rotate when spinning gear 604 rotates in conjunction with track 801, 901. In some embodiments, spinning gear 604 may be configured to have a diameter that is substantially smaller than the diameter of basket well 642. With spinning gear 604 located at the circumference of basket well 642, the space available for cooking food in basket well 642 increases, for example, because neither a drive shaft nor another component is located in the center of the basket well. Basket well 642 may further be configured to rotate in conjunction with bearings, gears, tracks and the like located substantially at the circumference of basket well 642. Such rotation will be discussed further below. Such embodiments do not require a center shaft (such as shaft 90), thereby increasing the room available for frying food in the frying basket.

Figure 12:
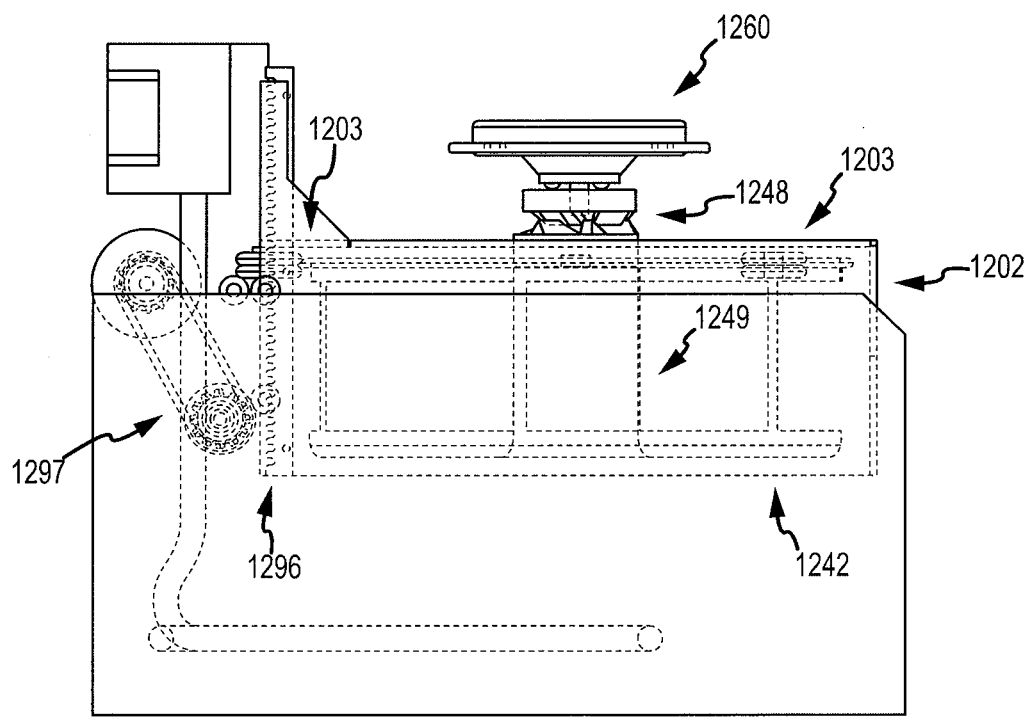
FIG. 12 illustrates a side view of a cooking device according to an embodiment of the present invention.

In a further embodiment, and with reference to FIG. 12, cooking device 1210 may comprise spinning motor 1260 configured to interface with center portion 1249 of basket well 1242 via a basket well gear such as well coupling 1248. Spinning motor 1260 may comprise a spinning gear configured to interface with well coupling 1248. In some embodiments, the spinning gear and the well coupling may comprise substantially the same diameter, and the well coupling and spinning gear may be configured to share an axis of rotation that is substantially the same as the axis of rotation for the basket well. As such, spinning motor 1260 is configured to cause basket well 1242 to rotate about an axis centrally located within basket well 1242 and center portion 1249; however, unlike the embodiment illustrated in FIG. 1, basket well 1242 does not depend, for rotation, on a shaft (like shaft 90) that shares the same axis as the axis about which basket well 1242 rotates. Rather, with reference also to FIGS. 6A-6C, basket well 642 may be configured to rotate in conjunction with bearings, gears, tracks and the like located substantially at the circumference of basket well 642, 1242.

It should be noted that in certain embodiments as discussed above, it may not be necessary to employ a top cover or any other cover to enclose the cooking device. The centrifugal force developed by spinning the basket and/or basket well may be sufficient to maintain the food and oil within the basket such that a cover is not needed.

Figure 6A:
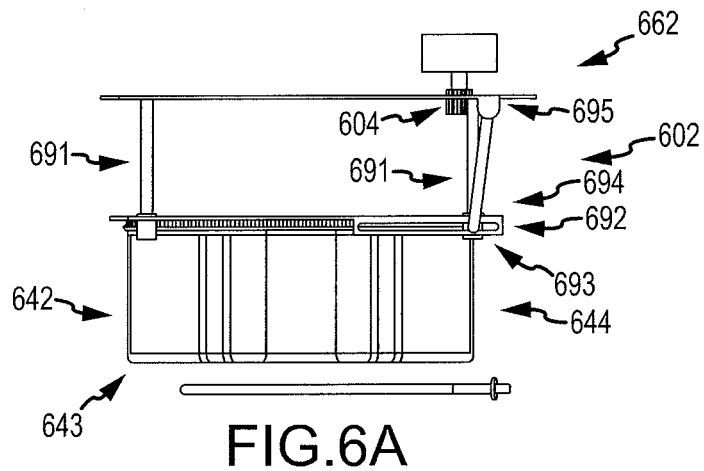
FIG. 6A illustrates a schematic of a portion of a frame section and basket well according to an embodiment of the present invention.
Figure 6B:
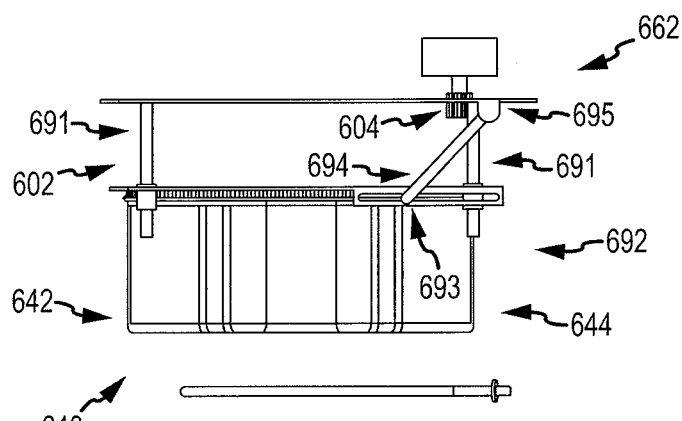
FIG. 6B illustrates a schematic of a portion of a frame section and basket well according to an embodiment of the present invention.
Figure 6C:
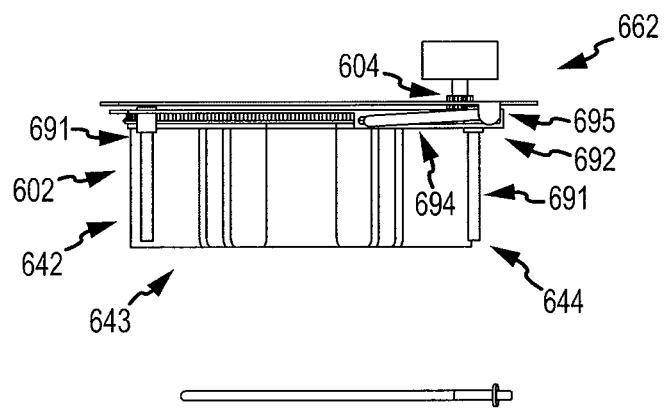
FIG. 6C illustrates a schematic of a portion of a frame section and basket well according to an embodiment of the present invention.
Figure 13:
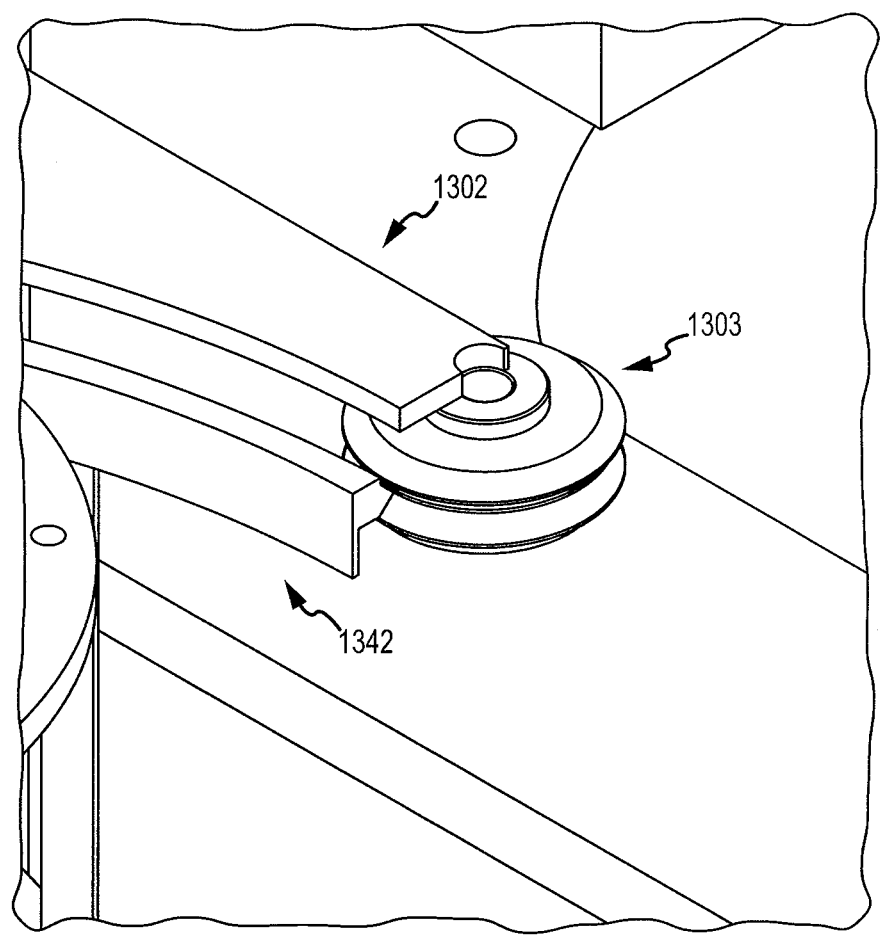
FIG. 13 illustrates a cut-away view of a portion of a frame structure according to an embodiment of the present invention.
Figure 14B:
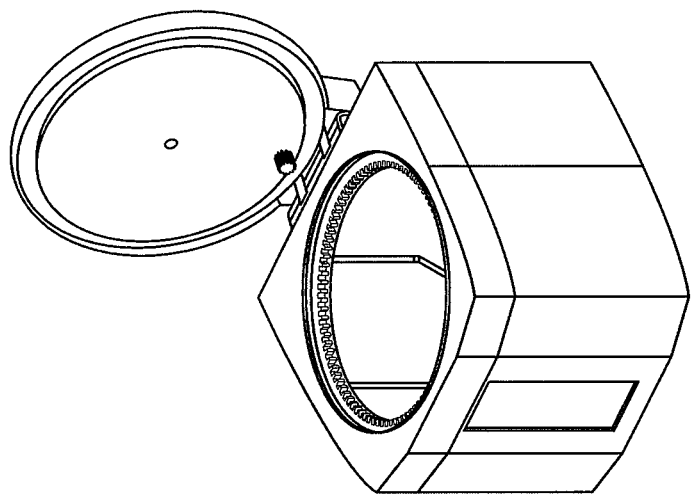
FIG. 14B illustrates a perspective view of a cooking device according to an embodiment of the present invention.
Figure 14A:
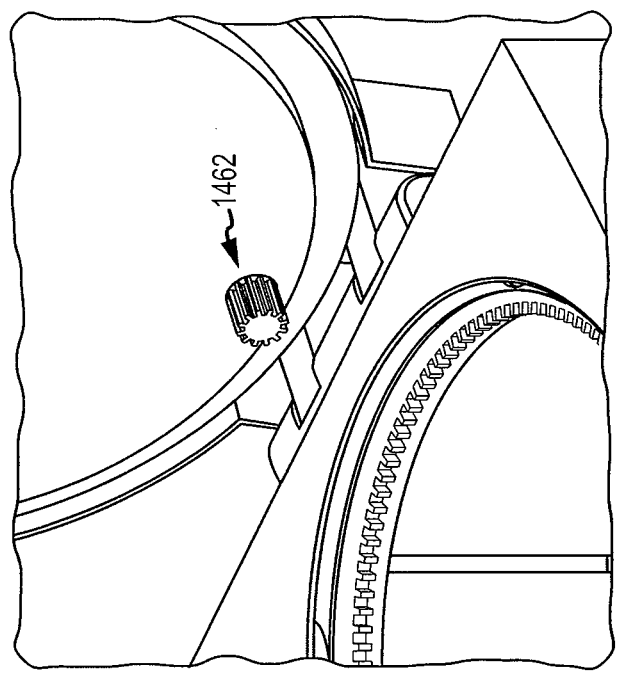
FIG. 14A illustrates a cut-away view of a portion of a cooking device according to an embodiment of the present invention.

According to other embodiments, with continued reference to FIGS. 6A-6C, basket well 642 may be secured to a frame structure 602. Frame structure 602 may be configured to comprise a number of the components disclosed herein as part of the cooking device. For example, with reference also to FIGS. 12 and 13, frame structure 1202, 1302 may comprise a plurality of bearings 1203, 1303. The bearings may comprise grooves that are configured to interface with a bearing surface on basket well 642, 1242, 1342 and to allow rotation of the basket well with respect to the frame structure and the cooking device. In some embodiments, each of the bearings 1203, 1303 may individually comprise a plurality of bearings. For example, bearings 1203, 1303 may each be configured to comprise two horizontally-oriented bearings that abut each other creating a v-shape that receives an inversely-shaped portion of the bearing surface on the basket well. In other embodiments, the portion of the bearing surface on the basket well may be v-shaped, and the plurality of bearings may be configured to receive the v-shaped portion of the bearing surface.

It should be understood that these bearing configurations are only exemplary, and any other rotational mechanism configured to allow rotation of the basket well within the frame structure, including where the rotational mechanism is located substantially at the circumference of the basket well, is contemplated within the scope of the present invention. For example, the frame structure may comprise a male track configured to interface with a female track located on the basket well. In other embodiments, the track on the basket well may be a horizontally oriented track, and the lower side of the horizontally oriented track may be configured to interface with roller bearings located on the frame structure. The frame structure may be movable with, or comprise a portion that is movable with the basket well, such that the basket well and the mechanism for allowing the basket well to rotate may be movable together between the spinning section and the oil section.

Figure 7C:
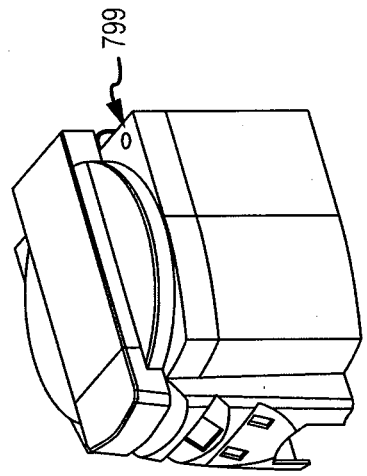
FIG. 7C illustrates a perspective view of an embodiment of the present invention.
Figure 7B:
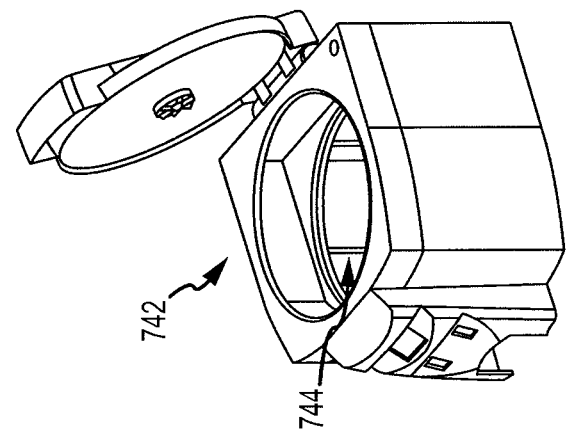
FIG. 7B illustrates a perspective view of an embodiment of the present invention.
Figure 7A:
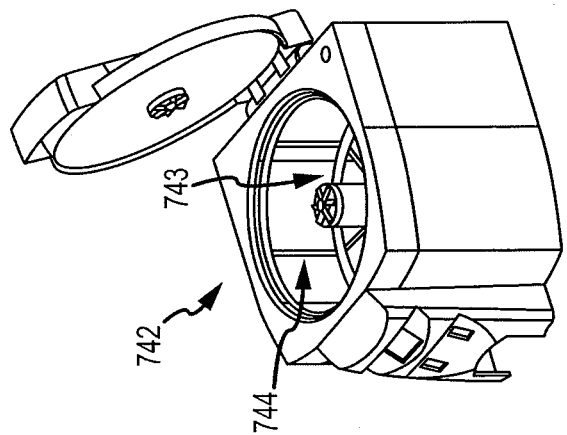
FIG. 7A illustrates a perspective view of an embodiment of the present invention.

Various embodiments configured to allow rotation of the basket well via a circumferentially-located track may be configured to reduce vibration compared to cooking devices that comprise a centrally-located (with respect to the axis of rotation of the frying basket) drive shaft and/or drive guide. Where a central drive shaft is employed and the basket is rotated, vibration may be induced in part due to the lack of support at the circumference of the basket. This condition may be exacerbated if the food basket is out of balance because of the position of the food. In embodiments of the invention, for example as illustrated in FIGS. 6A-9, where a circumferentially located track interfaces with bearings in the frame structure, support is provided at the circumference of the basket. Therefore, when the basket is rotated, vibration is reduced. Such configurations may allow the cooking device of the present invention to be produced in a counter-top version, for example as illustrated in FIGS. 7A-7C. These counter-top versions are configured to provide quieter operation that may be desirable in a home kitchen environment.

Figure 23A:
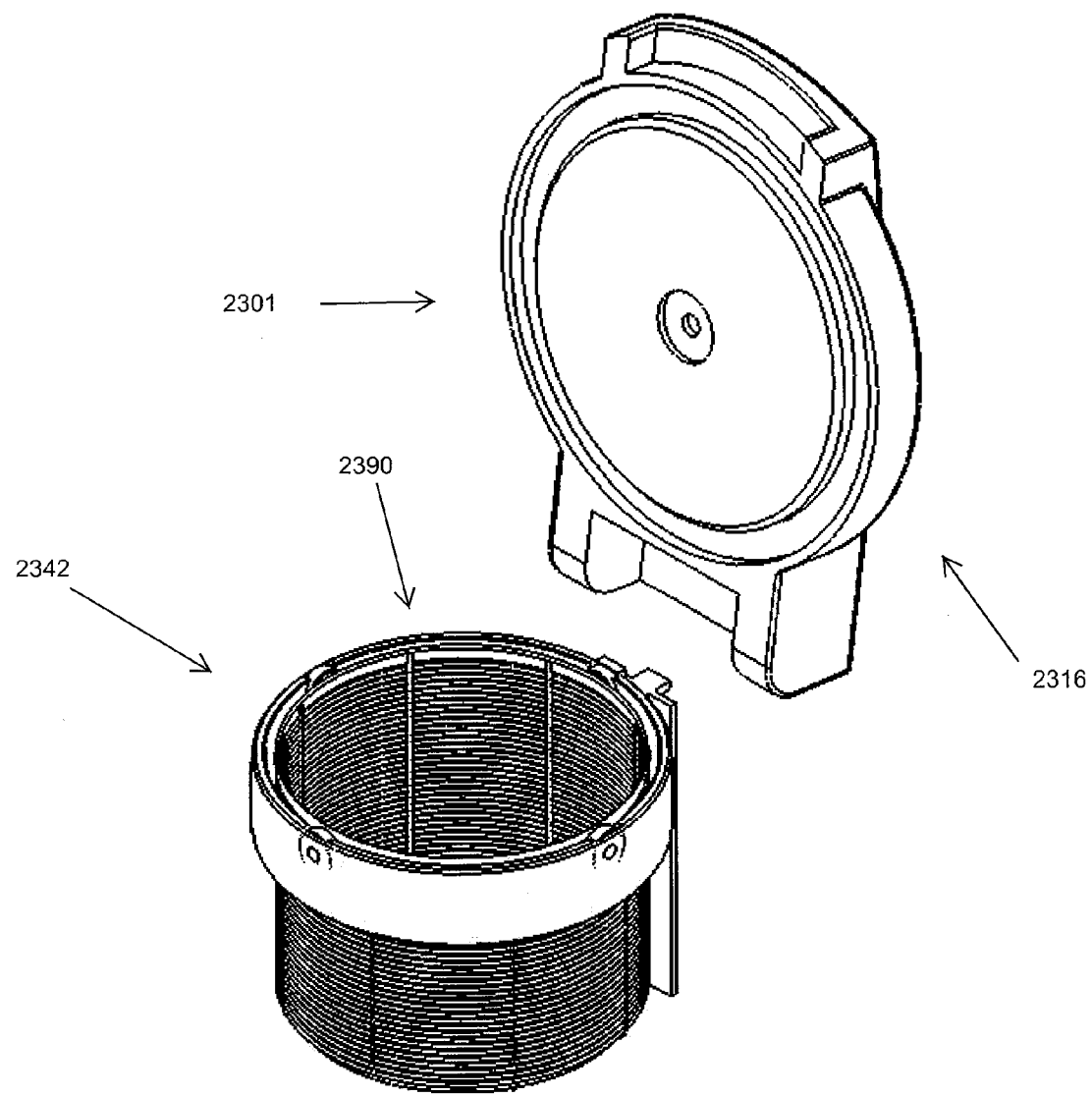
FIG. 23A illustrates an exploded, perspective view of a basket configured to interface with a rotating disk according to an embodiment of the invention.
Figure 23B:
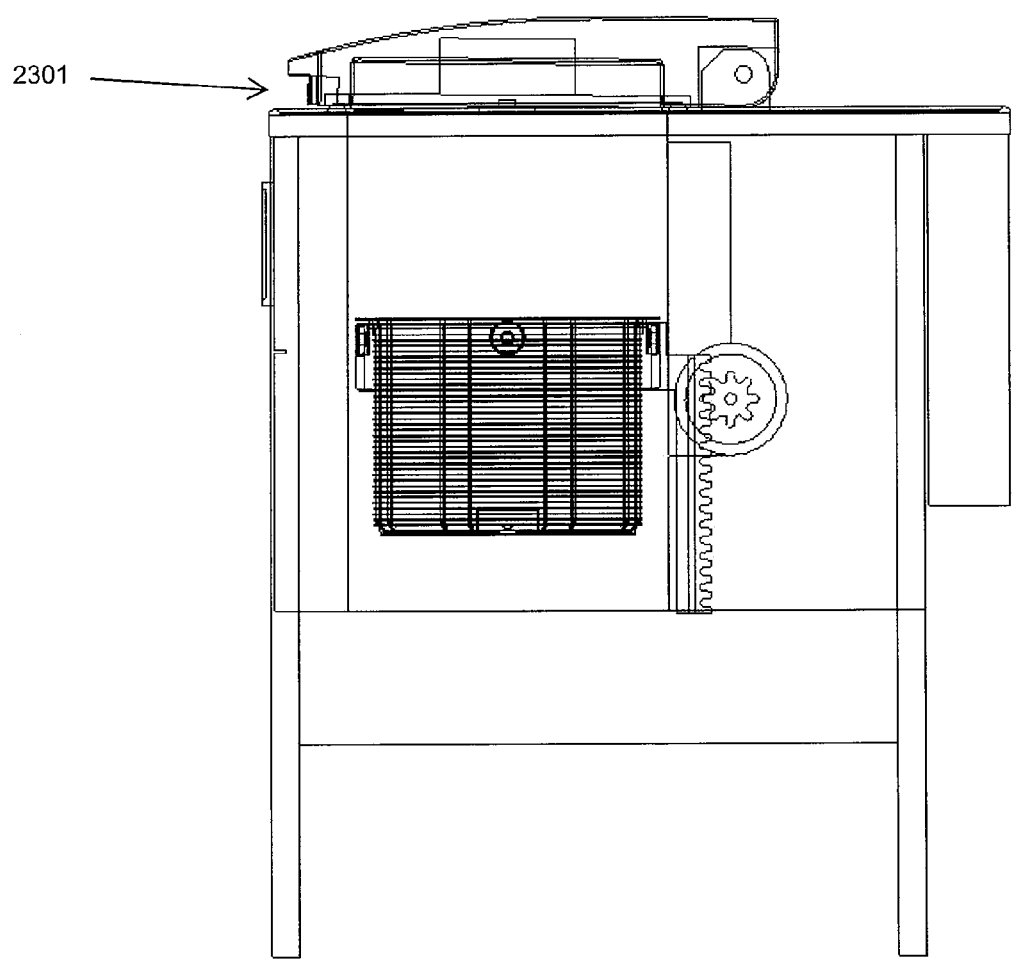
FIG. 23B illustrates a side cross-sectional view of a cooking device comprising a basket configured to interface with a rotating disk according to an embodiment of the invention.
Figure 23C:
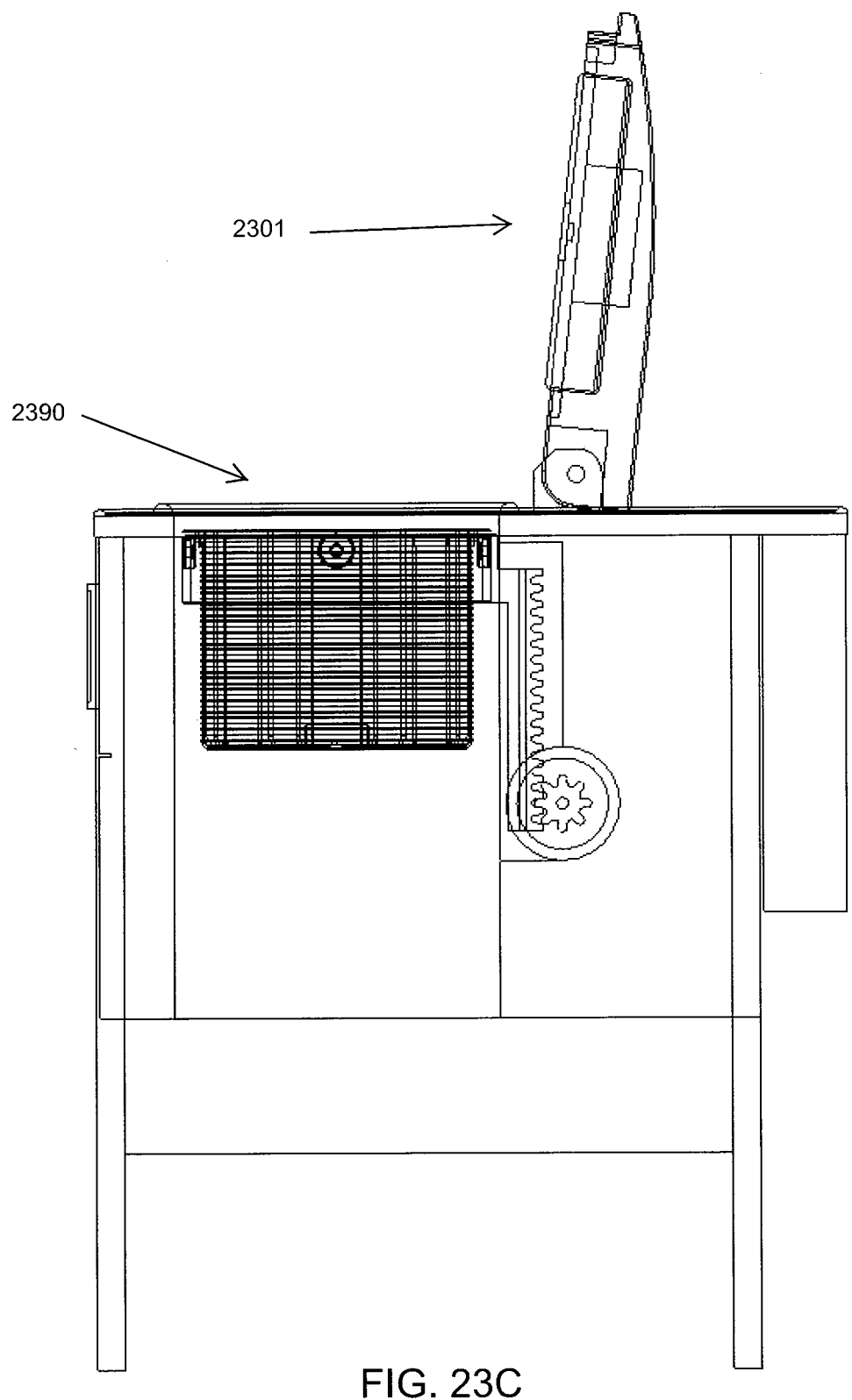
FIG. 23C illustrates a side cross-sectional view of the embodiment illustrated in FIG. 23B.

In accordance with another embodiment, and with reference to FIGS. 23A-23C, cover 2316 may comprise a rotating disk 2301 configured to interface with basket well 2342. Rotating disk 2301 may comprise a diameter substantially equal to the inside diameter of basket well 2342. Rotating disk 2301 may be configured to fit within basket well 2342 such that basket well 2342 may rotate when rotating disk 2301 rotates. Bearings and other structures and/or devices as disclosed herein with respect to the basket well may be used to facilitate rotating basket well 2342. For example, rotating disk 2301 may comprise a gear that mates with a corresponding gear on basket well 2342. Rotating disk 2301 may also be configured to couple with basket well 2342 in a manner that causes a friction-based fit between basket well 2342 and rotating disk 2301, such as where basket well 2342 and/or rotating disk 2301 comprise a gasket. A motor may be disposed within cover 2316 to facilitate rotation of rotating disk 2310. Such a configuration may not require a center shaft to rotate basket well 2342. A center shaft 2390 may still, however, be present to facilitate positioning a cooking basket within basket well 2342. In other embodiments, rotating disk 2301 may be configured to interface directly with the cooking basket.

In embodiments comprising the frame structure, various mechanisms may be employed to facilitate the raising and lowering of the basket well. For example, with reference again to FIGS. 6A-6C, guide shafts 691, may be configured to interface with frame structure 602 in order to facilitate the raising and lowering of the basket. Guide shafts 691 may be configured to pass through the centers of bearings 1203, 1303, and or guide shafts 691 may be configured to be secured to frame structure 602 without passing through the bearings.

In other embodiments, a slider track 692 may be located on a portion of frame structure 602 that is movable between the oil section and the spinning section together with basket well 642. A slider 693 may be positionable within slider track 692 and may be rotatably attached to arm 694, such that when arm 694 rotates about fixed point 695, slider 693 moves horizontally within slider track 692, and slider track 692 and basket well 642 move vertically between the spinning section and the oil section. A motor may be employed at fixed point 695 to facilitate the automated movement of the basket well between the oil section and the spinning section. In other embodiments, arm 694 may be manually movable such that basket well 692 is manually movable between the oil and spinning sections.

According to still other embodiments, and with reference to FIG. 12, basket well 1242 may be movable between the oil and spinning sections by operation of a vertical gear 1296. Vertical gear 1296 may be secured to basket well 1242 or to any other component configured to facilitate the lowering of basket well 1242 out of the spinning section. Vertical gear 1296 may be configured to interface with a motor-gear structure 1297, such that when motor-gear structure 1297 rotates, vertical gear 1296 moves vertically, causing basket well 1242 to move between the oil and spinning sections. For example, motor-gear structure 1297 may comprise a rotary motor that is configured to rotate a gear having a parallel axis of rotation to that of the rotary motor, but that is displaced from the rotary motor. The rotary motor may be configured to rotate the gear by means of a drive belt and/or drive chain. In other embodiments, the rotary motor may comprise a rotary gear or plurality of rotary gears configured to interface directly with vertical gear 1296. As the gear rotates, it causes vertical gear 1296 to move up and down, thereby causing frame structure 1202 and basket well 1242 to also move up and down. In such an embodiment, guide shafts 691 may or may not be employed to guide basket well 1242 between the oil and spinning sections.

In further embodiments, any mechanism may be used to vertically translate the frame structure between the oil and spinning sections (and vice versa) that is now known or hereafter developed. For example, instead of motor-gear structure 1297, a direct drive motor may be employed to interface directly and/or via a gear or series of gears with vertical gear 1296. In still other embodiments, a lead screw may be configured to interface with the bottom of the basket well in order to facilitate movement of the basket well between the oil and spinning sections. In further embodiments, various belts, chains, pulleys, motors, cranks, cams, and the like may be employed to provide the desired movement of the basket well.

In accordance with further embodiments, a lifting plate may be utilized to facilitate moving the basket and/or basket well between the cooking and spinning sections. With reference to FIGS. 24A-24E, basket well 2442 may be operatively coupled to lifting plate 2476. For example, basket well 2442 may be configured to interface with a bearing centrally located in lifting plate 2476 (see, e.g., FIG. 24E) with respect to the axis of rotation of basket well 2442. The bearing may further be configured to maintain basket well 2442 in a given position during rotation of the basket well. Lifting plate 2476 may be coupled to lifting arms 2494 that are configured to raise and lower lifting plate 2479 (see also, for example, FIGS. 25 and 26A-26C). As lifting arms 2494 move vertically, lifting plate 2476 also moves vertically. For example, lifting arms 2494 may be coupled to drive arms 2498. Various mechanisms exist for causing drive arms 2498 to move vertically, and all such mechanisms are contemplated within the scope of the present disclosure. For example, drive arms 2498 may be coupled to a linking member that is in turn coupled to a rotary motor. As the rotary motor turns, the linking member rotates and causes drive arms 2498 to move vertically. Drive arms 2498 may also be coupled to a direct drive motor configured to move drive arms 2498 vertically. It should be noted that lifting plate 2476 may be used in other configurations for raising and lowering basket well 2442 without lifting arms 2494. For example, FIGS. 24D-24E disclose a lead screw mechanism for raising and lowering the basket well.

Lifting arms 2494, according to various embodiments, may facilitate stabilization and reduced vibration of the cooking device. For example, lifting arms 2494 may contact the cooking device at various points, and a bearing, guide, wheel or the like may be used to prevent horizontal and/or sideward movement. A track may further be utilized to allow basket well 2442 and lifting arms 2494 to move vertically, but to substantially prevent other motion. Such a track may be removably mounted to the cooking device. Reducing horizontal movement of basket well 2442 facilitates reduced vibration of the cooking device when the basket well and/or basket is spinning.

With reference to FIGS. 33A-33H, another type of lifting mechanism according to an embodiment of the present invention comprises a lifting plate 3376 that may be secured to a lifting bracket 3394. Lifting bracket 3394 may be rotatably attached to a first linking member 3356. First linking member may be rotatably attached to second linking member 3354, which may be rotatably attached to a rotary motor 3351. Rotary motor 3351 may be located away from the cooking liquid in order to facilitate isolating the motor from the cooking liquid. Rotary motor 3351 may be configured to rotate the second linking member, which in turn may cause the first linking member to rotate. As the first and second linking members rotate, lifting bracket 3394 and lifting plate 3376 may move up or down, depending on the relative rotation of the first and second linking members. Other motors may be used to cause lifting bracket 3394 to move upward. For example, a linear motor may interface with lifting bracket 3394 to facilitate vertical movement of the basket. In other embodiments, a screw-drive motor may also facilitate the vertical movement of the lifting bracket. In still other embodiments, any motor may be used that facilitates the vertical movement of the lifting bracket. In some embodiments, the cooking device may contain two baskets and/or basket wells that are each individually hung on lifting brackets that are individually movable into and out of the cooking liquid.

In accordance with another embodiment, and with reference to FIGS. 32A-32F, the cooking device may comprise a pressure-driven basket lifting mechanism. The cooking device may comprise a piston 3292 that is attached to the basket 3240 and/or the basket well 3242 at one end and that is disposed within a cylinder 3293 at the other end, such that when the piston 3292 moves within the cylinder 3293, the basket is moved from the cooking section to the spinning section. The cylinder 3293 may be pressurized by a pneumatic pump or pressure device 3251.

In other embodiments, where a pneumatic pump may not be present, the cylinder may be configured to be pressurized to a pressure equal to or higher than the pressure within the cooking device when the basket is in the cooking section of cooking device, thereby maintaining the basket in the cooking section. To cause the basket to move from the cooking section to the spinning section, pressure may be released from the cylinder, resulting in a pressure in the cylinder that is lower than the pressure in the cooking device. For example, where the cooking device contains a pressure that is greater than atmospheric temperature (such a where the cooking device is a pressure cooker), the cylinder may comprise a port that facilitates equalization of the pressure in the cylinder and the cooking device. To raise the basket, the port in the cylinder may be closed, and a pressure relief valve may be configured to release pressure from the cylinder only, and not the cooking device. The pressure is then greater in the cooking device than in the cylinder, the piston moves in the cylinder, and the basket is moved from the cooking section to the spinning section.

In accordance with another embodiment, the basket may be moved from the cooking section to the spinning section via a mounting plate that is attached to a jacking screw. The mounting plate may be substantially tangent to one vertical side of the basket and/or the basket well, and the mounting plate may be configured to interface with the jacking screw. In one embodiment, the jacking screw may be located above the basket and/or external to the fryer device. A rotational motor may be configured to rotate a drive shaft that in turn rotates the jacking screw, thereby causing the mounting plate and the basket to be removed from the cooking section. In connection with a mounting plate, a pulley system or other motor configuration may be used to facilitate removal of the basket from the cooking section.

Another embodiment of the present invention comprises a basket that may be held by a basket frame biased toward a position that maintains the basket out of the cooking section. The basket frame may be biased by means of a spring. To facilitate cooking the food in the basket, the basket frame may be forced down into the cooking oil by exerting a force downward. The basket frame may then be held in place by means of a holding rod or other mechanism for holding the basket frame in place. After the food is cooked, the holding rod may be released, and the springs may return the basket frame to its position above the cooking section (e.g., in the spinning section). A damper may be used to slow the speed at which the basket frame returns to its position above the cooking section.

In a further embodiment, a basket in the cooking device may be mounted on a rotatable panel that is movable between a plurality of positions. In one position, the panel may be positioned such that a guide attached to the basket and the panel is positioned under a door from a food reservoir, such that the reservoir may be opened, and the food may fall from the reservoir via the guide into the basket. The panel may then be rotated such that the basket is placed in a cooking section, thereby facilitating cooking the food in the basket. After cooking, the panel may then be rotated such that the basket is out of the cooking section, but the food remains in the basket, over the cooking section, so that the cooking liquid may be removed from the food (e.g., by spinning the basket according to various methods disclosed herein). After the cooking liquid has been removed sufficiently, the panel may be further rotated to result in discharge of the cooked food from the basket.

In a further embodiment, a lift mechanism may be mounted externally to a cooking device. The lift mechanism may include a motor that is configured to pull a pulley cable downward vertically toward the lift mechanism. The pulley cable may be routed over the pulley and connected to a basket via a mounting bracket and/or to a basket well in which the basket is disposed. As the lift mechanism pulls the pulley cable, the basket emerges from the cooking section of the cooking device.

In yet another embodiment, the basket and/or basket well may comprise a lift bar to facilitate lifting the basket out of the cooking liquid and/or removing the basket from the cooking device to discharge the cooked food from the basket. The cooking device may comprise a hook that is configured to interface with the lift bar, and the hook may be actuated by a motor. For example, the hook may be attached to a flexible metal member that passes through a groove in one wall of the cooking device. The groove and basket and/or basket well shapes are configured such that when the flexible metal member moves through the groove, the basket is raised from the cooking liquid and then tilted at an angle such that the cooked food is discharged from the basket. The motor may facilitate movement of the flexible member via a series of linkages, such that when the motor rotates, the linkages fold together and draw the flexible member through the groove toward the motor.

Figure 27A:
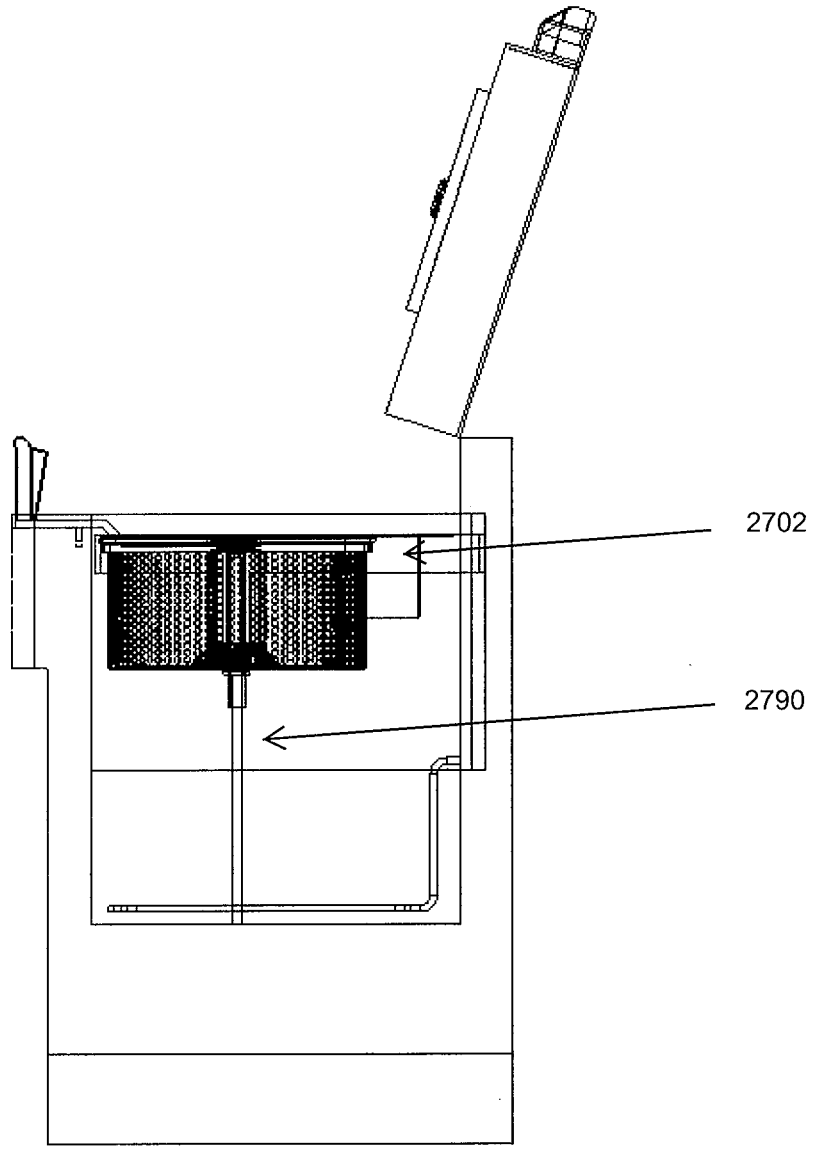
FIG. 27A illustrates a side cross-sectional view of a telescoping shaft in a cooking device according to an embodiment of the invention.
Figure 27B:
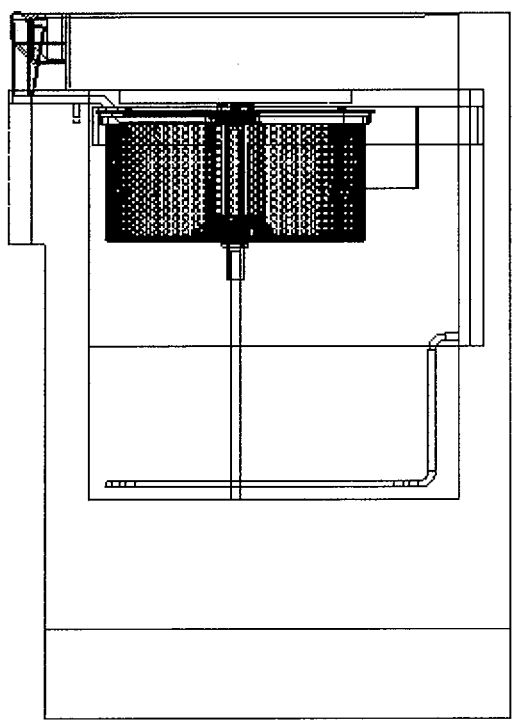
FIG. 27B illustrates a side cross-sectional view of the embodiment illustrated in FIG. 27A.
Figure 27C:
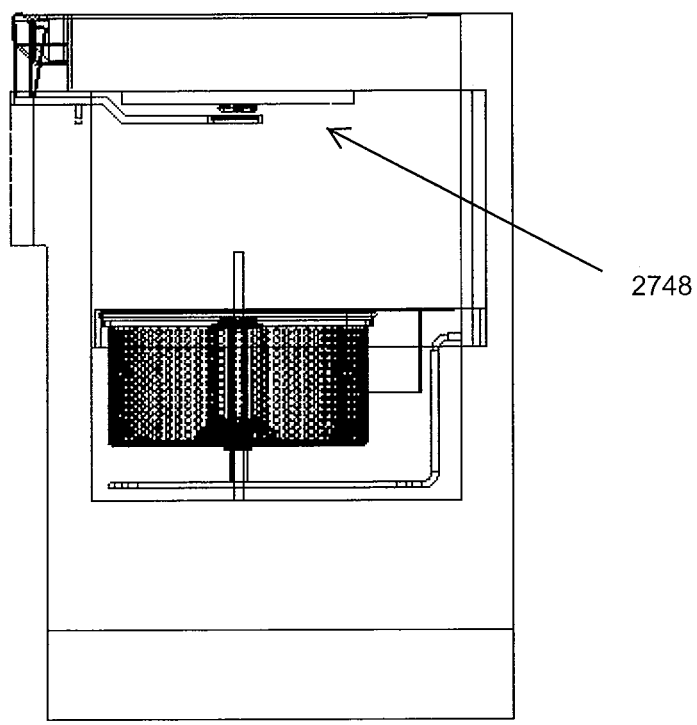
FIG. 27C illustrates another side cross-sectional view of the embodiment illustrated in FIG. 27A.

With reference to FIGS. 27A-27C, a further embodiment of the invention comprises a telescoping shaft 2790 configured to facilitate raising and lowering the cooking basket. In some embodiments, for example where the motor that rotates the basket is disposed in the cover of the cooking device, telescoping shaft 2790 may be configured to facilitate rotation and raising and lowering of the basket. Telescoping shaft may function in cooperation with a frame structure 2702 to facilitate raising and lowering of the basket and/or basket well. For example, a lifting mechanism may be configured to vertically translate frame structure 2702, which may cause telescoping shaft 2790 to expand and/or collapse. Telescoping shaft 2790 may be configured to collapse as the basket is lowered into the cooking section. In other embodiments, and with momentary reference to FIGS. 24A-24C, telescoping shaft 2490 may be configured to collapse when the basket is moved into the spinning section. In such an embodiment, telescoping shaft 2490 may be configured to operate in conjunction with a lifting plate 2476 to facilitate raising and lowering of the basket and/or basket well.

In accordance with various embodiments, the basket may be configured to rotate about an axis defined by the telescoping shaft, and the telescoping shaft may be configured to reduce vibration of the spinning basket. In embodiment as illustrated in FIGS. 27A-27C, the basket and/or basket well may be configured to interface with a drive coupling 2748 when the basket is raised in the spinning section. The drive coupling may facilitate coupling the telescoping shaft, basket, and/or basket well to a motor disposed in the cover, and may thus facilitate rotation of the basket and/or basket well. In still other embodiments, the telescoping shaft may also function as the drive shaft for the cooking device. It should be understood that the telescoping shaft may be used in conjunction with various motor and/or cooking device configurations, such as those configurations disclosed herein.

Figure 28A:
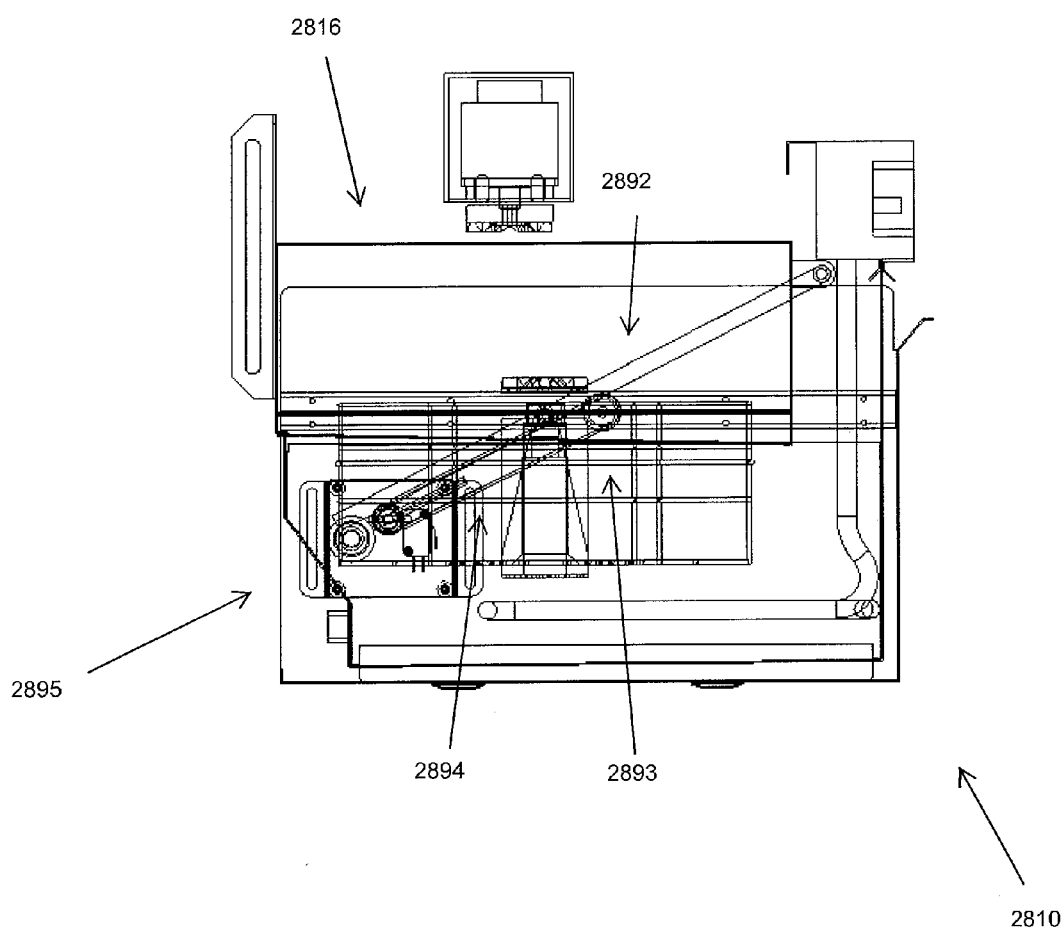
FIG. 28A illustrates a side cross-sectional view of a cooking device with a cam lift mechanism according to an embodiment of the invention.
Figure 28B:
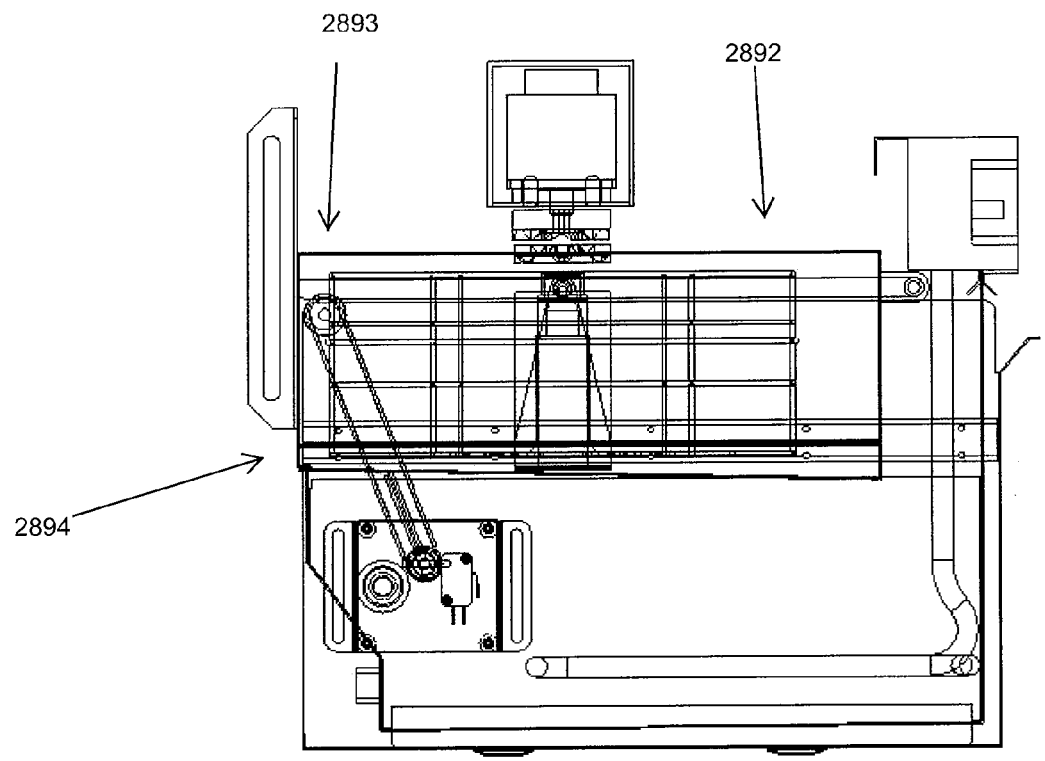
FIG. 28B illustrates a side cross-sectional view of the embodiment illustrated in FIG. 28A.
Figure 28C:
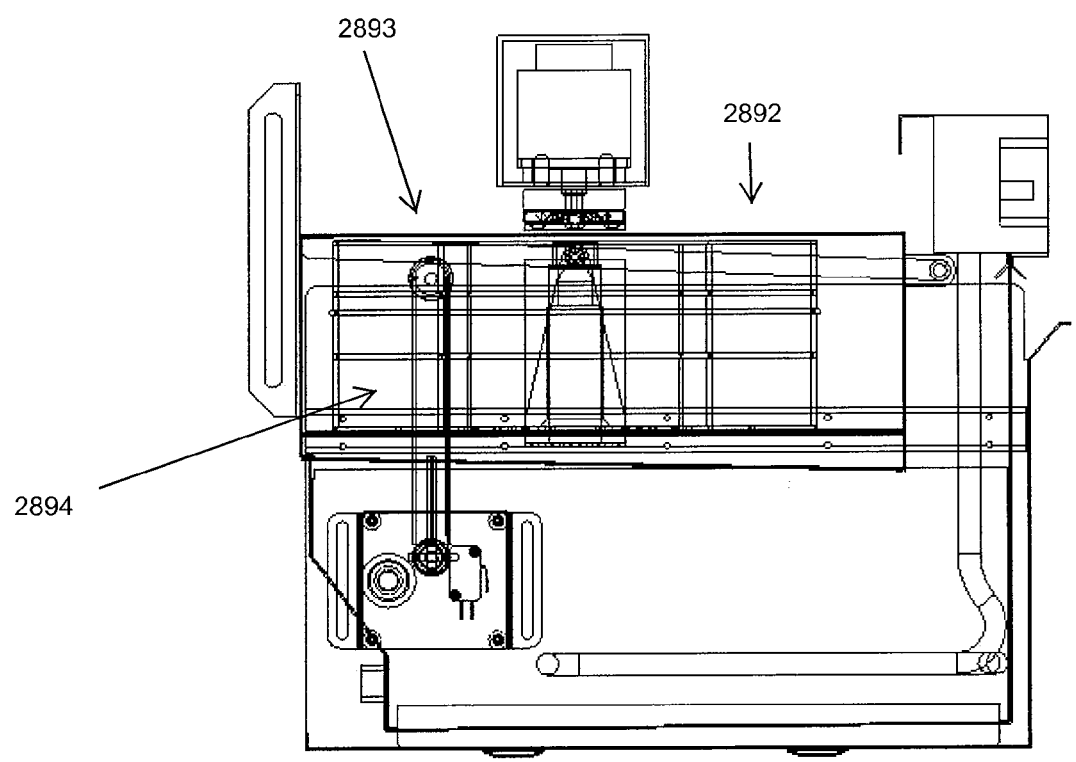
FIG. 28C illustrates a side cross-sectional view of the embodiment illustrated in FIG. 28A.

With reference to FIGS. 28A-28C, various embodiments comprise a cam configuration that facilitates raising and lowering the cooking basket. For example, a lifting bar 2892 may be rotatably attached at one end to cover 2816 of cooking device 2810. At another point along lifting bar 2892, the lifting bar may be rotatably attached at a point substantially at an axis of rotation of the cooking basket, and the lifting bar may be attached at this point on the basket well and/or on a corresponding frame structure. A cam 2894 may be operatively coupled to the lifting bar 2892 at one end and to a motor 2895 at the other end. A wheel, gear and/or bearing 2893 may facilitate the coupling of cam 2894 to lifting bar 2892. Motor 2895 may be a rotational motor configured to cause cam 2894 to move in a rotational manner. As illustrated in FIG. 28A, the cooking basket may be located in the cooking section of cooking device 2810. Motor 2895 may cause cam 2894 to move in a counter-clockwise direction, which in turn causes lifting bar 2892 to rotate in a clockwise direction, thereby causing the cooking basket to move out of the cooking section and into the spinning section. FIGS. 28B and 28C illustrate further positions of the cooking basket through a movement of cam 2894. Cam 2894 may then move in a clockwise direction in order to facilitate moving the cooking basket from the spinning section into the cooking section.

Figure 24A:
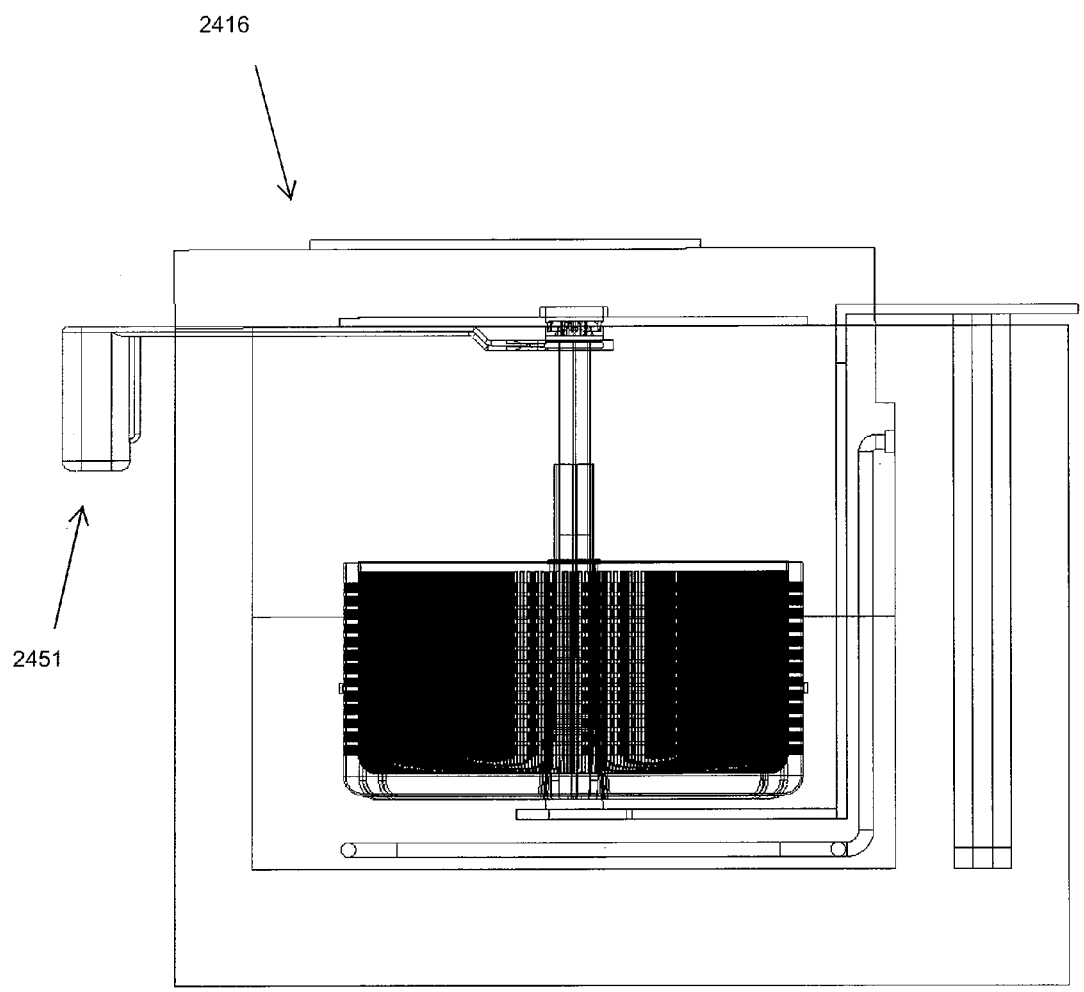
FIG. 24A illustrates a side cross-sectional view of a cooking device comprising a telescoping shaft in a cooking device according to an embodiment of the invention.
Figure 24B:
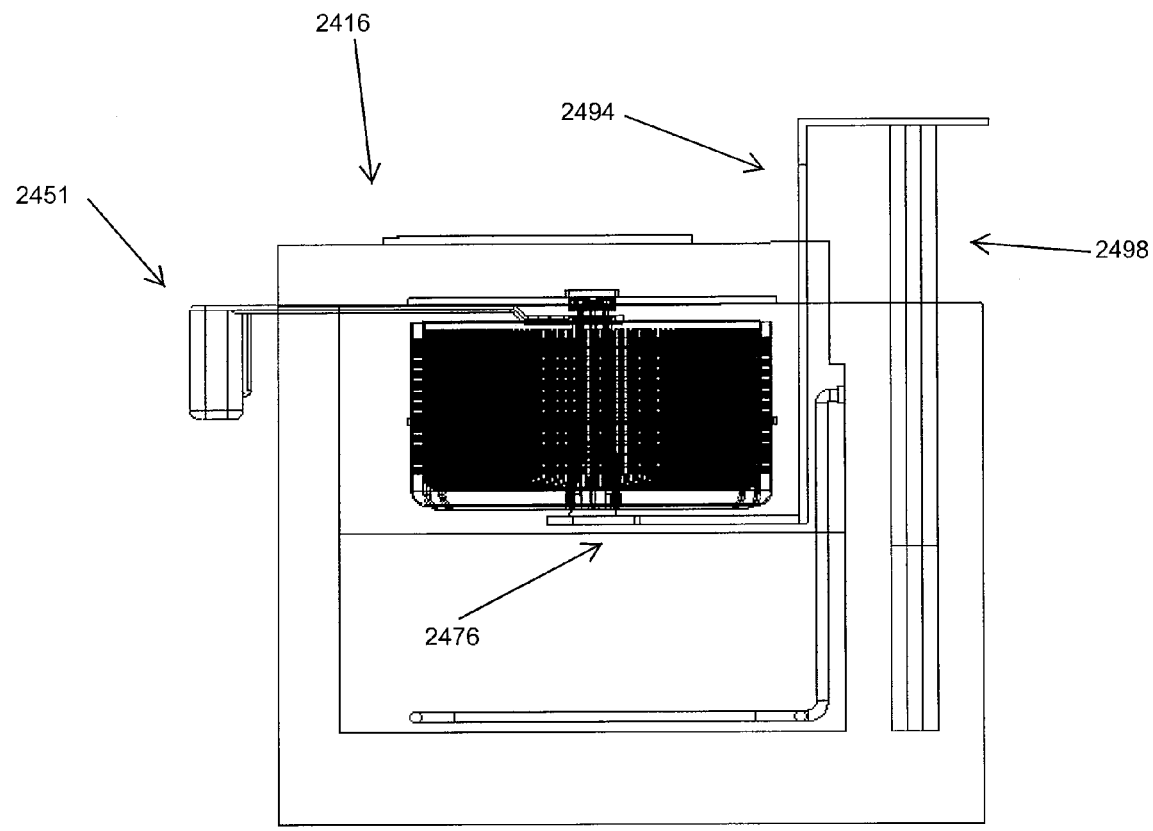
FIG. 24B illustrates a side cross-sectional view of the embodiment illustrated in FIG. 24A.
Figure 24C:
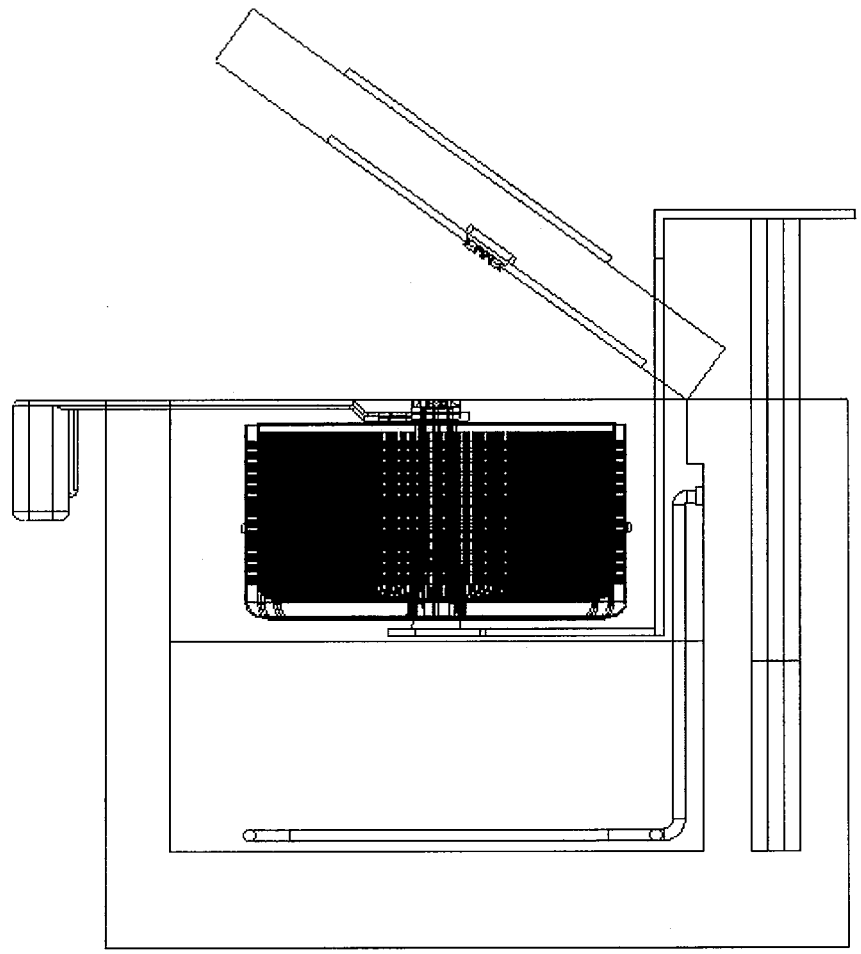
FIG. 24C illustrates a side cross-sectional view of the embodiment illustrated in FIG. 24A.
Figure 24D:
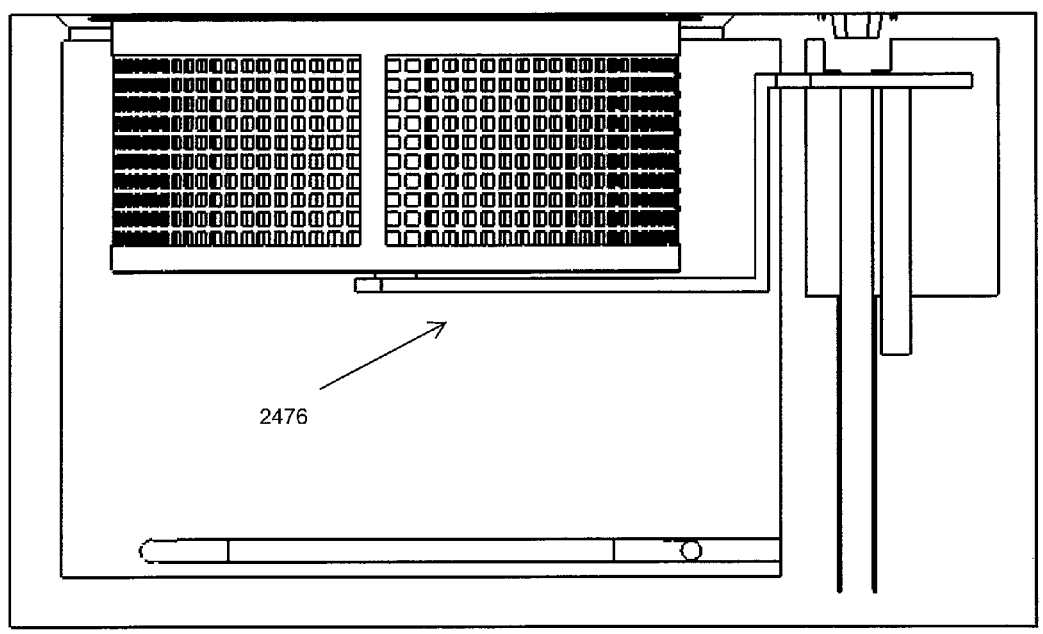
FIG. 24D illustrates a side cross-sectional view of a cooking device comprising a telescoping shaft and a screw drive mechanism in a cooking device according to an embodiment of the invention.
Figure 24E:
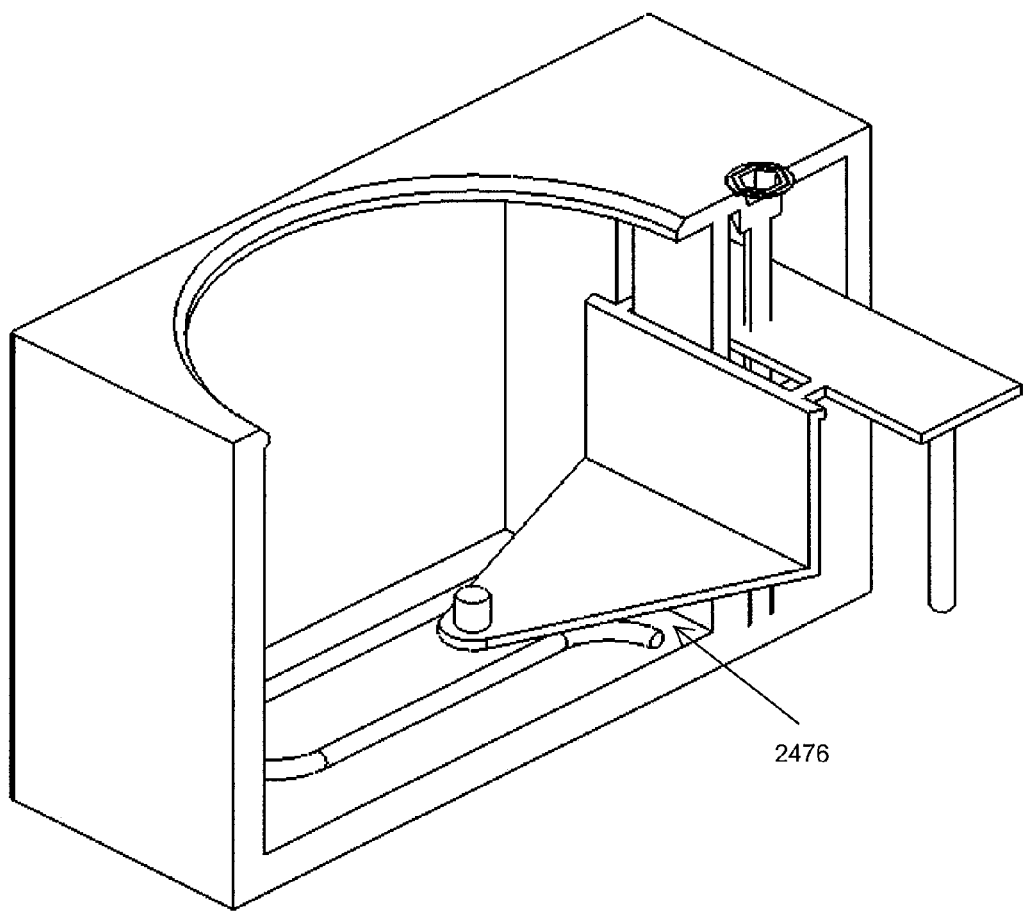
FIG. 24E illustrates a cut-away, perspective view of a lifting plate in a cooking device according to an embodiment of the invention.
Figure 25A:
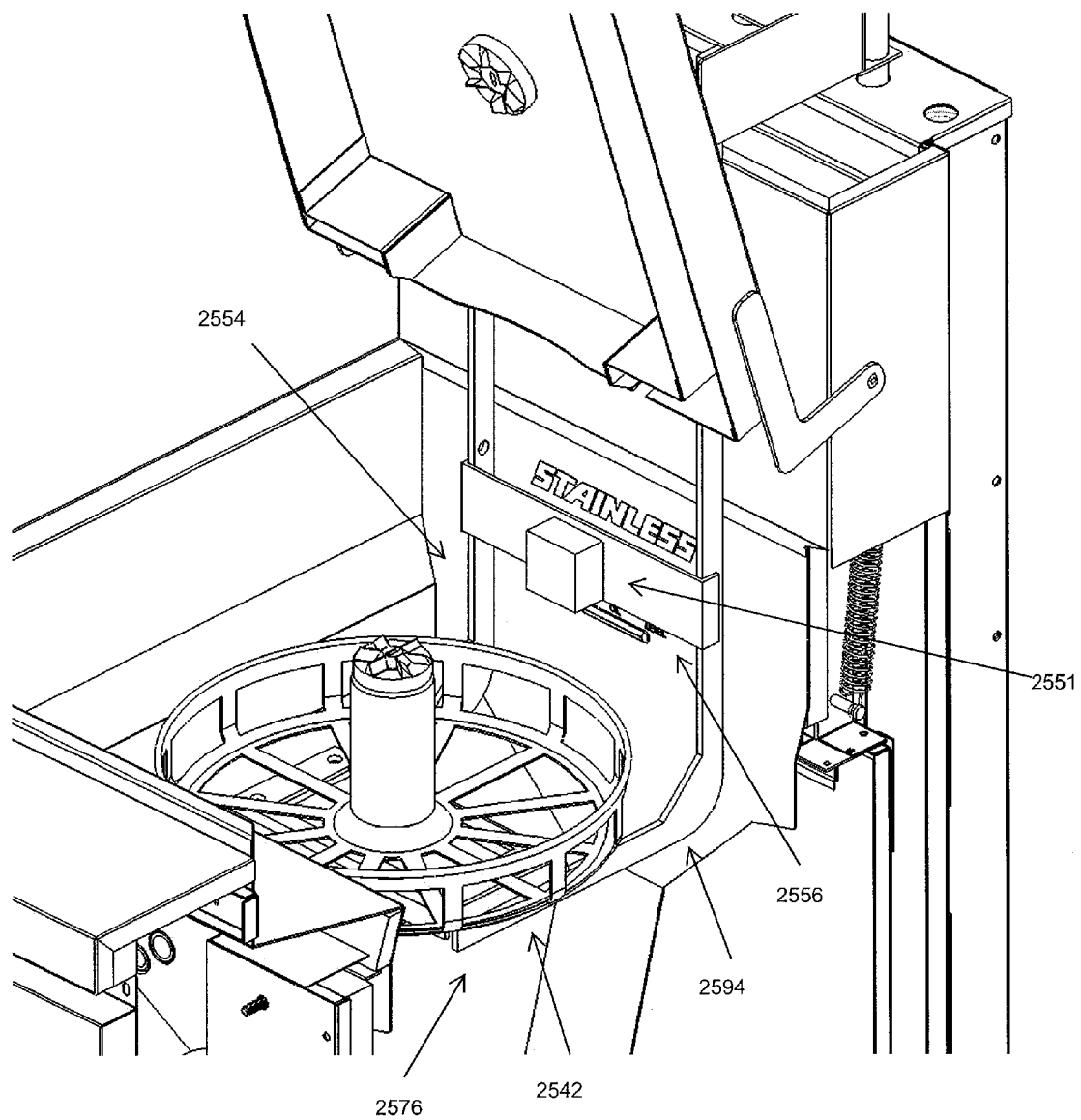
FIG. 25A illustrates a cut-away, perspective view of a cooking device comprising an agitation motor according to an embodiment of the invention.
Figure 25B:
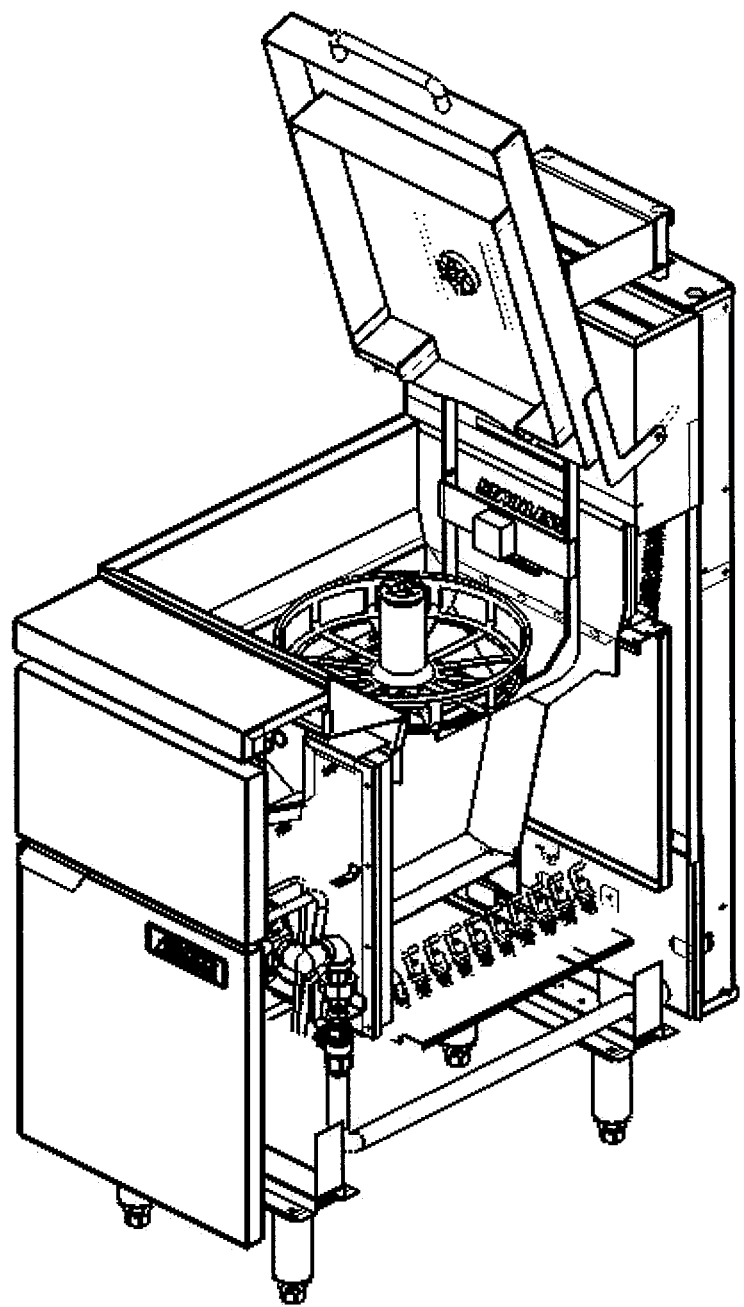
FIG. 25B illustrates a cut-away perspective view of the embodiment illustrated in FIG. 25A.
Figure 26A:
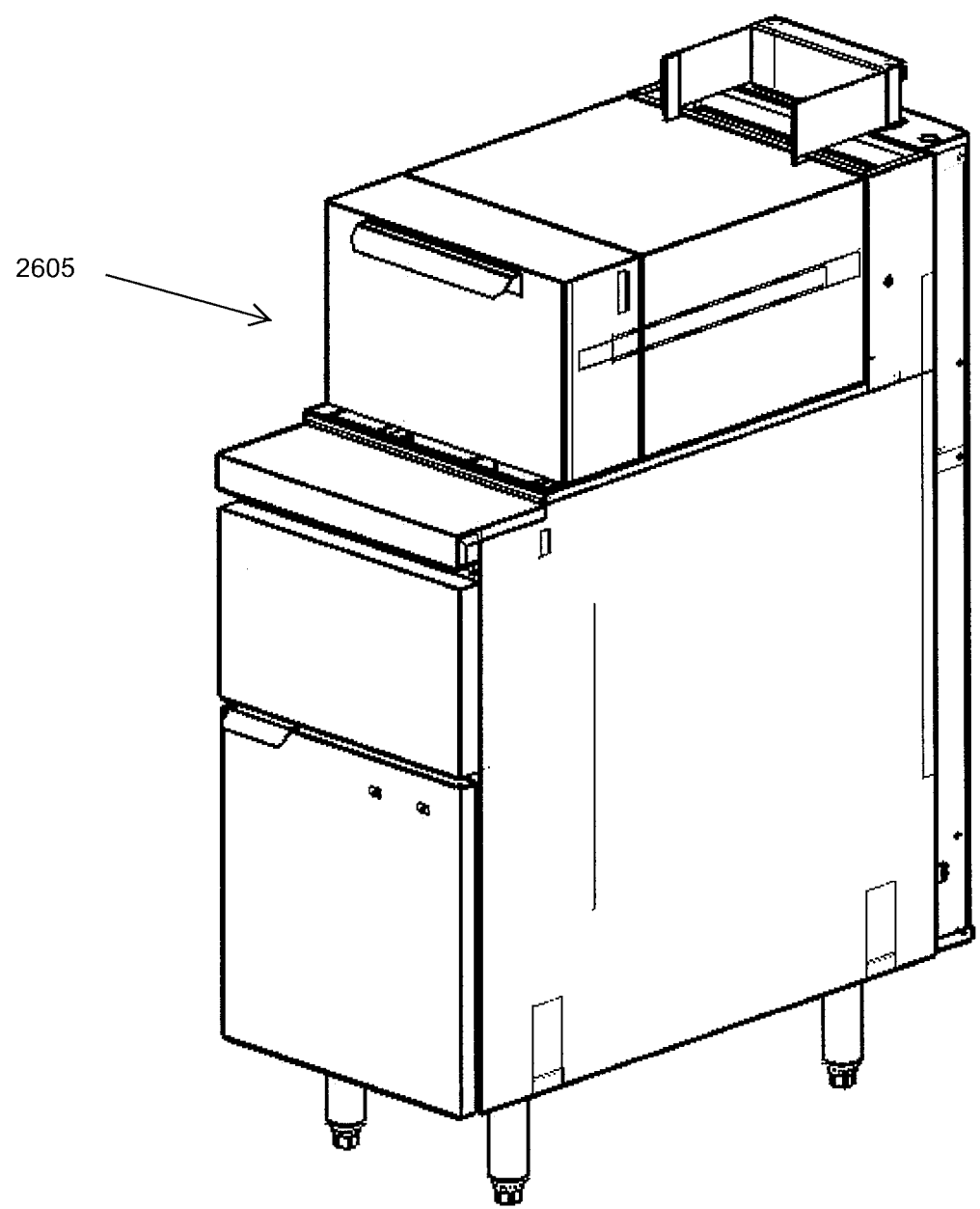
FIG. 26A illustrates a perspective view of a cooking device with a drawer according to an embodiment of the invention.
Figure 26B:
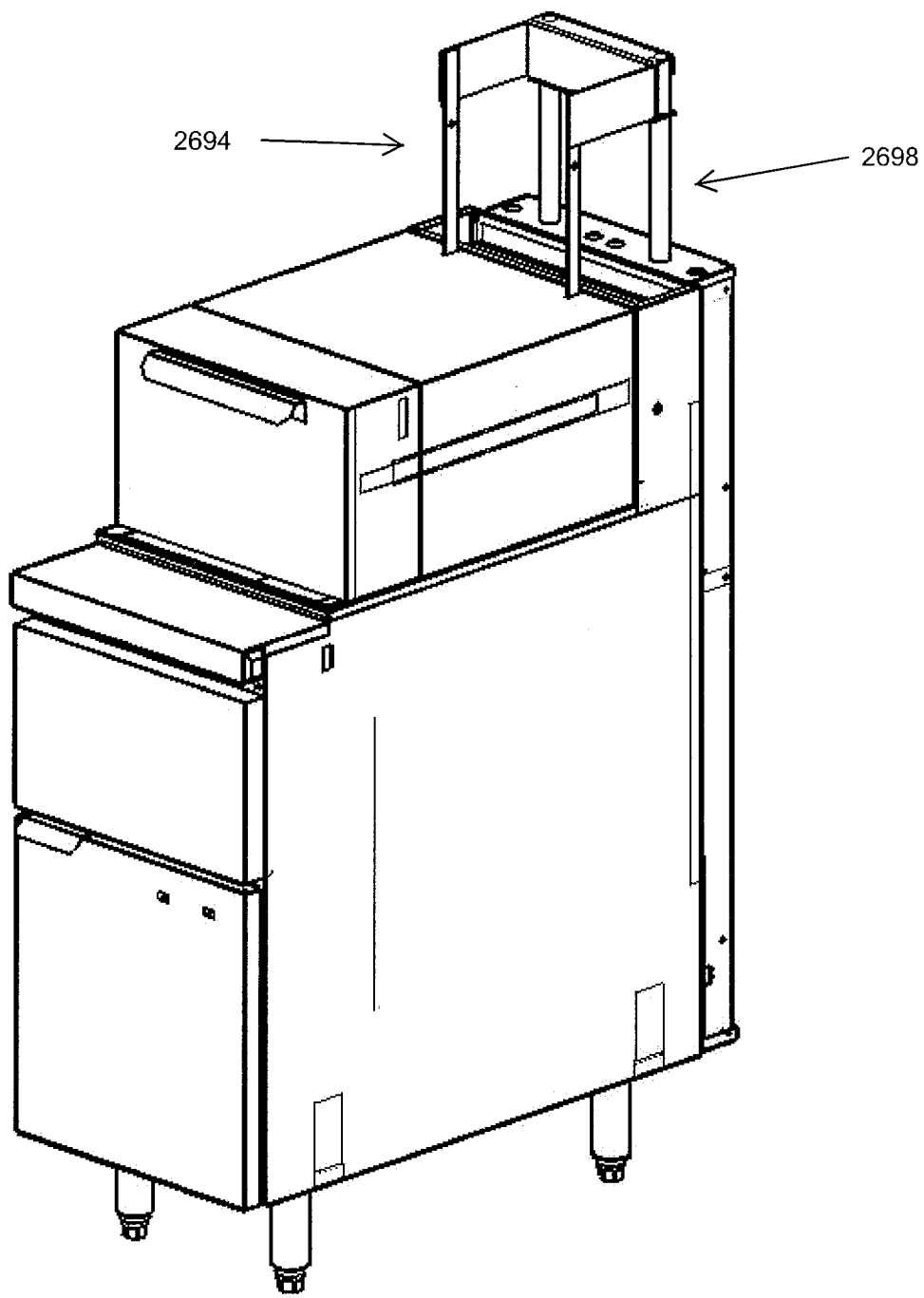
FIG. 26B illustrates a perspective view of the embodiment illustrated in FIG. 26A.
Figure 26C:
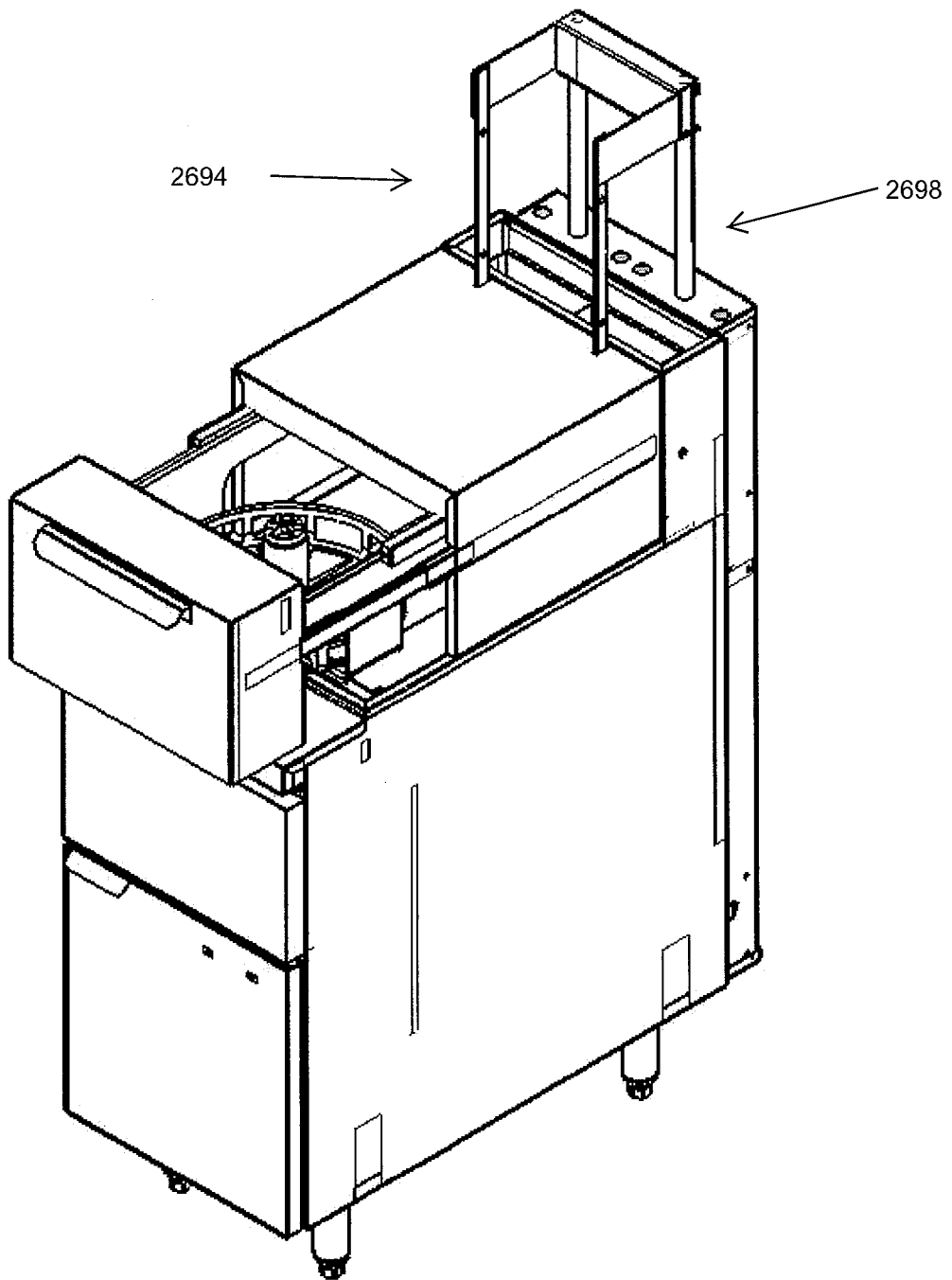
FIG. 26C illustrates another perspective view of the embodiment illustrated in FIG. 26A.

In accordance with various embodiments, and with reference back to FIGS. 24A-24C, cooking device 2410 may comprise a gripping handle 2451 configured to interface with basket 2440 and/or telescoping shaft 2490. Gripping handle 2451 may extend to the outside of cooking device 2410, such that a user may operate gripping handle 2451 during a cooking operation (e.g., when cover 2416 is closed). For example, with reference to FIG. 24A, where basket 2440 is in the cooking section, gripping handle 2451 may be configured to grip telescoping shaft 2490. In a such a gripped position, gripping handle 2451 may be configured to cause basket 2440 to rotate and/or agitate. Such rotation and/or agitation, as discussed further below, may facilitate cooking and/or preventing sticking of the cooked food to basket 2440 and/or to other cooked food in basket 2440. With reference to FIG. 24C, where basket 2440 is in the spinning section, gripping handle 2451 may be configured to grip basket 2440 and/or telescoping shaft 2440. In such a configuration, gripping handle 2451 may be configured to facilitate agitation of basket 2440. In other embodiments, gripping handle 2451 may facilitate removing basket 2440 from cooking device 2410 in order to remove the cooked food from the cooking device. It should be noted that the gripping handle may be employed with various embodiments of the invention, and it may not be necessary to have a telescoping shaft in order to employ the gripping handle.

With reference back to FIG. 1, when starchy and/or battered foods are deep fried, they tend to stick together if they are not agitated and/or mixed during frying. Causing basket 40 to spin while in oil section 20 agitates and/or mixes the food within basket 40 and thereby discourages the food from sticking together. Spinning basket 40 within oil section 20 further facilitates the frying process by mixing the oil and thereby redistributing the heat throughout oil section 20. An agitation motor, such as rotational motor 65 may also be used to agitate basket 40 in oil section 20 by periodically switching directions of the rotation of basket 40. For example, rotational motor 65 can turn basket 40 for one-half of a rotation and then switch directions and turn basket 40 in the reverse direction for one-half of a rotation. In other embodiments, rotational motor 65 agitates, rotates, or otherwise moves basket 40 in spinning section 30. In various embodiments, rotational motor 65 may be powered by batteries, direct current, alternating current, solar power, gasoline, and the like.

According to other embodiments of the invention, linear motor 50 is operable to induce agitation in basket 40 while basket 40 is in oil section 20. For example, linear motor 50 may repeatedly move basket 40 up and down through a certain displacement, such as through a one-half inch displacement. These movements result in the food in basket 40 being agitated and/or mixed such that the food does not stick together and such that the food cooks more efficiently. Another embodiment of the invention comprises a cam that is operable to produce the desired vibratory agitation. Thus, according to these embodiments, basket 40 is capable of being rotated both within spinning section 30 and within oil section 20 during the same frying process for an item of food without opening top cover 16. Leaving top cover 16 closed between the frying and spinning processes decreases temperature loss from the food and increases the desirable characteristics of the food.

Various embodiments of the present invention allow different combinations of motors to produce the desired rotation, translation, and/or agitation of basket 40. For example, linear motor 50 may be the only motor, rotational motor 65 may be the only motor, and spin motor 50 may be the only motor. When only one motor is present in cooking device 10, that motor may be capable of providing all of the desired movement and/or a certain number of the desired movements. In certain embodiments, rotational motor 65 is operable to move basket 40 between sections, to rotate basket 40 in both sections, and to agitate basket 40 in oil section 20. In other embodiments, two motors may be used, and in still other embodiments, more than two motors may be used, for example, one motor each for agitation, translation, and rotation. In still other embodiments, a single motor may be employed to accomplish agitation, translation, and/or rotation. Motors may also be used to open and/or close the fryer cover and/or drawer. Further embodiments allow for manual user intervention to provide any of the desired rotation, translation, agitation and/or operation of other components.

Figure 29A:
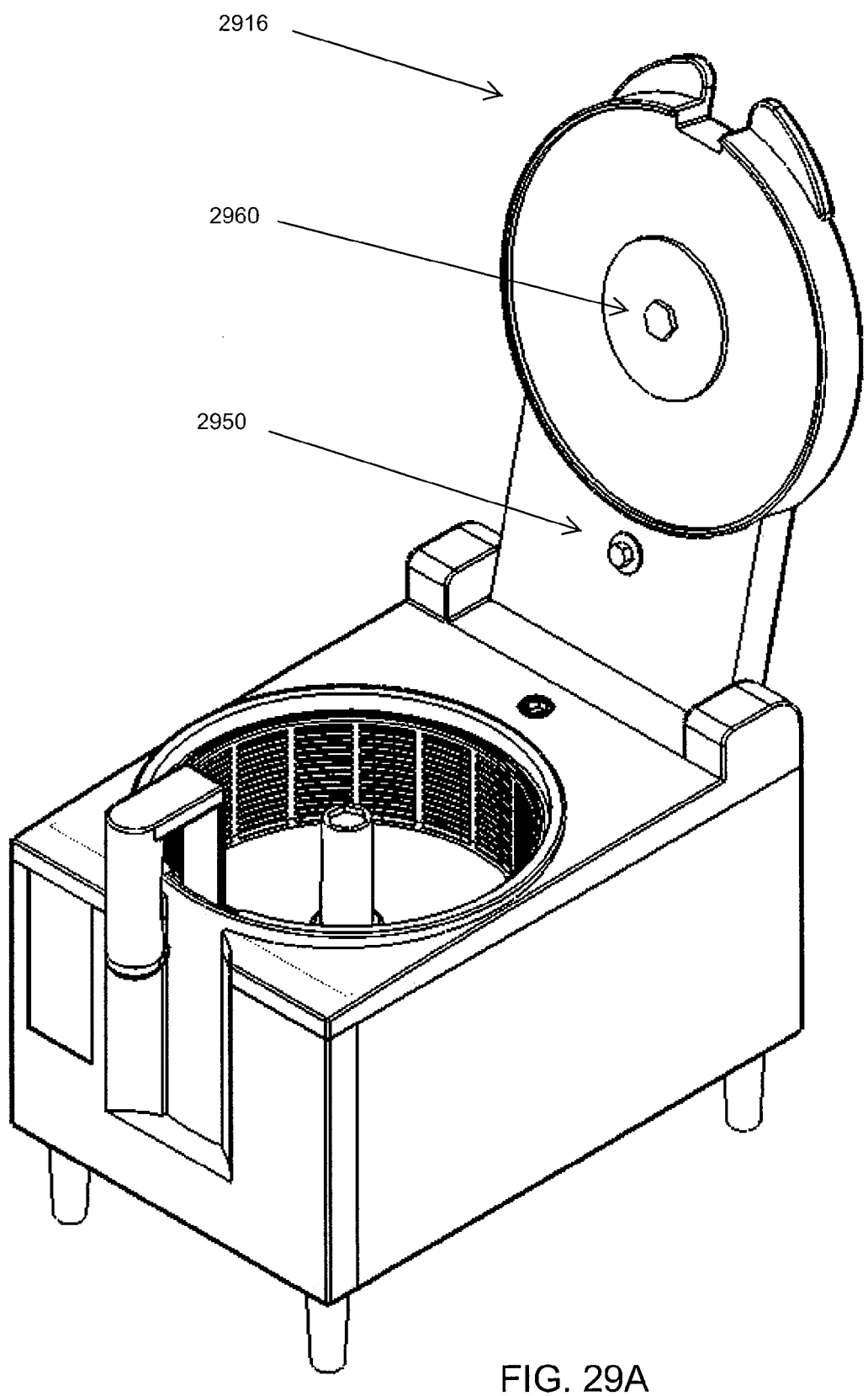
FIG. 29A illustrates an exploded, perspective view of a dual motor configuration in a cooking device according to an embodiment of the invention.
Figure 29B:
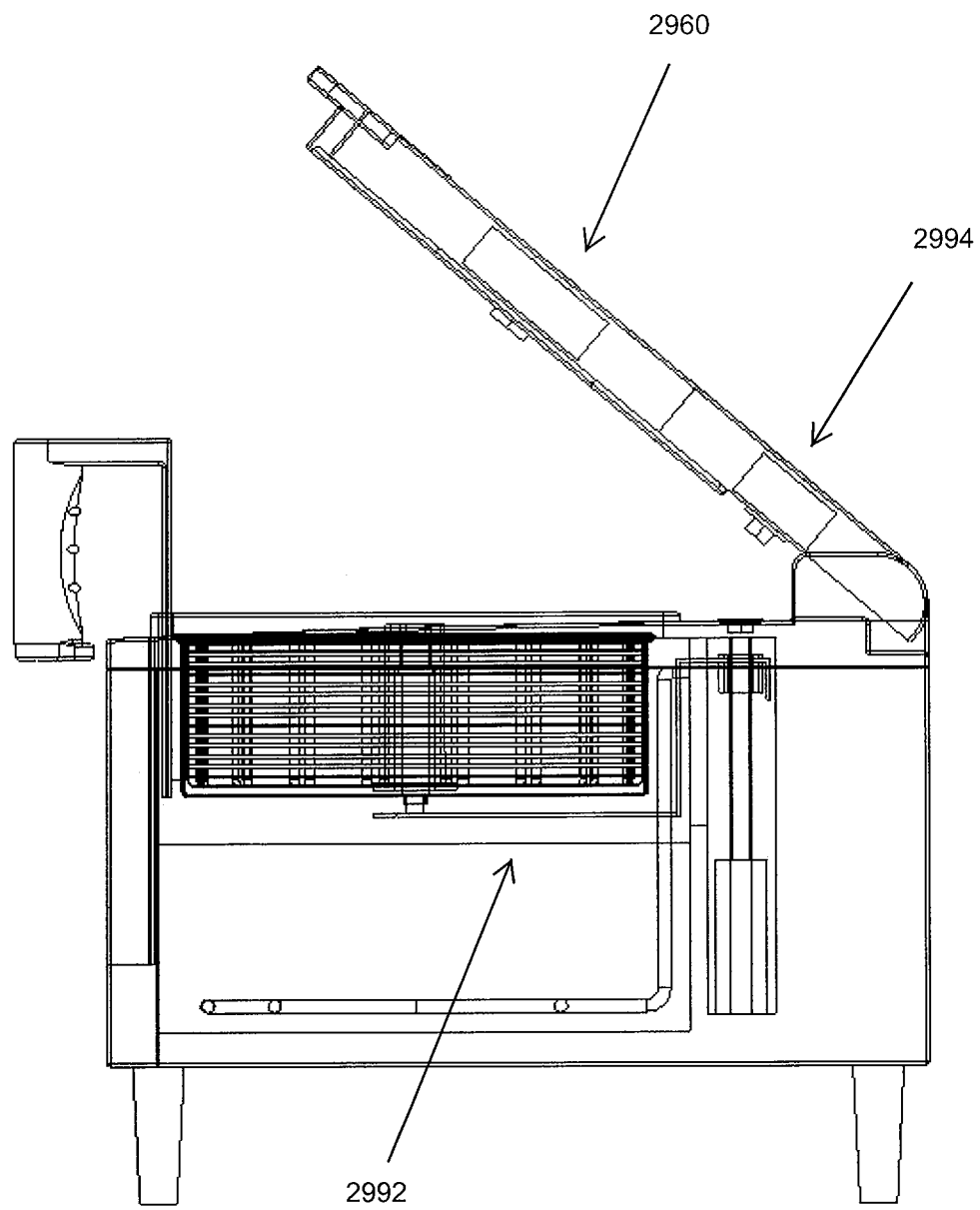
FIG. 29B illustrates a side cross-sectional view of the embodiment illustrated in FIG. 29A.
Figure 29C:
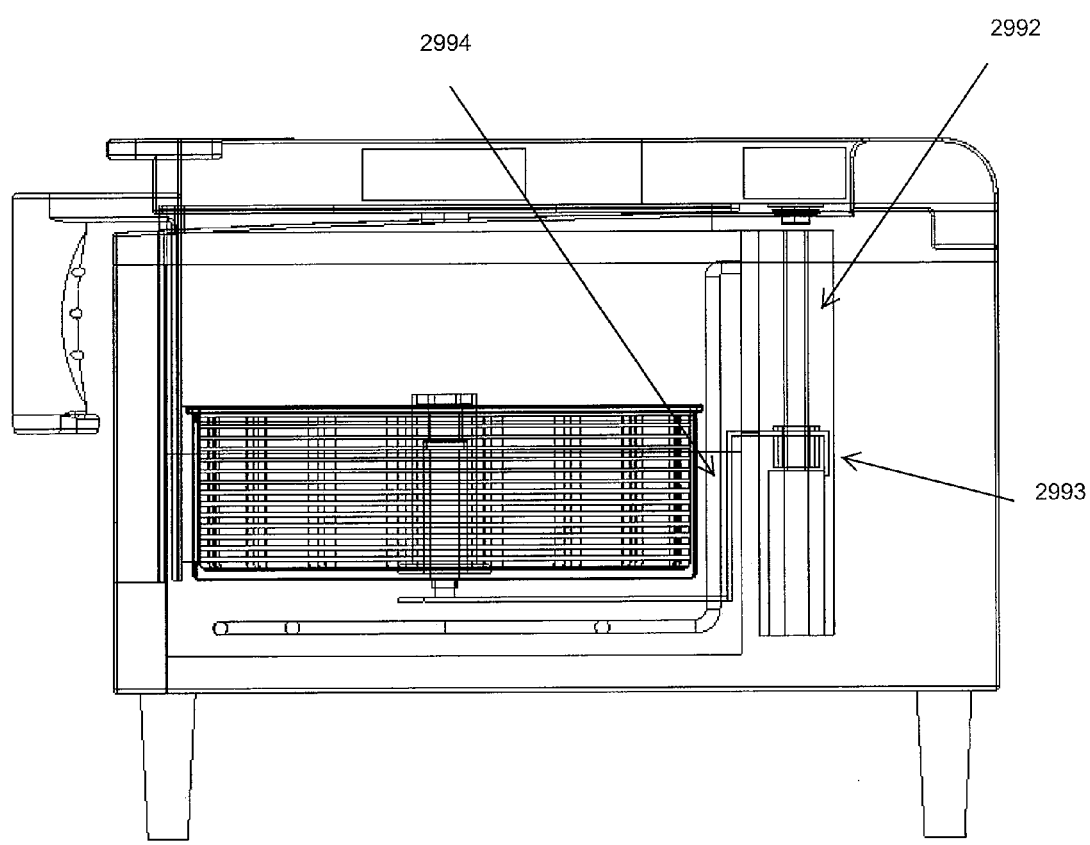
FIG. 29C illustrates another side cross-sectional view of the embodiment illustrated in FIG. 29A.
Figure 29D:
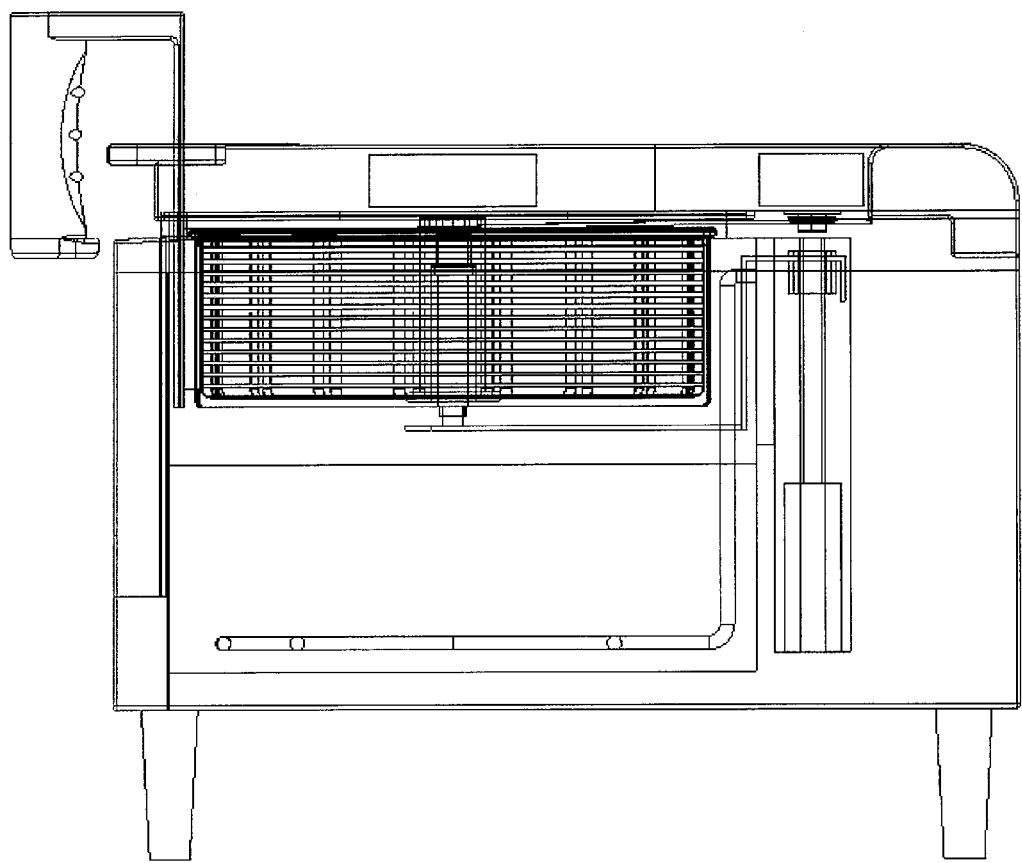
FIG. 29D illustrates still another side cross-sectional view of the embodiment illustrated in FIG. 29A.

In accordance with another embodiment, and with reference to FIGS. 29A-29B, a cooking device 2910 may comprise two motors in cover 2916. Cover 2916 may comprise a spin motor 2960 and a lift motor 2950. Spin motor 2960 may be configured to interface with basket 2940 and/or a drive shaft to facilitate spinning basket 2940 when the basket is in the spinning section and/or the cooking section. With cover 2916 closed, spin motor 2960 may interface with the basket and/or drive shaft in any manner disclosed herein, or in any manner that may allow rotation of the basket. Lift motor 2950 may be configured to rotate a lead screw 2992 that is configured to cause lift member 2993 to move vertically along lead screw 2992. For example, lift motor 2950 may comprise a male gear configured to interface with a corresponding female gear in lift member 2993 and/or that is configured to drive lead screw 2992. Lift member may be operatively coupled to lift arms 2994 that are in turn coupled with lift plate 2976. As lead screw 2992 rotates, lift member 2993, lift arms 2994, and lift plate 2976 move vertically, thereby causing basket 2940 to also move vertically. Such a configuration with both motors in cover 2916 may extend the life of the motors because they are located away from the heat source for the cooking device, and away from the cooking liquid.

In accordance with another embodiment of the invention, and with reference to FIGS. 31A-31E, a single motor 3160 may both spin the cooking basket 3140 and/or the basket well, and raise and lower the cooking basket between the spinning section and the cooking section. Motor 3160 may be configured to spin basket 3140 via a basket coupling 3146. In other embodiments, motor 3160 may drive a disk that nests within basket 3140. It should be understood that motor 3160 may cause basket 3140 and or the basket well to rotate in any number of ways, such as with other configurations disclosed herein. Motor 3160 may facilitate raising and lowering basket 3140 by driving a lift gear 3150 with a drive chain and/or drive belt 3123. Lift gear 3150 may be configured to rotate a lead screw 3192 that is configured to cause lift member 3193 to move vertically along lead screw 3192. For example, lift gear 3150 may comprise a male gear configured to interface with a corresponding female gear that is configured to facilitate rotating lift member 3193 with lead screw 3192. Lift member 3193 may be operatively coupled to lift a lift bracket 3194 that is in turn coupled with a lift plate 3176. As lead screw 3192 rotates, lift member 3193, lift bracket 3194, and lift plate 3176 move vertically, thereby causing basket 3140 to also move vertically. In other embodiments, motor 3160 may be configured to raise basket 3140 using any mechanism that is configured to translate rotational motion to linear motion to facilitate raising basket 3140.

Further embodiments of the invention comprise means for increasing the heat transfer between the heating elements and the cooking liquid and/or between the cooking liquid and the food being cooked. For example, with reference to FIGS. 25A-25B, a vibration motor 2551 may be configured to induce vibrations in the cooking basket and/or in basket well 2542. Vibration motor 2551 may induce sonic vibrations in the cooking basket and/or in basket well 2542. Basket well 2542 may be operatively coupled to lift arms 2594 that may be configured to facilitate raising the basket well out of and submersing the basket well into the cooking liquid. A brace 2556 may be disposed between lift arms 2594, and vibration motor 2551 may be disposed on brace 2556. As vibration motor 2551 vibrates, vibration is induced in brace 2556 and lift arms 2594, thereby inducing vibration in basket well 2542. As basket well 2542 vibrates, bubbles and/or air pockets that may have formed in the cooking liquid are disrupted, thereby creating a more uniform cooking liquid. Bubbles and/or air pockets that form in the cooking liquid reduce the efficiency at which heat transfer occurs between the cooking liquid and the heating elements and/or the food being cooked. Disrupting and/or reducing the air pockets in the cooking liquid therefore facilitates increasing the effectiveness of the heat transfer between the cooking liquid and the heating elements and/or the food being cooked. Furthermore, using vibration, such as sonic vibration, may facilitate prevent the items of food being cooked from sticking to each other during the cooking and/or spinning processes. It should be understood that other means for disrupting air pockets in the cooking liquid are contemplated within the scope of the present invention.

It should be noted that various embodiments of the invention comprise motors that operable at various and/or variable speeds. In certain embodiments, it may be desirable to alter the speed of the motors during spinning of the fried food, during the raising and lowering of the basket, the basket well, and/or the frame structure, during the adding of the food to the cooking device, during the removal of the food from the cooking device, and/or during the adding and/or filtering of the frying oil. In still other embodiments, the speed of the motors may be changed depending on the type of food being cooked. For example, where the food is more delicate, the motors may be configured to spin the cooked food at a lower speed, so that the centrifugal force exerted on the food is less. Or it may be desirable to start the spin cycle at one speed to allow the food to position itself on the outside of the basket and then modify the spin speed to remove more oil and/or conduct convection cooking. Any motor operable to achieve these functions and/or other functions of the cooking device may be configured to be variable speed motors. For example, a motor configured to facilitate the removal of the cooking liquid from the cooked food may start spinning at one speed and then ramp up to a maximum and/or desired spinning speed. After the spinning process is complete, the motor may slow down gradually until it stops. In other embodiments, the speed and/or acceleration of the spinning motor may change throughout the spinning process. The speed of the variable speed motors may be manually and/or automatically controlled as discussed further below.

In accordance with a further embodiment of the present invention, an exemplary fryer comprises mechanisms for automatically and/or manually controlling cooking device 10. Any of the procedures, processes, methods, and/or movements disclosed herein may be capable of automation, and any such automations now known or hereafter developed are contemplated within the scope of the present invention. For example, a user many manually crank basket 40 in order to remove excess oil from the fried food. In other embodiments, and with reference again to FIG. 1, controller 55 controls operation of at least one function and/or component of cooking device 10. Controller 55 may comprise any type of controller known in the art for controlling electrical and/or mechanical systems. As a motor controller, controller 55 may direct the operation of linear motor 50 to move basket 40 between oil section 20 and spinning section 30, and may direct spin motor 60 to rotate basket 40 about its vertical axis. A controller may also be used with the embodiments illustrated in FIGS. 6A-14 to accomplish the various movements contemplated in those embodiments. In still other embodiments, controller 55 accepts input from a user for air temperature, oil temperature, oil viscosity, cook time, spin time, oil level, and other factors a user would want to control in relation to the operation of cooking device 10. In further embodiments, controller 55 may control automatic extraction of the food from cooking device 10 when the frying and spinning processes are complete. Controller 55 may also control automatic operation of a filtering system that removes impurities and other undesirable items from cooking oil 22. Controller 55 may also control additional motors, such as rotational motor 65, circumferential motor 662, and spinning motor 1260, and may control other cooking device functions, such as agitation of basket 40 in oil section 20. Controller 55 may comprise, control, and/or communicate with various sensors, such as temperature sensors, and other components within cooking device 10. Controller 55 may be preprogrammed with various cooking procedures to fully automate the adding of the food to the cooking device, the cooking of the food, the removal of the oil from the food, and/or the removal of the food from the cooking device. As discussed further below, controller 55 may comprise any device capable of processing data, such as a microprocessor, a series of logical gates, a computer, and the like.

Figure 3A:
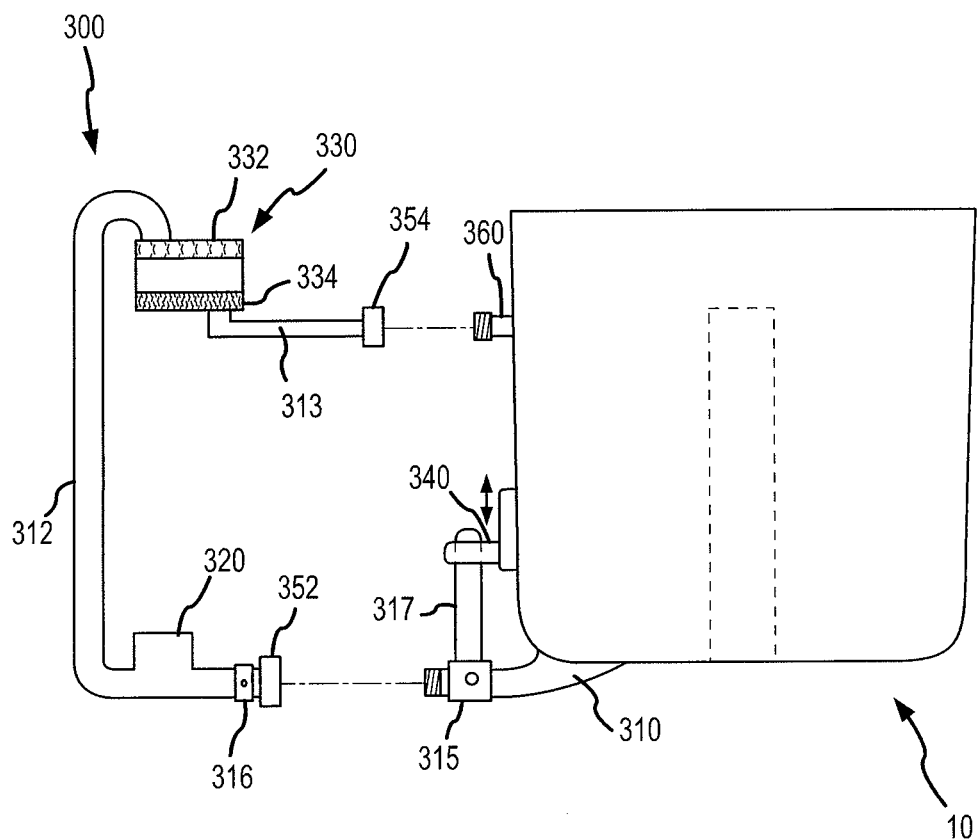
FIG. 3A illustrates a side view of a cooking device and filtering system according to an embodiment of the present invention.
Figure 3B:
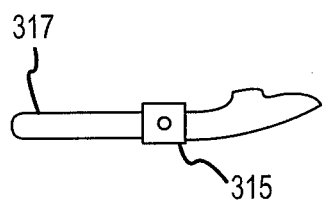
FIG. 3B illustrates a side view of a valve portion of a filtering system according to an embodiment of the present invention.

According to various embodiments of the present invention, it is desirable to remove impurities from cooking oil 22. With reference to FIG. 3, a filter system 300 for use with cooking device 10 according to an embodiment of the invention is now described to provide such a function. In certain embodiments, filter system 300 comprises an integrated oil filter for removing the impurities from cooking oil 22. Filter system 300 is operable to manually or automatically remove sediment, fried food particles, impurities, and other undesirable particles from cooking oil 22. For filter system 300 to be functional in some embodiments, a safety latch 340 is switched to an operating position. Cooking oil 22 then exits cooking device 10 via an exit pipe 310 and enters filter system 300 via a valve 315 and/or another valve 316. Valves 315 and 316 may be any valves capable of controlling the flow rate of fluids such as cooking oil 22 in a heated or cooled state. A valve switch 317 controls operation of valve 315 and controls the flow rate of cooking oil 22 into filter system 300. Exit pipe 310 and valve 315 are coupled to valve 316, pump 320, and transfer pipe 312 via female coupling 352.

A pump 320 moves cooking oil 22 through a transfer pipe 312, a filter box 330, and a return pipe 313 so that filter system 300 can return the filtered oil to cooking device 10. Pump 320 may be any device capable of pumping a fluid such as cooking oil 22 in a heated or cooled state.

Filter box 330 is operable to remove sediment and other undesirable particles from cooking oil 22. Filter box 330 comprises, according to various embodiments, at least one filter for filtering cooking oil 22. In certain embodiments, Filter box 330 comprises a wire mesh filter 322 and a fine filter 334. In other embodiments, filter box 330 comprises only one filter.

The filtered cooking oil exits filter box 330 via return pipe 313. Return pipe 313 is coupled to cooking device 10 via a female coupling 354 and a return port 360. Return port 360 receives the filtered cooking oil and returns the filtered cooking oil to oil section 20 for further frying processes. In certain embodiments of the invention, filter system 300 is thermally insulated in order to minimize the temperature drop between exit pipe 310 and return port 360 so as to minimize energy required to reheat the filtered cooking oil. Filter system 300 is operable during the frying process, during the spinning process, after both processes are finished, and at other times during operation of cooking device 10. Filter system 300 is configured so as not to interfere with any of the operations of cooking device 10, including the automatic discharge process discussed below. The filter system may be controlled by controller 55, and a user may specify parameters of the filtering process for automatic control by controller 55.

In an embodiment of the invention, cooking device 10 is capable of automatic operation following insertion of the uncooked food into basket 40, including the automatic process of discharging the cooked food from cooking device 10. In other embodiments, the uncooked food may be loaded into the cooking device through intake chute 445. With reference to FIGS. 4A-4E, embodiments of the automatic discharge process are described. The automatic discharge process involves automatically opening top cover 16, removing basket 40 from frying vessel 14 and discharging the cooked food down a food exit chute such as discharge chute 440. Controller 55 communicates with and controls the automatic operation of the various components involved in the automatic discharge process.

According to further embodiments of the invention, cooking device 10 comprises a basket retrieval mechanism. In certain embodiments, the basket retrieval mechanism comprises servos 410, 412 for automatically discharging the cooked food. Servo 410 is operable to open top cover 16 upon completion of the frying and spinning processes. Servo 412 is operable to control discharge arms 414, 415. Servos 410, 412 are configured to provide rotational, translational, and/or clamping movement and may be any devices capable of providing such movement. The servos may be operated by battery power, alternating current power, direct current power, gas power, and other mechanisms for providing power.

Figure 4A:
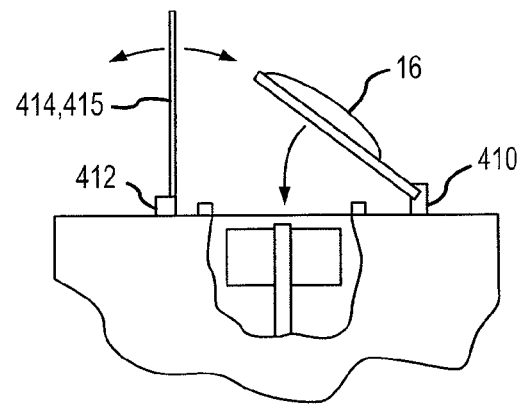
FIG. 4A illustrates a partial cross-section of a cooking device according to an embodiment of the present invention.
Figure 4C:
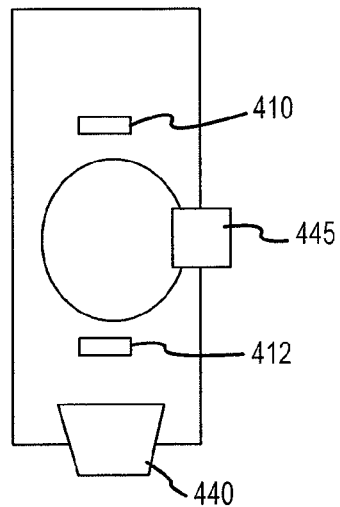
FIG. 4C illustrates a top view of a cooking device according to an embodiment of the present invention.
Figure 4B:
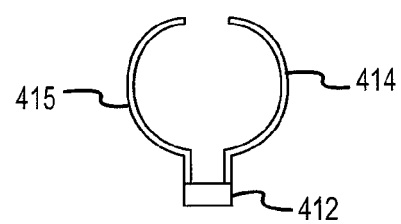
FIG. 4B illustrates a top view of a servo and discharge arm assembly according to an embodiment of the present invention.
Figure 4D:
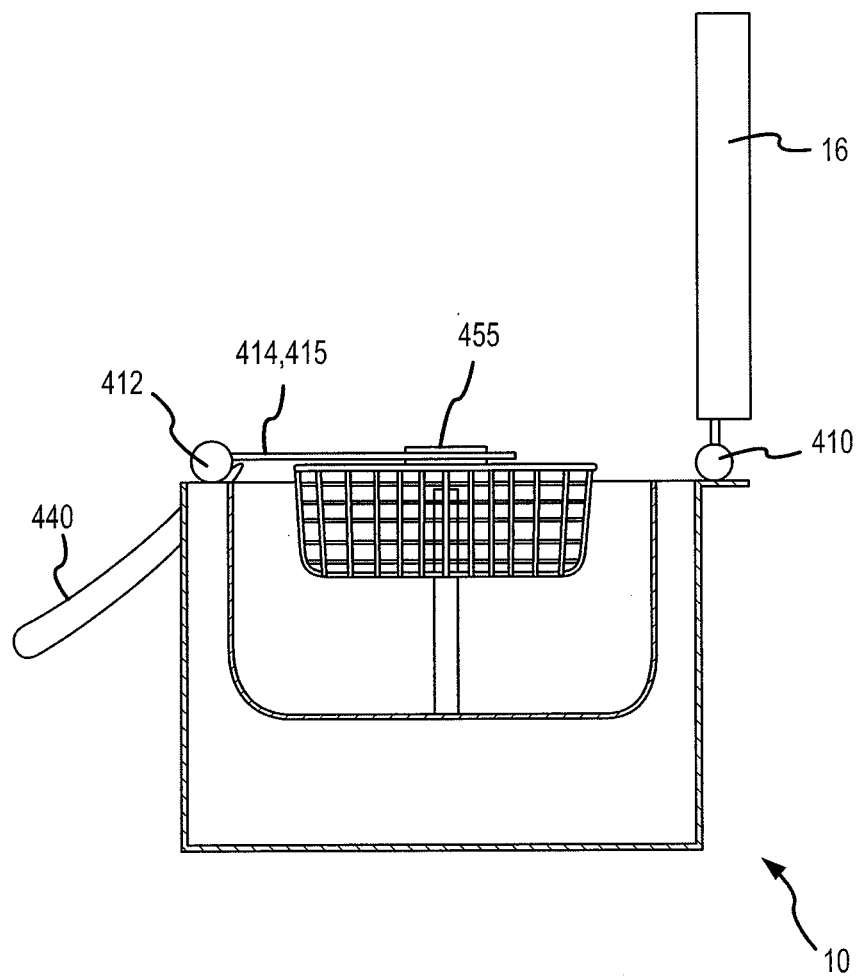
FIG. 4D illustrates a cross-section of a cooking device according to an embodiment of the present invention.
Figure 4E:
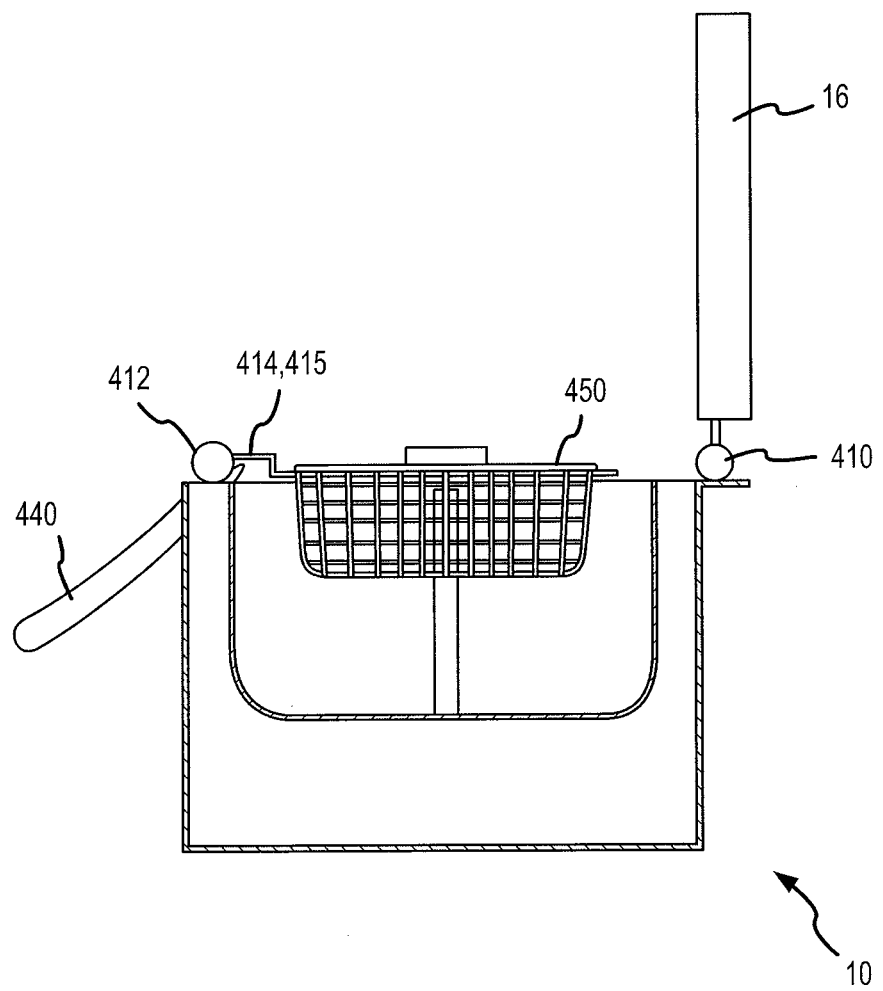
FIG. 4E illustrates a cross-section of a cooking device according to an embodiment of the present invention.

FIG. 4B shows a configuration of discharge arms 414, 415 according to one embodiment of the invention. Discharge arms 414, 415, in this embodiments, are configured to interface with stabilizing ring 450 and/or discharge ring 455 on basket 40 (See FIGS. 4D, 4E). Servo 412 rotates discharge arms 414, 415 into place around stabilizing ring 450 and/or discharge ring 450. In some embodiments, discharge arms 414, 415 snap into place around stabilizing ring 450 and/or discharge ring 450. In other embodiments, servo 412 and/or other devices are operable to clamp discharge arms 414, 415 into place around stabilizing ring 450 and/or discharge ring 455. With discharge arms 414, 415 in place, servo 412 rotates basket 40 out of frying vessel 14, and the cooked food exits cooking device 10 via discharge chute 440. A user may place a bowl, pan, plate or other utensil proximate discharge chute 440 so that the utensil will receive the cooked food from discharge chute 440.

In accordance with an embodiment of the present invention, cooking device 10 is configured to produce a cooked food that is more desirable than cooked foods produced by other frying methods. When the fried food is done frying in the oil, some oil has collected at the outside of the fried food. If the excess oil is removed before the fried food cools, up to 80% of the oil content of the fried food may be reduced. However, as an item of fried food, for example, a french fry, begins to cool, the outside of the french fry cools faster than the inside. This uneven cooling causes the excess oil at the outside of the french fry to be drawn to the center of the french fry, causing the french fry to become soggy and increasing the oil content of the fried food. In addition, as the outside cools, the food tends to contract, which has the effect of locking the oil into the food. Soggy french fries are generally not desirable for consumption. Increased oil in the french fry is also not desirable from a health standpoint. Thus, it is desirable for the temperature at the inside and outside of the french fry to be the same until it is served to a consumer. However, some presently-known frying processes employ a method for removing excess oil from the fried food after frying and before serving to a consumer. These processes generally remove the excess oil in an environment that contributes to rapid cooling of the food.

Embodiments of the present invention, on the other hand, comprise an excess oil removal process that is conducted in an environment that minimizes the cooling rate of the fried food. In one embodiment, the average temperature of the french fry (or other fried food) is $T_{avg}$. The closer $T_{avg}$ is to the temperature of cooking oil 22, $T_{oil}$, the less temperature difference there will be between the outside and inside temperatures of the french fry, assuming the entire french fry was at the temperature of the cooking oil when the frying was completed. It is therefore desirable to minimize $T_{oil} - T_{avg}$, or $\Delta T_{avg}$ at the time the french fries are served to a consumer. A cooling rate (C) can be calculated at a specified time after frying in the oil has been completed (tc):

$$C = \Delta T_{avg}/tc$$

For example, assuming an oil temperature of $T_{oil}=190°$ C., and cooling the fried food in an environment having a temperature of 27° C., at time after frying of tc=180 seconds, and an average temperature at 2 minutes of $T_{avg}=27°$ C., then $\Delta T_{avg}=163°$ C., and C=0.91° C./second. On the other hand, assuming the other variables are the same, if $T_{avg}=155°$ C., then $\Delta T_{avg}=35°$ C., and C=0.194° C./second. In the scenario where C is higher, there is a greater likelihood of the french fries being soggy because more excess oil has been drawn to the center of the fried food, and/or the fried food has cooled too rapidly for the excess oil to be removed, making the fried food unhealthy and undesirable to consumers. Thus, it is important to minimize C.

It should be noted that according to other embodiments of the present invention, C may be a function of time, cooling conditions, thermal properties of the fried food, initial oil content of the fried food, geometry of the fried food, and the like. In certain embodiments, the convection heat transfer coefficient influences the cooling rate of the fried food. For example, if the ambient temperature where the fried food is being cooled is low, the heat transfer rate from the fried food will be greater. If air is moving past the fried food at the low ambient temperature, heat transfer will be further increased according to the speed of the air flow. Thus, moving air past the fried food is not desirable at a low ambient temperature because the fried food might cool more rapidly, thus preventing the removal of the excess oil before it collects at the center of the fried food. Thus, embodiments of the present invention provide a mechanism for moving air past the fried food in order to remove the excess oil at the surface of the fried food, but moving the air past the fried food at an elevated temperature in order to reduce the cooling rate of the fried food. According to an embodiment of the invention, the following table shows some theoretical temperatures of a fried food that is being cooled in different ambient temperatures, at different periods of time. An oil temperature of 190° C. is used. All temperatures are in Celsius, and the time is in seconds.

TABLE 1

| Time (s) | Ambient = 27° C. | Ambient = 65° C. | Ambient = 150° C. |
|---|---|---|---|
| 0 | 190 | 190 | 190 |
| 20 | 135 | 147 | 180 |
| 40 | 95 | 120 | 174 |
| 60 | 70 | 100 | 169 |
| 80 | 55 | 88 | 164 |
| 100 | 45 | 80 | 161 |
| 120 | 36 | 74 | 158 |
| 140 | 32 | 70 | 157 |
| 160 | 28 | 68 | 156 |
| 180 | 27 | 67 | 155 |

Thus, according to the embodiment expressed in Table 1, at 40 seconds after cooking, or tc=40 seconds, $\Delta T_{avg}(27)=95°$ C., $\Delta T_{avg}(65)=70°$ C., and $\Delta T_{avg}(150)=16°$ C. The corresponding cooling rates are C(27)=2.375° C./second, C(65)=1.75° C./second, and C(150)=0.4° C./second. Thus, where the ambient cooling temperature is higher, C is lower, and more oil may be removed from the surface of the fried food during the spinning process. It should be noted that Table 1 is only representative of embodiments of the present invention, and other cooling rates, temperatures, and other parameters are possible depending on the specific operating conditions of a particular embodiment of the invention.

According to further embodiments of the invention, the temperature of the fried food is a function of time. For example, the temperature may be a third-order polynomial as a function of time. In other embodiments, the temperature profile may be exponential, linear, a power function, n-order polynomials, and other types of functions. In such embodiments, the cooling rate is also a function of time, characterized by the change in temperature over a change in time, or dT(t)/dt, or the first derivative of the temperature function. For example, where the temperature profile is a third-order polynomial, $T(t)=At^3+Bt^2+Dt+E$, and $dT(t)/dt=C(t)=3At^2+2Bt+D$.

Various embodiments of the present invention comprise methods of automatically reducing oil content of fried foods and minimizing C at the same time. For example, top cover 16 remains closed while basket 40 is moved out of oil section 20 and into spinning section 30. Top cover continues to remain closed while spin motor 60 and/or rotational motor 65 spins, agitates and/or moves basket 40 in order to remove oil from the fried food. Because top cover 14 remains closed after frying, the temperature surrounding the fried food remains at least close to, if not the same as, the temperature of cooking oil 22. Thus $\Delta T_{avg}$ approaches zero during the spinning process even while tc grows, resulting in a C that also approaches zero. Only after the oil removal process do $\Delta T_{avg}$ and C begin to grow appreciably. Other embodiments comprise controller 55 configured to monitor C via a sensor or plurality of sensors. Monitoring C allows controller 55 to automatically change the cook temperature, cook time, spin temperature, spin time, spin speed, and other variable in order to maintain a desirable C. Therefore, embodiments of the present invention provide fried foods with a reduced oil content that are nearly the same temperature as the fried foods with higher oil content that are served immediately after frying in oil. Such embodiments provide for greater removal of the excess surface oil of the fried foods. Other embodiments provide fried foods that are more desirable than fried foods produced by other methods, where the other methods remove oil content without minimizing C and thus facilitate the production of undesirable foods.

Various processes according to embodiments of the invention, including those described above, facilitate convection cooking of the food in the spinning section. For example, various fans may move air across the cooked food to facilitate convection cooking. In other embodiments, the air may be heated during the spinning process, thereby facilitating moving heated air over the cooked food. In other embodiments, the spinning section may comprise heating elements to facilitate heating the air during the spinning process. In still other embodiments, heated air may be circulated by heated jets or other streams of air. Convection cooking may facilitate producing a crispy surface and/or texture of a fried food, thereby making the fried food more desirable for consumption. According to further embodiments, convection cooking may occur while the food is spinning (i.e., the food is moving through the air instead of the air moving across the food). Convection cooking may be enhanced due to the moist air environment created by the steam from the cooking section below the spinning section. In still further embodiments, add tabs, wings, blades, propellers or the like may be used to increase air movement within the cooking device and/or to create an air vortex. Such embodiments may facilitate moving more air and facilitate venting the moisture and pressure from the cooking device to a pressure relief valve or a moisture vent.

Other aspects of the invention provide systems such as a ventilation system and a fire suppression system. Such systems aid in the safe operation of the food fryer. Such systems also aid in maintaining a desirable operating environment. For example, the ventilation system may remove oil-filled heated air from the food fryer and replace it with fresh air. In certain embodiments, the fresh air may be preheated to aid in reducing the cooling rate of the fried food in the spinning section. In yet other embodiments, the spinning air created by basket 40 when it is being rotated, drives air out of spinning section 30 and into the venting system. In still other embodiments, the ventilation system may comprise an oil ventilation device for replacing used oil with new oil and/or reclaiming the used oil. The ventilation and fire suppression systems may be automatically and/or manually operated.

An embodiment of the invention comprises an opening near the top of the cooking device that may be configured to facilitate the removal of steam or other vapor from the cooking device. After passing through the opening, the steam moves through a duct that is disposed proximate the cooking device. The duct is configured to direct the steam to a condensation device that is removable from and/or disposed proximate to the cooking device. The condensation device may provide means for cooling the steam such that the water in the air is removed from the air and is collected in the condensation device. The condensation device may comprise absorptive components that facilitate absorption of the water. The absorptive components may be removable from the condensation device. The condensation device may be located such that the condensation device is at least partially insulated from the cooking device and/or a cooking chamber in the cooking device. In other embodiments, the cooking device may be actively cooled to facilitate removal of condensation.

Figure 30:
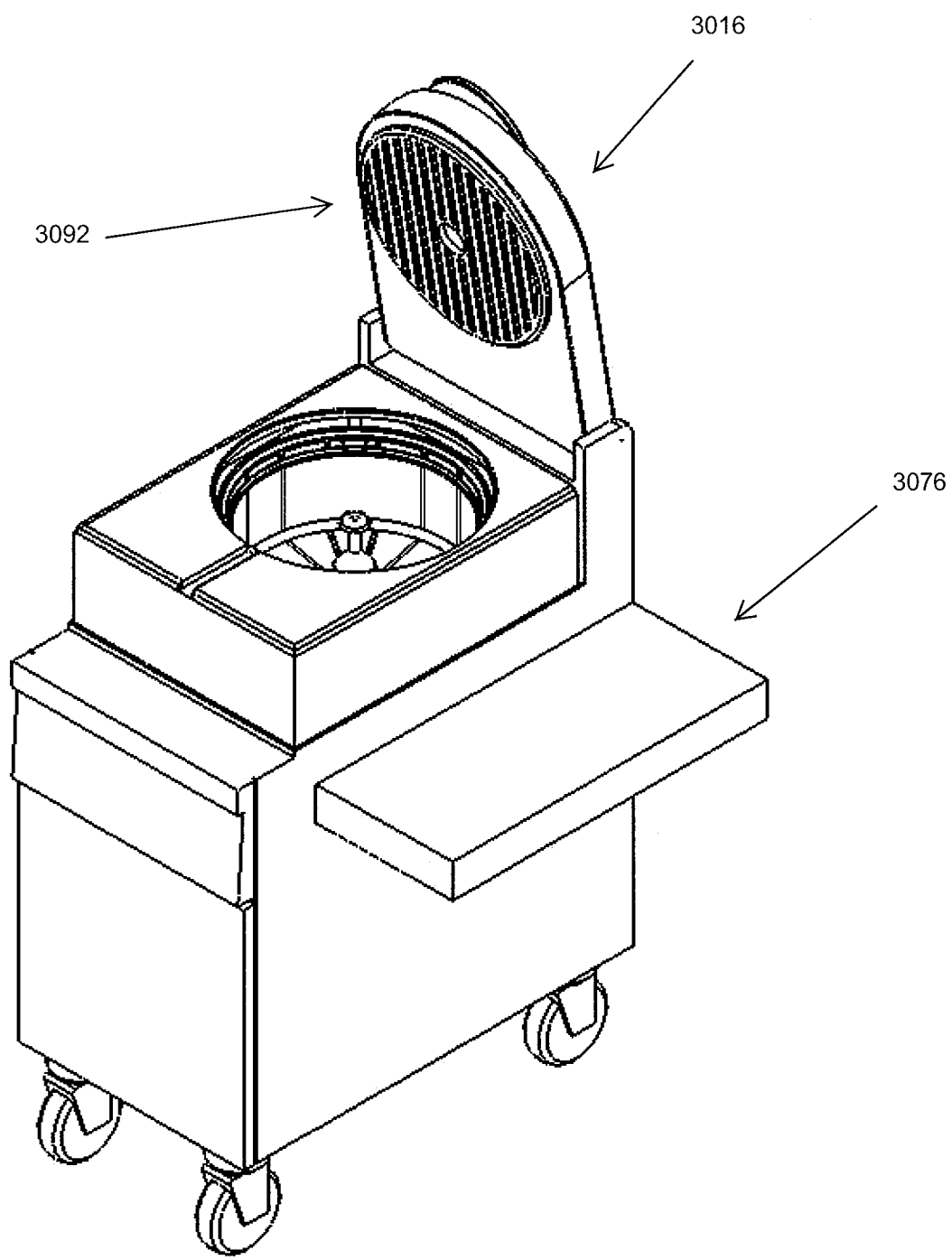
FIG. 30 illustrates a perspective view of a cooking device having a heating table according to an embodiment of the invention.
Figure 31A:
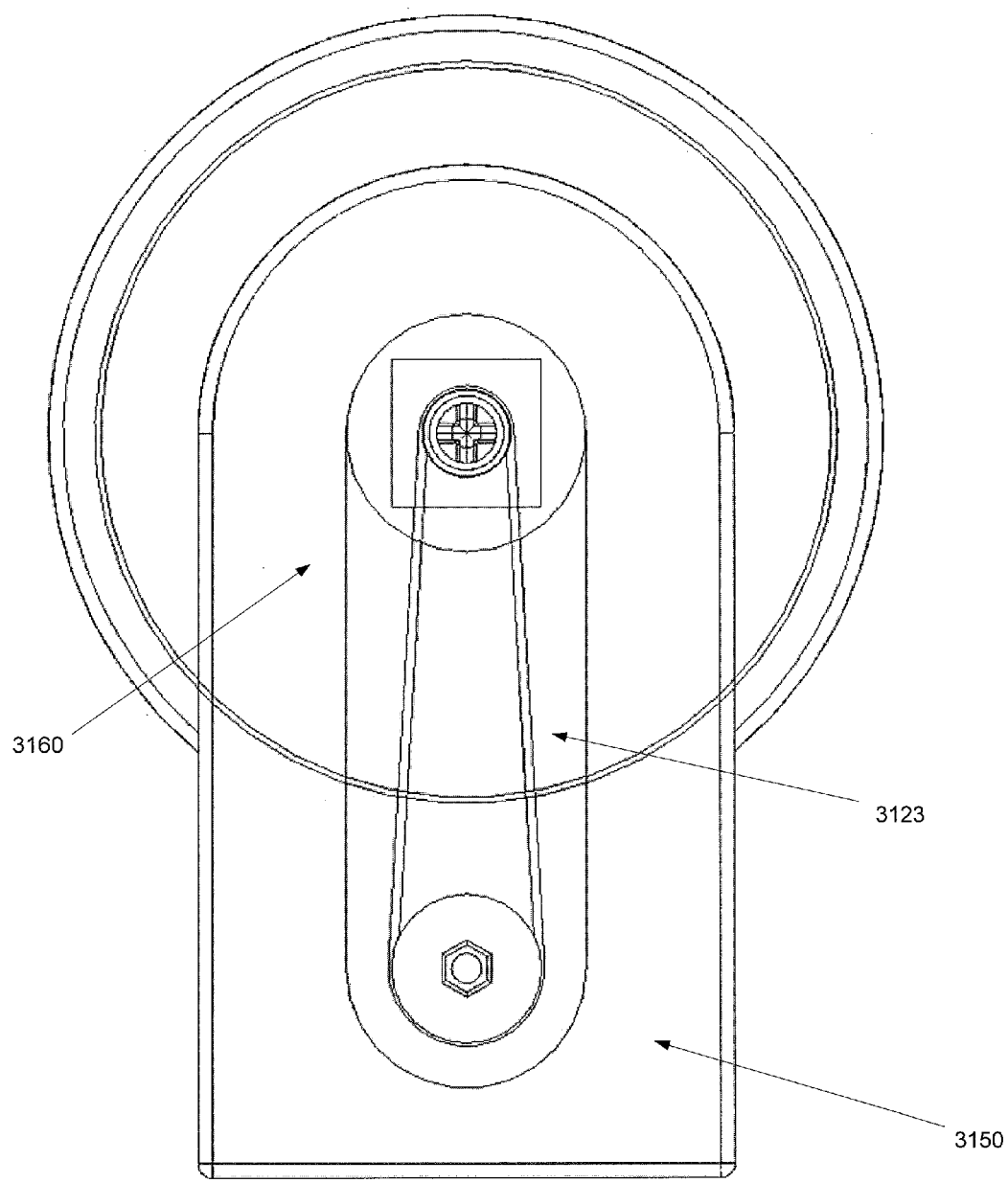
FIG. 31A illustrates a top cross-sectional view of a cooking device with a single motor according to an embodiment of the invention.
Figure 31B:
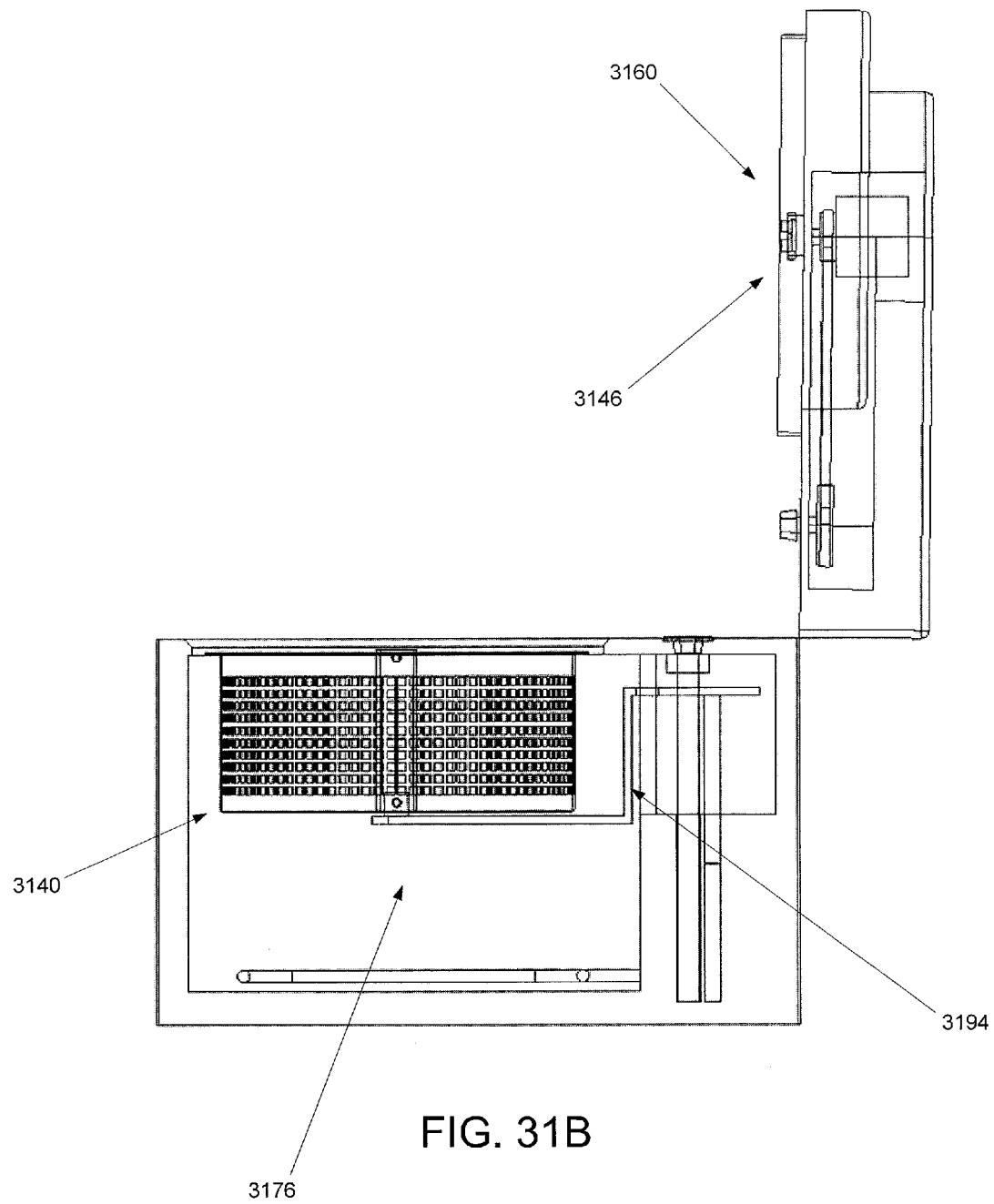
FIG. 31B illustrates a side cross-sectional view of the embodiment illustrated in FIG. 31A with a cover open.
Figure 31C:
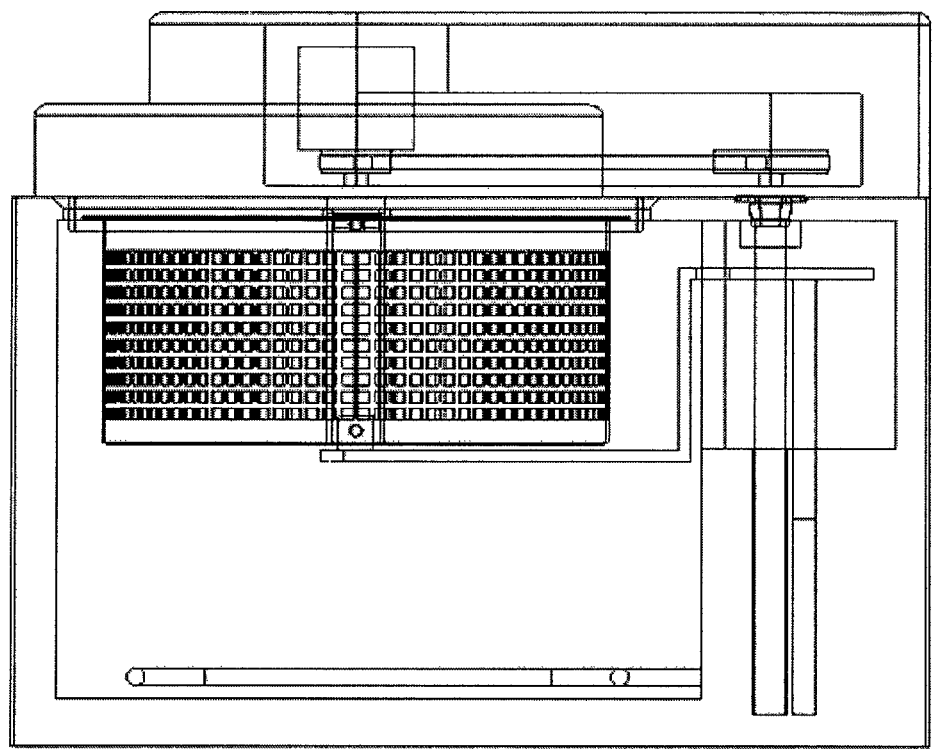
FIG. 31C illustrates a side cross-sectional view of the embodiment illustrated in FIG. 31A with a basket in a spinning section of the cooking device.
Figure 31D:
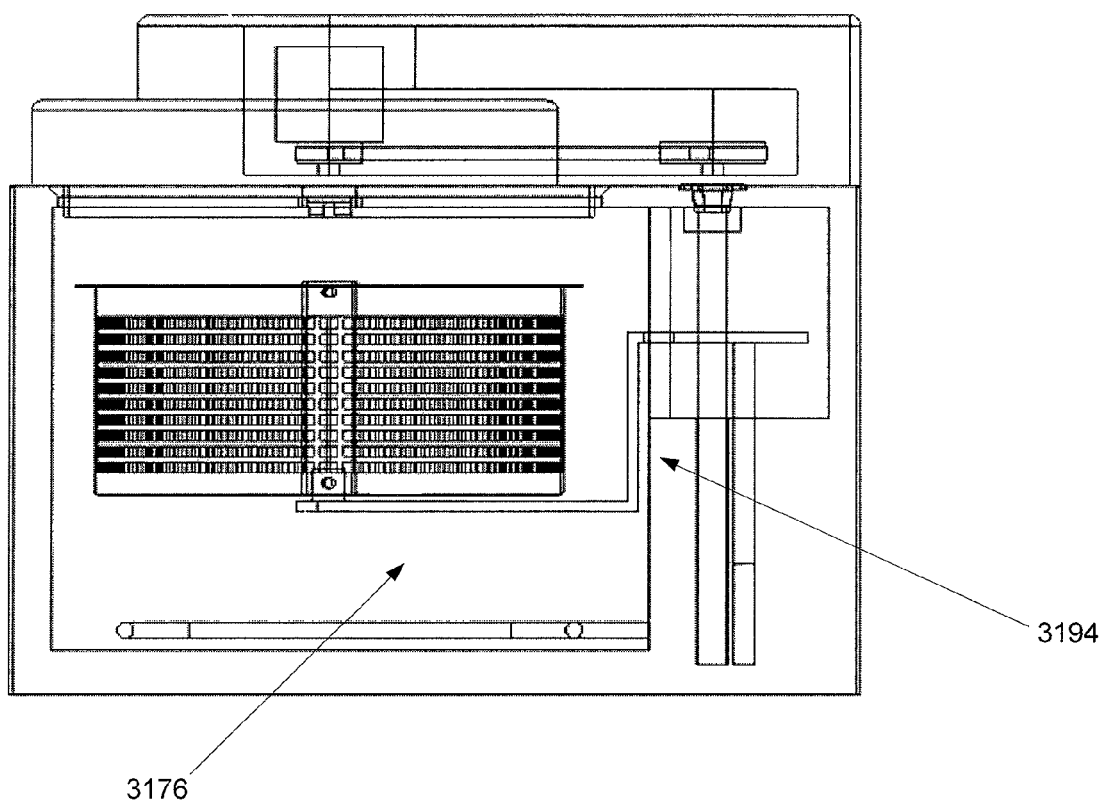
FIG. 31D illustrates a side cross-sectional view of the embodiment illustrated in FIG. 31A with a basket in between a spinning section and a cooking section of the cooking device.
Figure 31E:
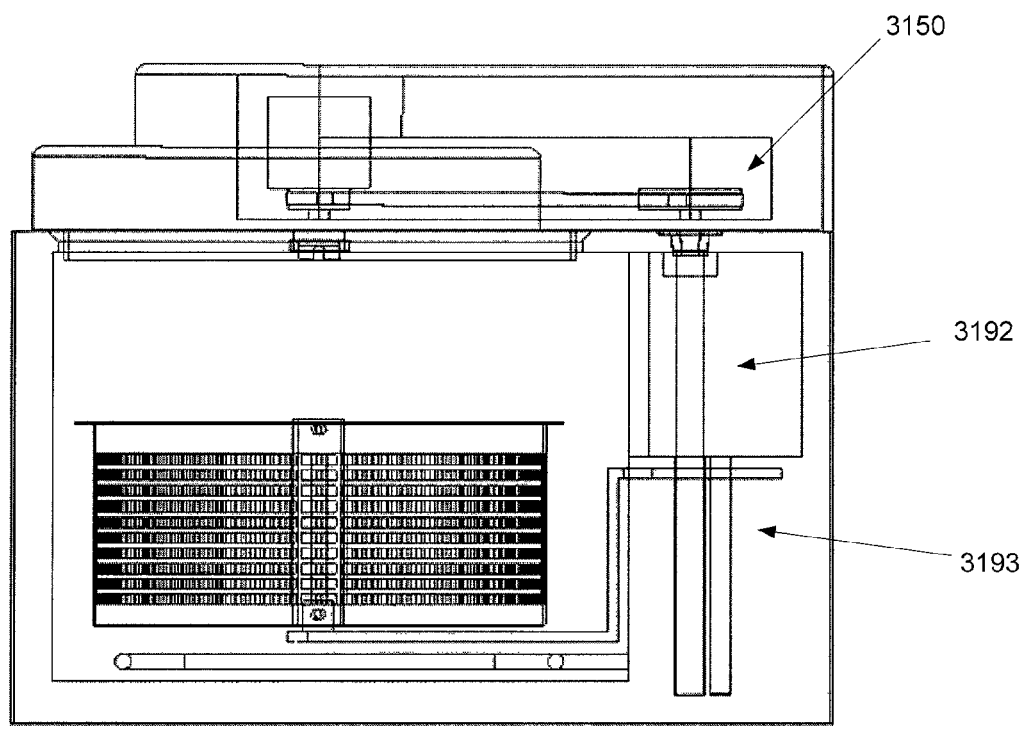
FIG. 31E illustrates a side cross-sectional view of the embodiment illustrated in FIG. 31A with a basket in a cooking section of the cooking device.
Figure 32A:
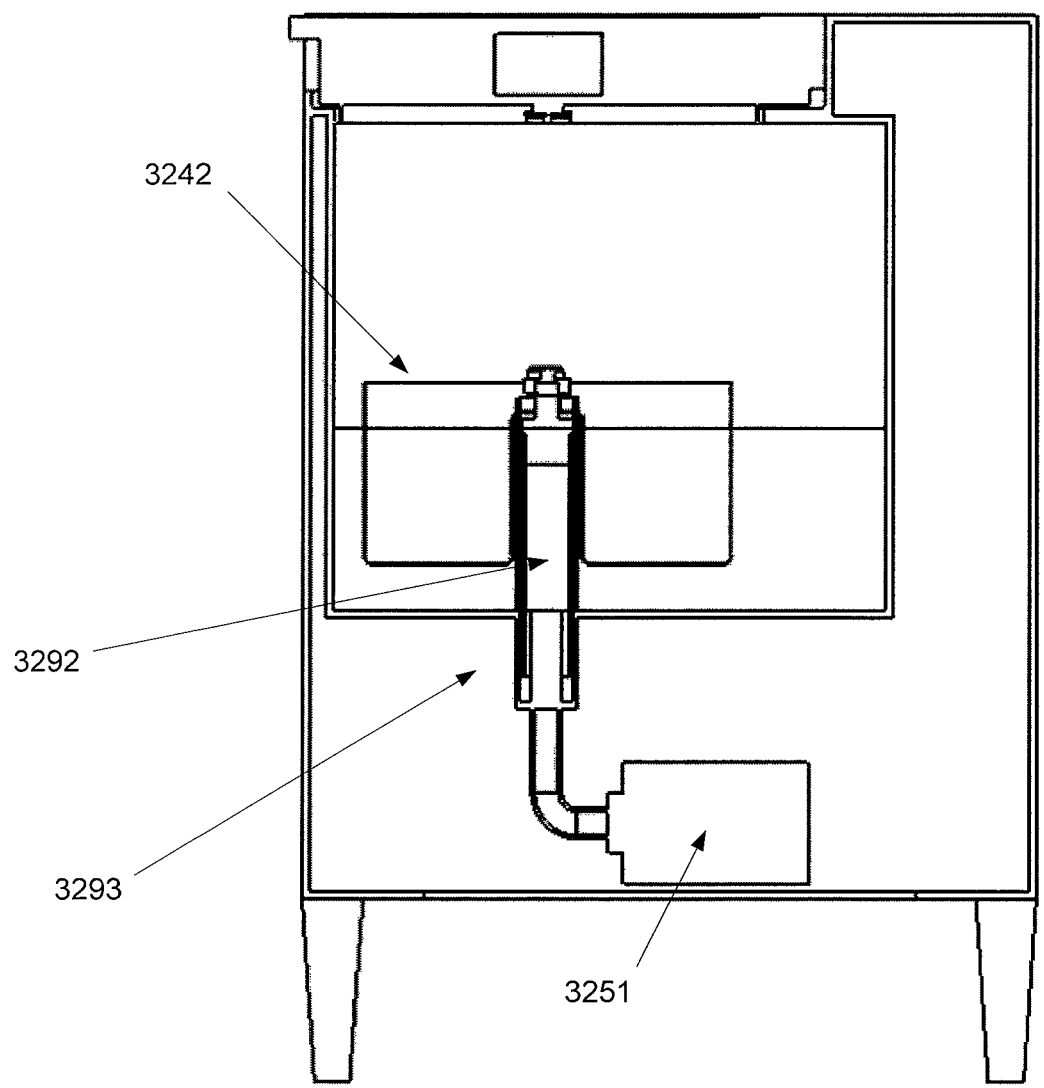
FIG. 32A illustrates a side cross-sectional view of a cooking device with a pneumatic lift mechanism according to an embodiment of the invention.
Figure 32B:
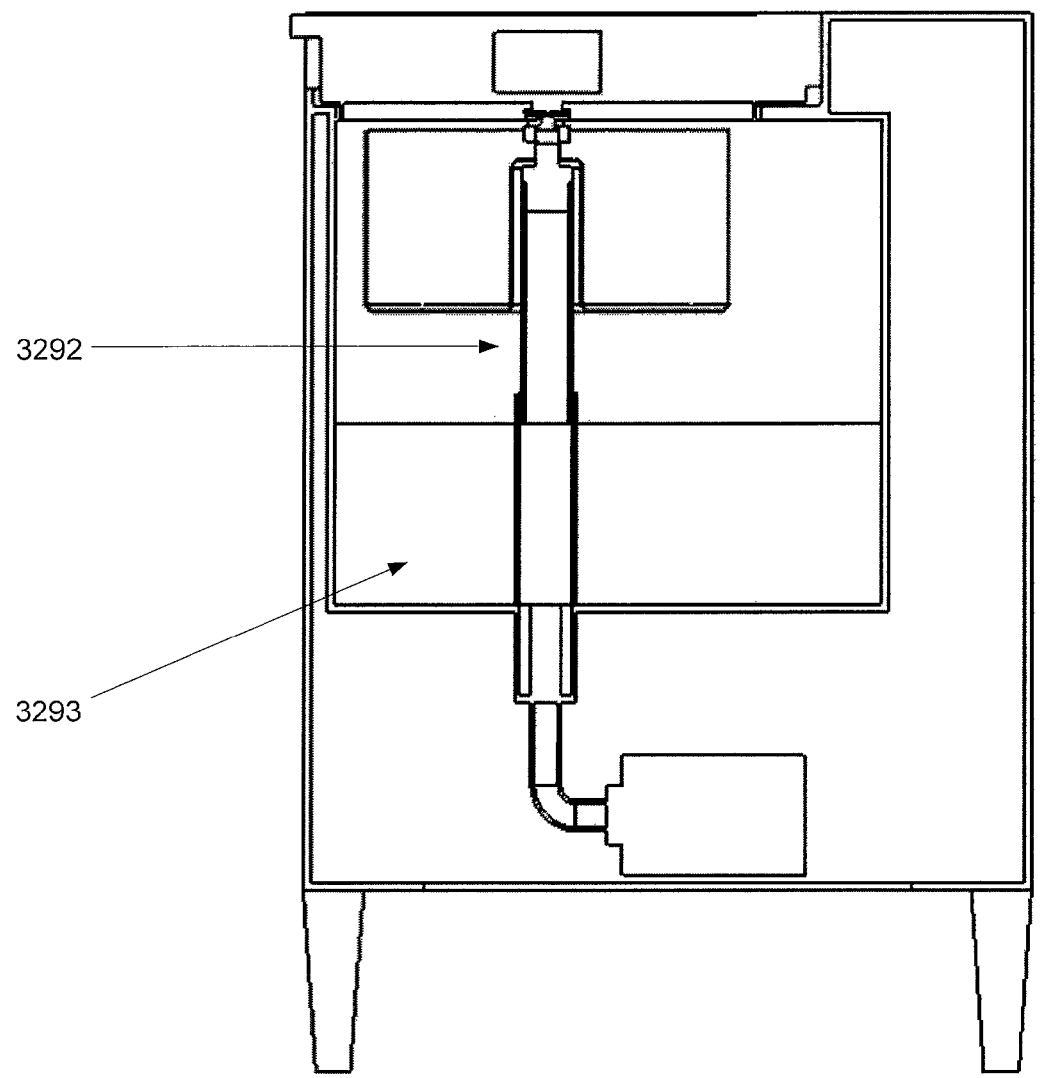
FIG. 32B illustrates a side cross-sectional view of the embodiment illustrated in FIG. 32A with a basket in a spinning section of the cooking device.
Figure 32C:
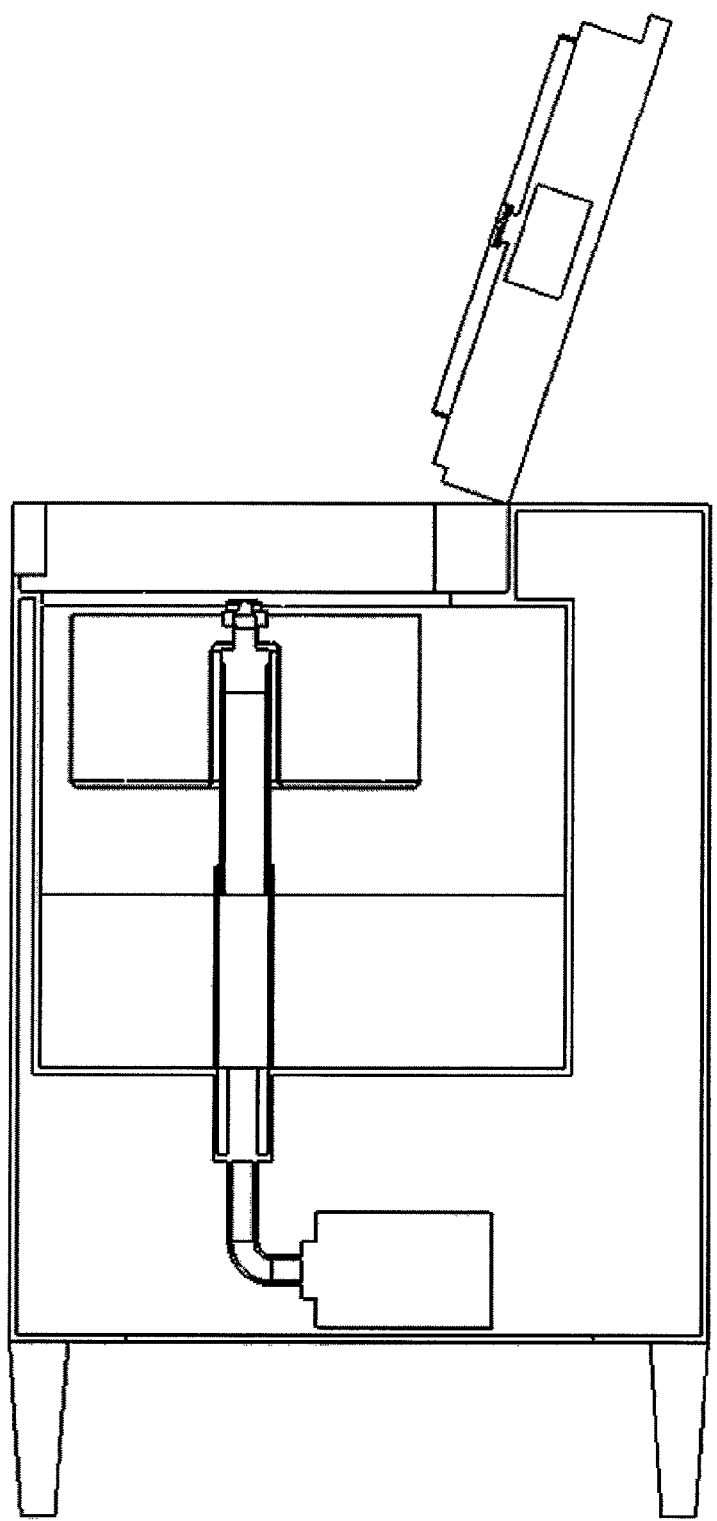
FIG. 32C illustrates a side cross-sectional view of the embodiment illustrated in FIG. 32A with a cover open.
Figure 32D:
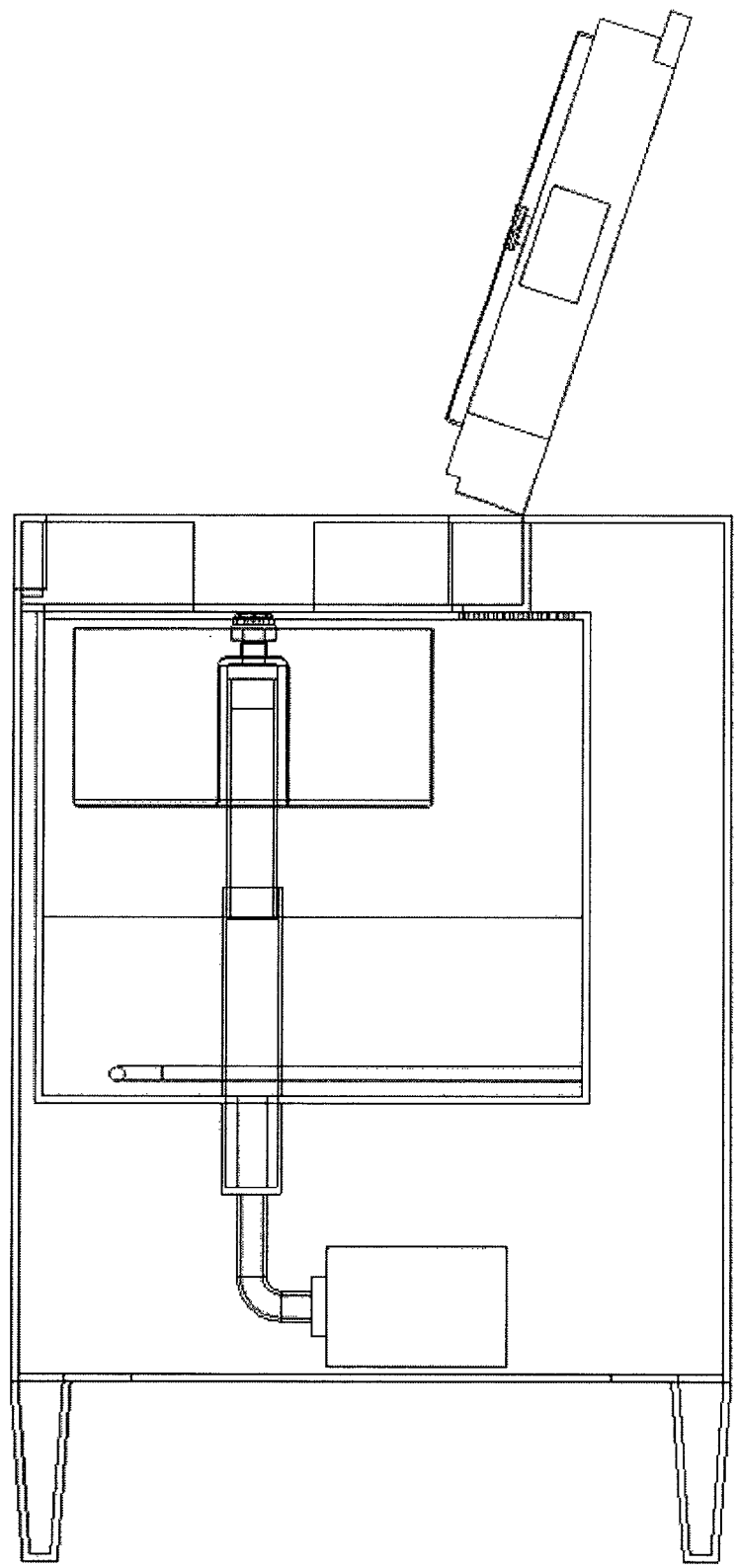
FIG. 32D illustrates another side cross-sectional view of the embodiment illustrated in FIG. 32A with a cover open.
Figure 32E:
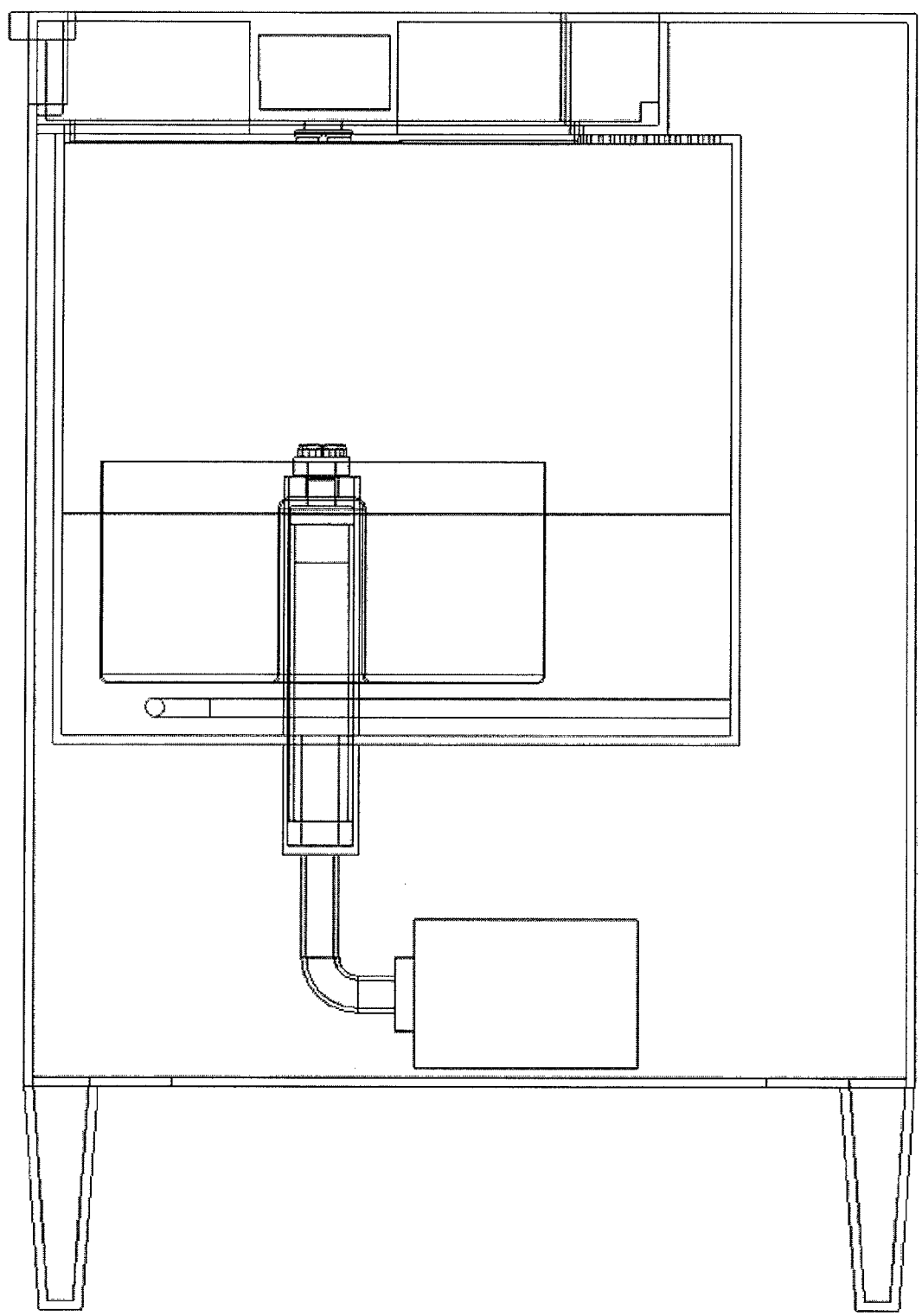
FIG. 32E illustrates a side cross-sectional view of the embodiment illustrated in FIG. 32A with a basket in a cooking section of the cooking device.
Figure 32F:
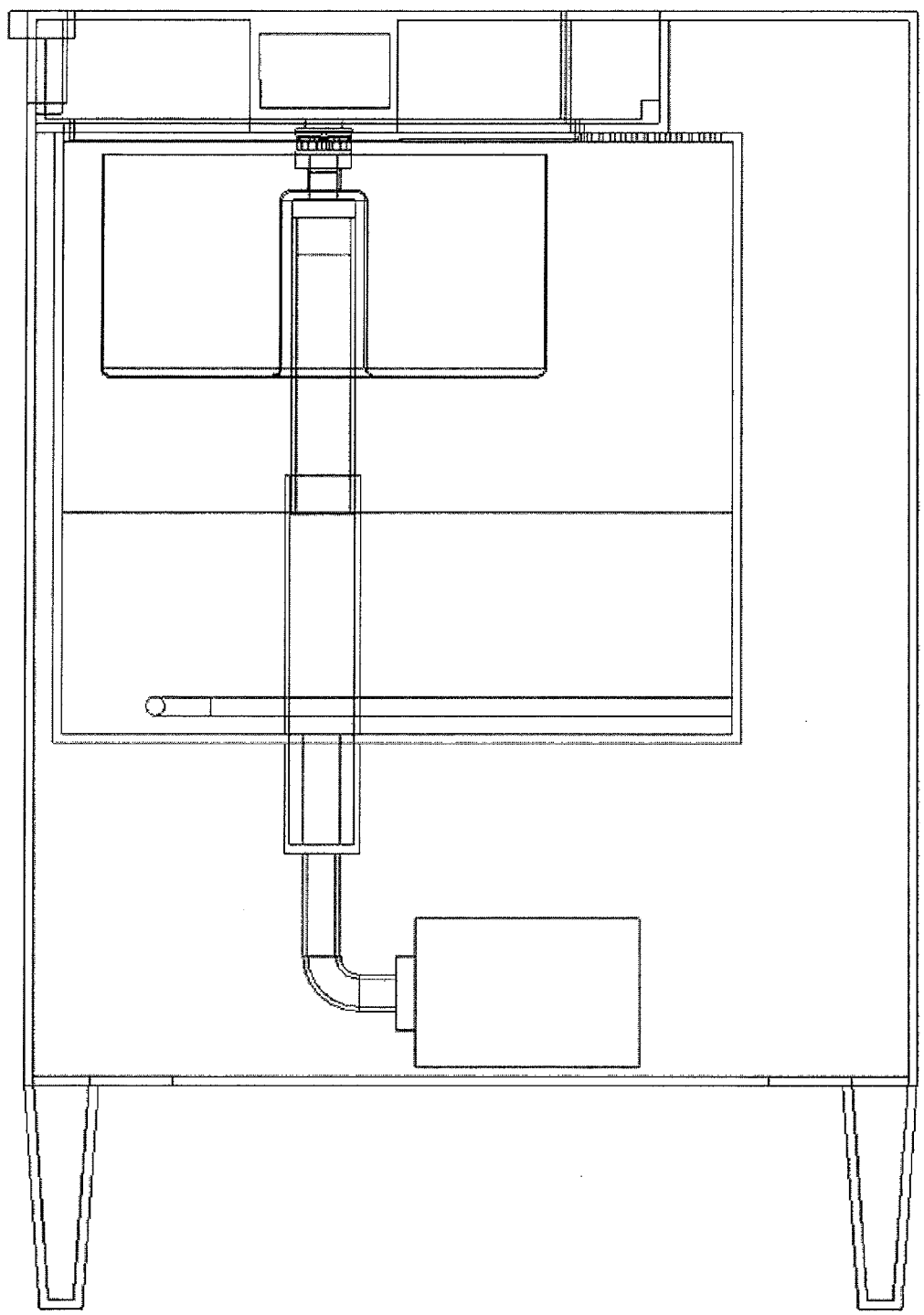
FIG. 32F illustrates a further side cross-sectional view of the embodiment illustrated in FIG. 32A with a basket in a spinning section of the cooking device.
Figure 33A:
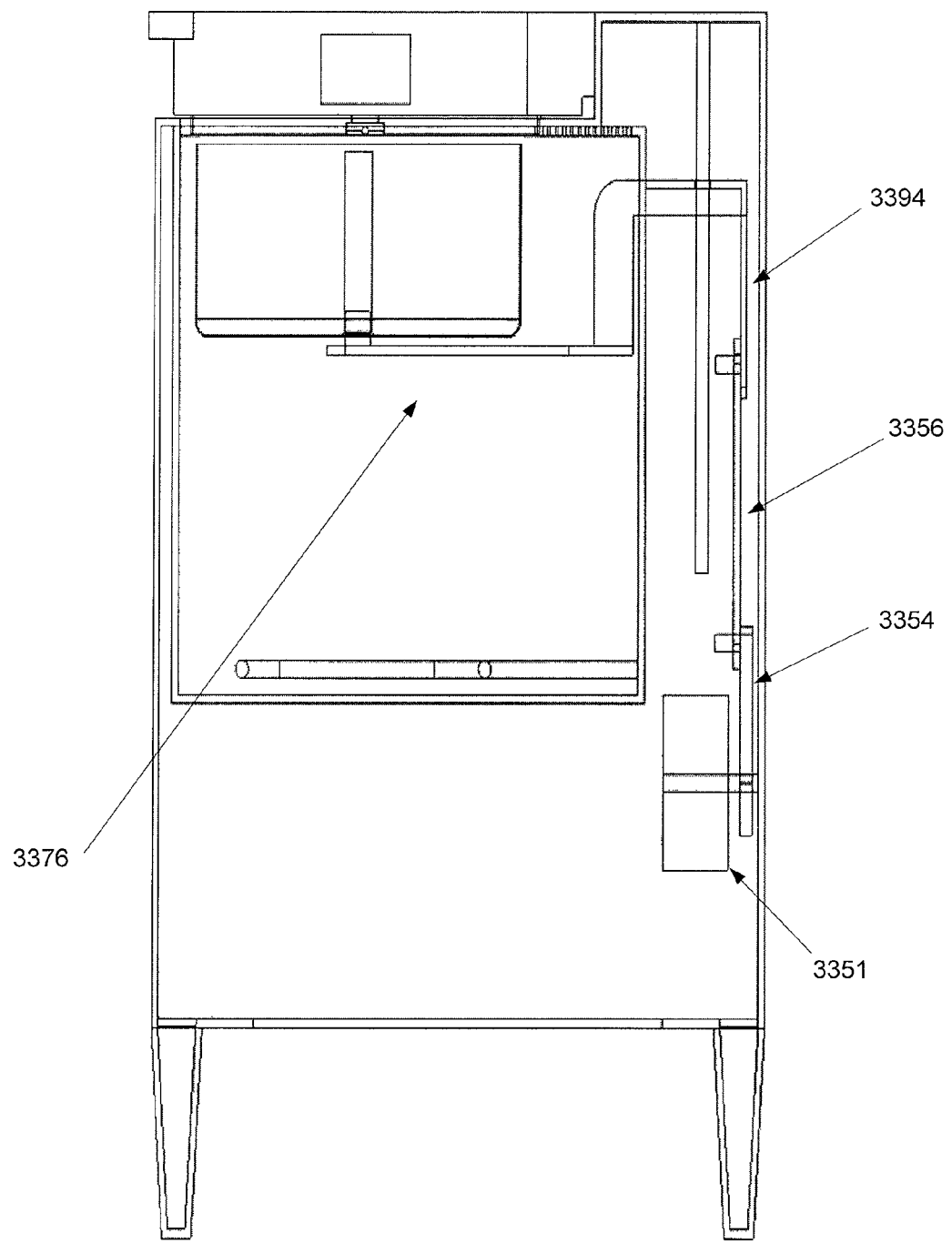
FIG. 33A illustrates a side cross-sectional view of a cooking device with a linkage lift mechanism according to an embodiment of the invention.
Figure 33B:
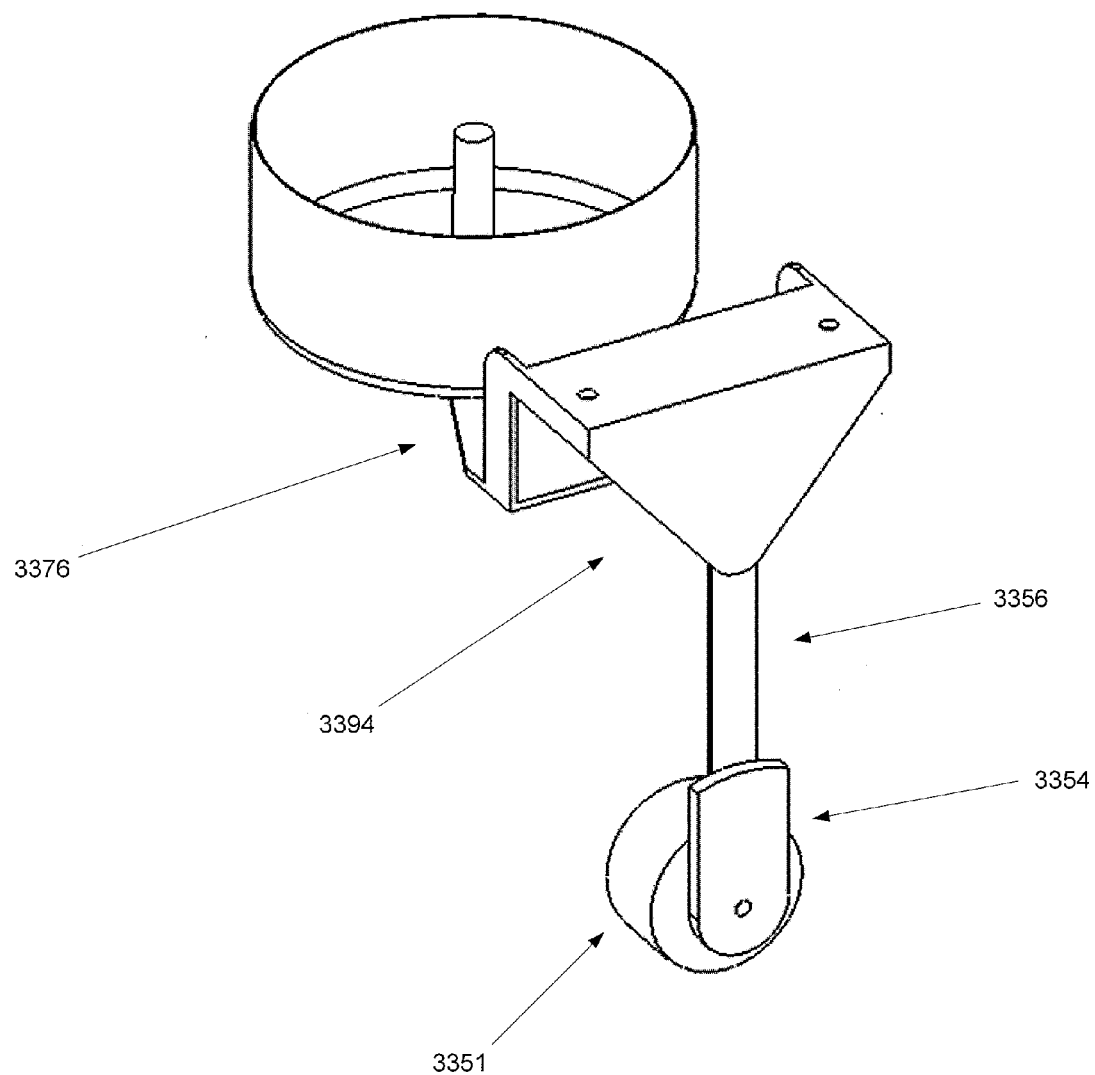
FIG. 33B illustrates a perspective view of the linkage lift mechanism illustrated in FIG. 33A.
Figure 33C:
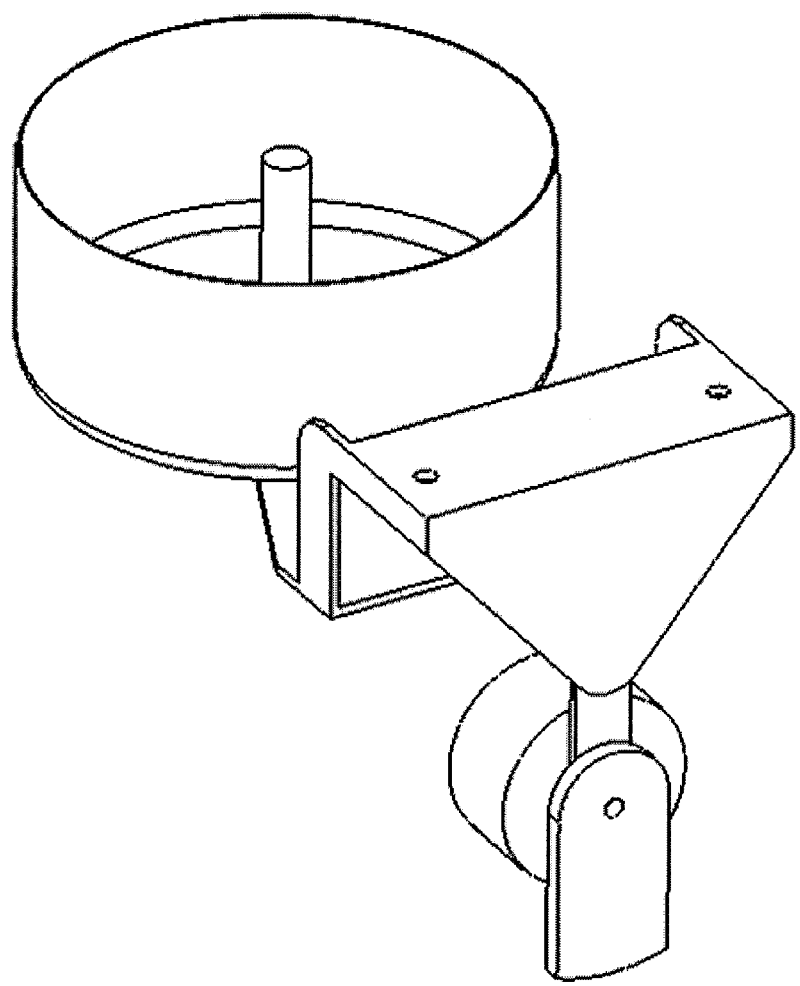
FIG. 33C illustrates a perspective view of another linkage lift mechanism according to an embodiment of the invention.
Figure 33D:
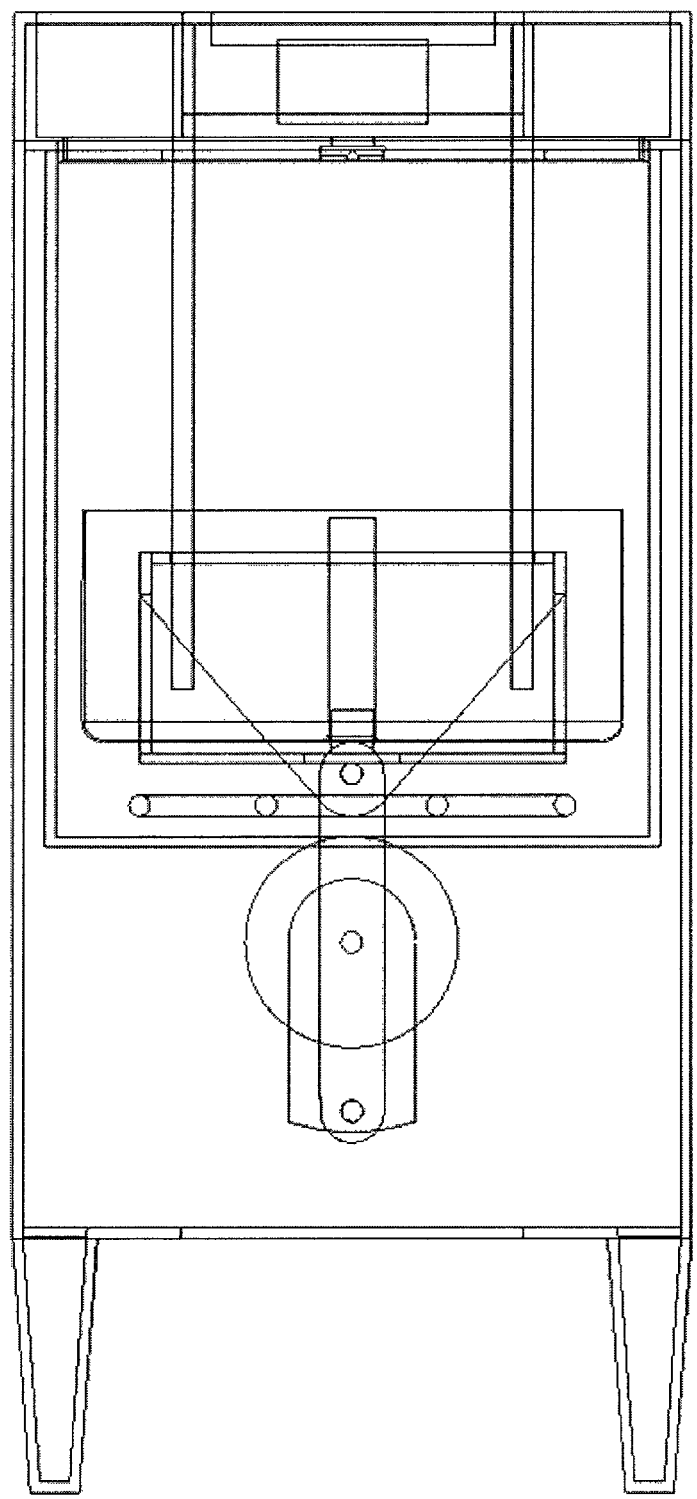
FIG. 33D illustrates a back cross-sectional view of the embodiment illustrated in FIG. 33A with a basket in a cooking section of the cooking device.
Figure 33E:
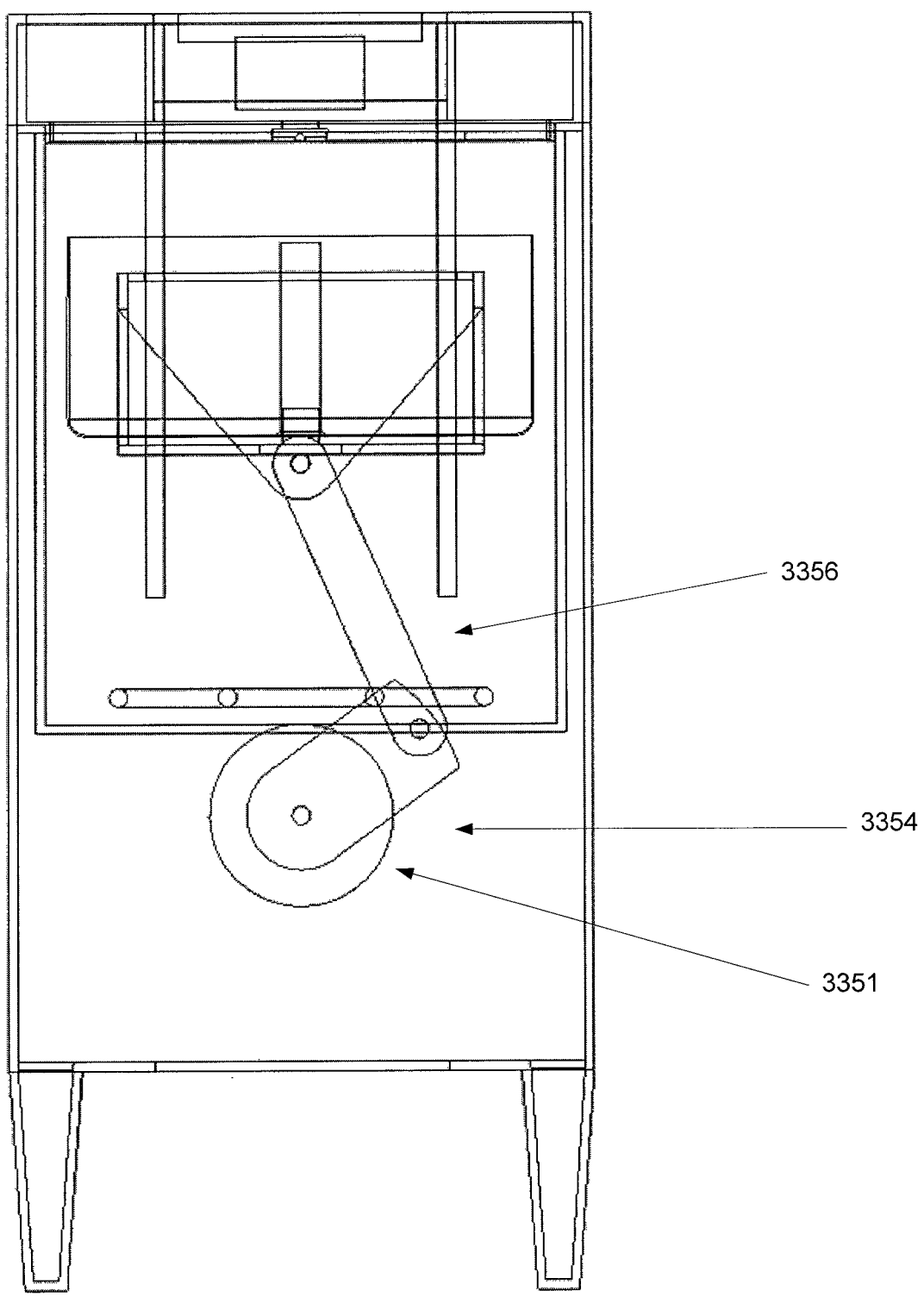
FIG. 33E illustrates a back cross-sectional view of the embodiment illustrated in FIG. 33A with a basket in between a cooking section and a spinning section of the cooking device.
Figure 33F:
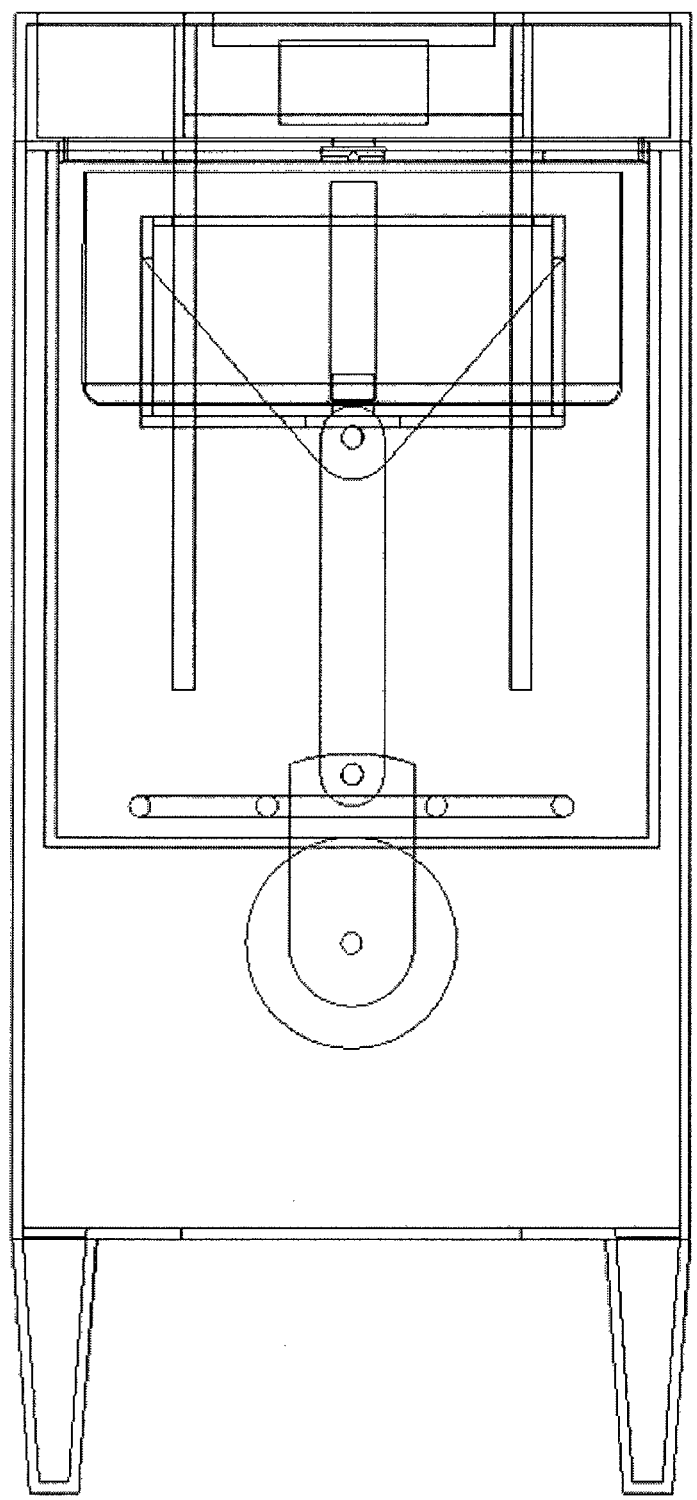
FIG. 33F illustrates a back cross-sectional view of the embodiment illustrated in FIG. 33A with a basket in a spinning section of the cooking device.
Figure 33G:
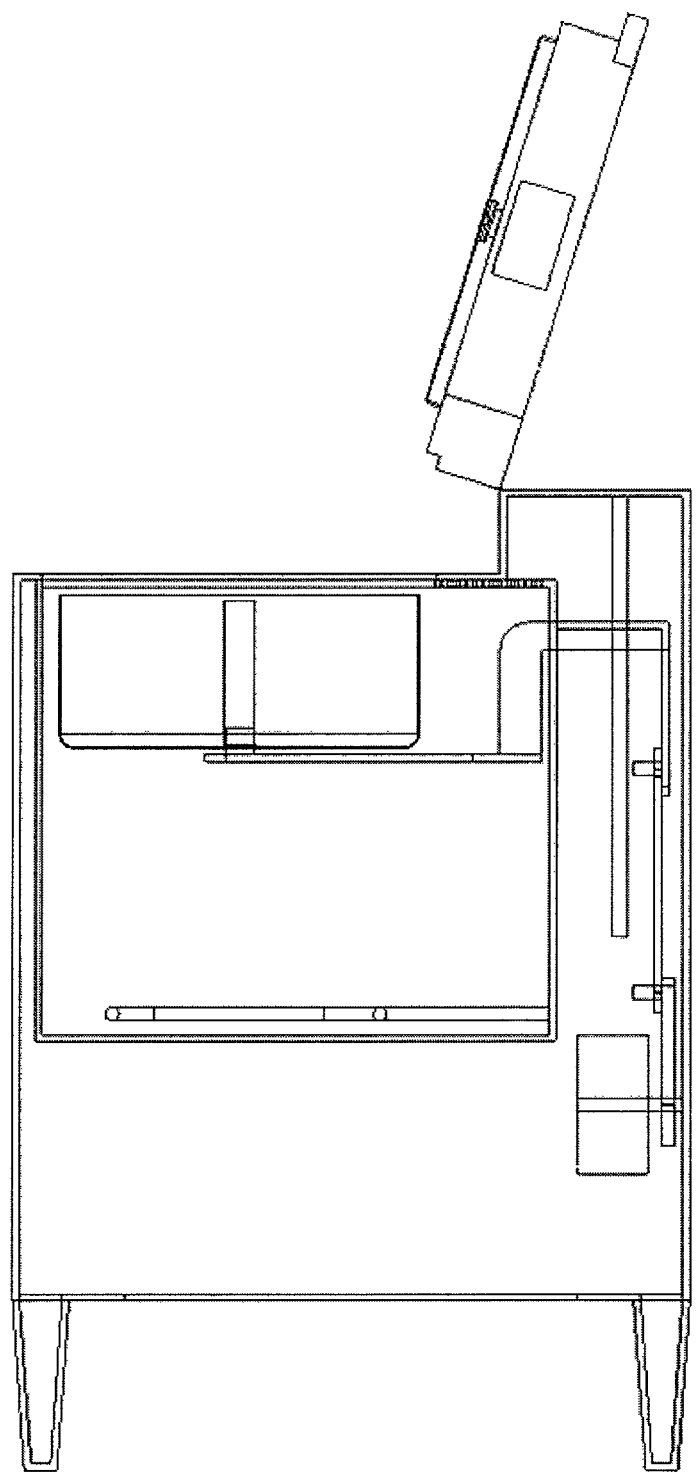
FIG. 33G illustrates a side cross-sectional view of the embodiment illustrated in FIG. 33A with a cover open.
Figure 33H:
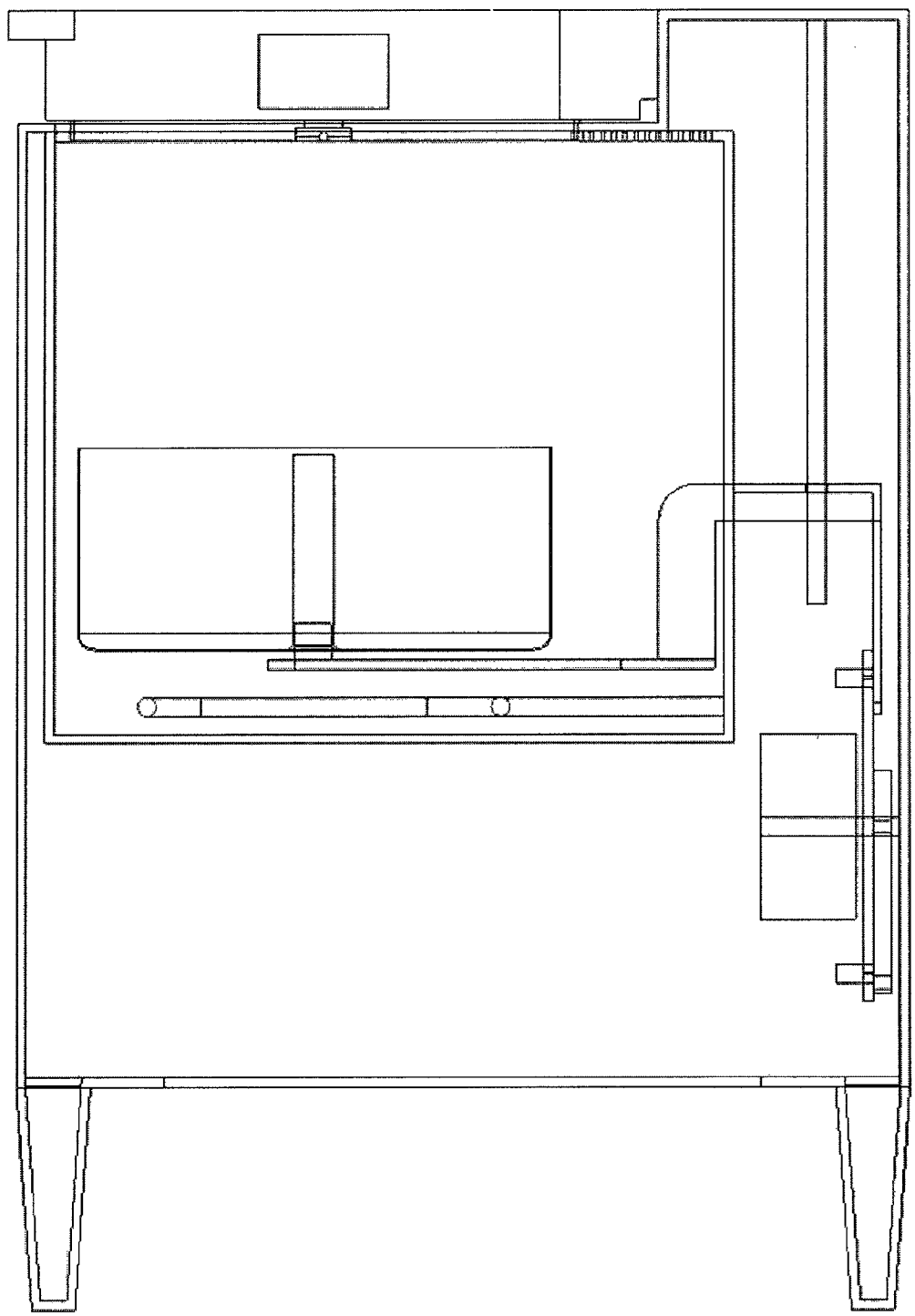
FIG. 33H illustrates a side cross-sectional view of the embodiment illustrated in FIG. 33A with a basket in a cooking section of the cooking device.
Figure 34A:
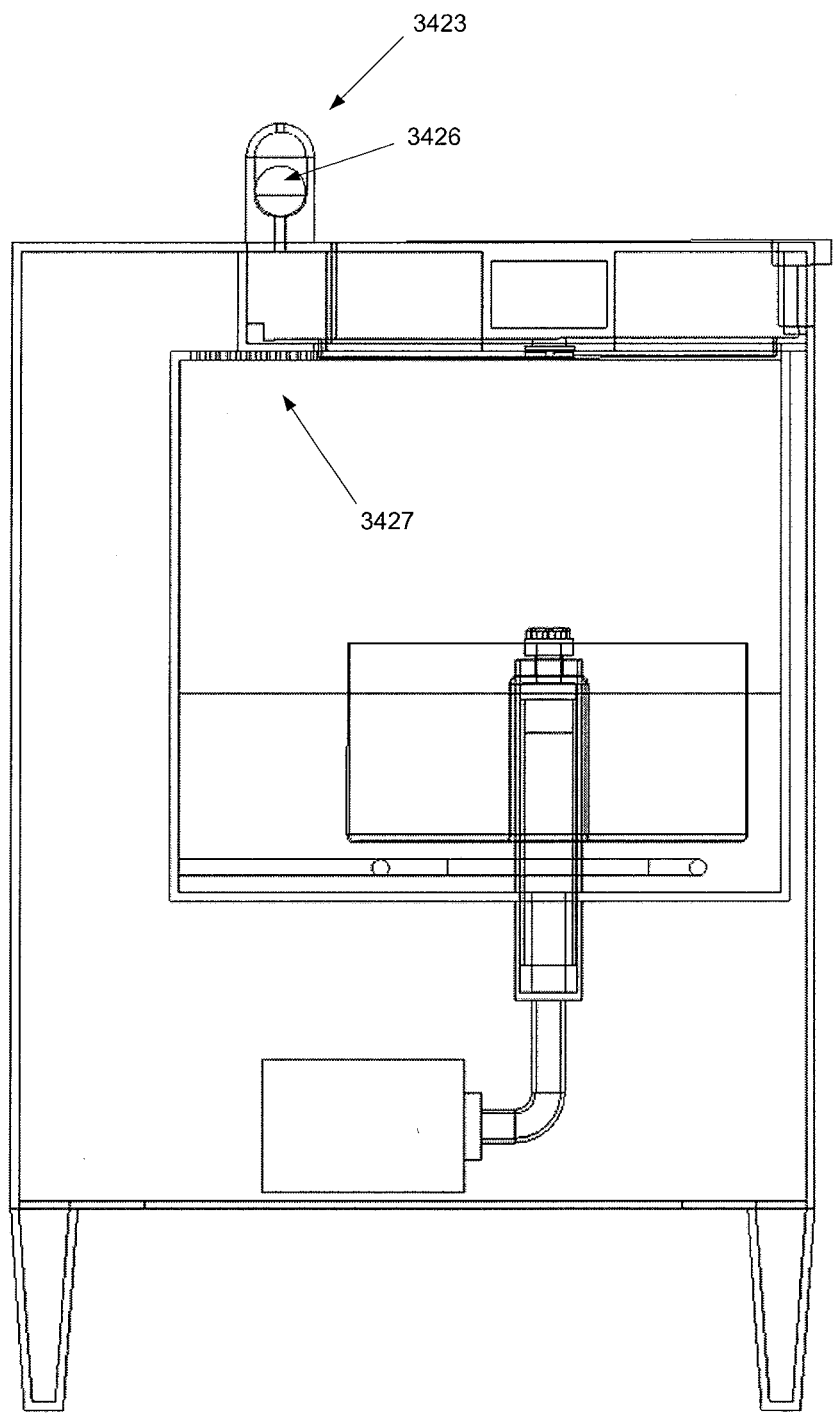
FIG. 34A illustrates a side cross-sectional view of a cooking device with a pressure-relief valve according to an embodiment of the invention.
Figure 34B:
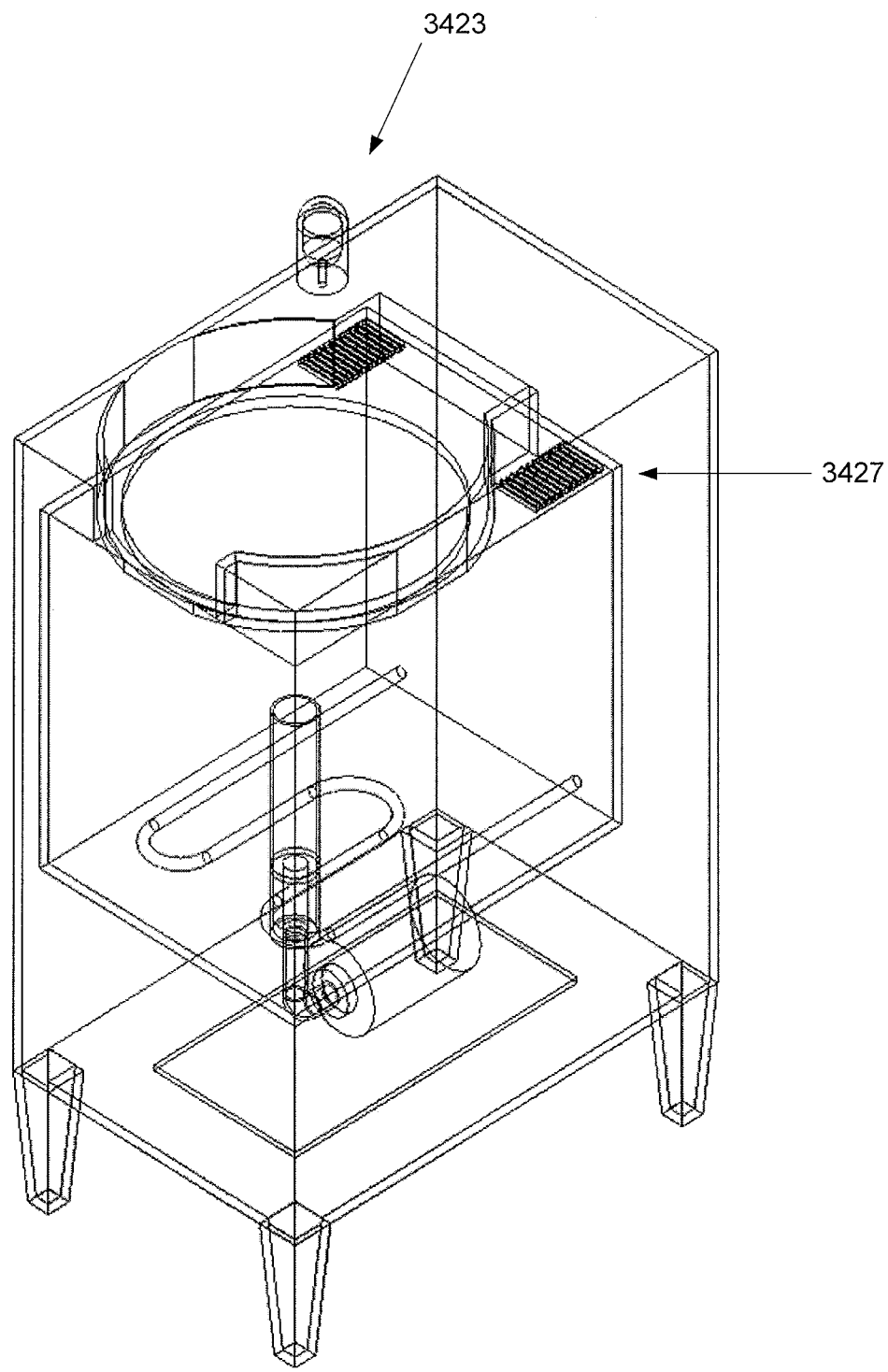
FIG. 34B illustrates a perspective view of the embodiment illustrated in FIG. 34A.
Figure 34C:
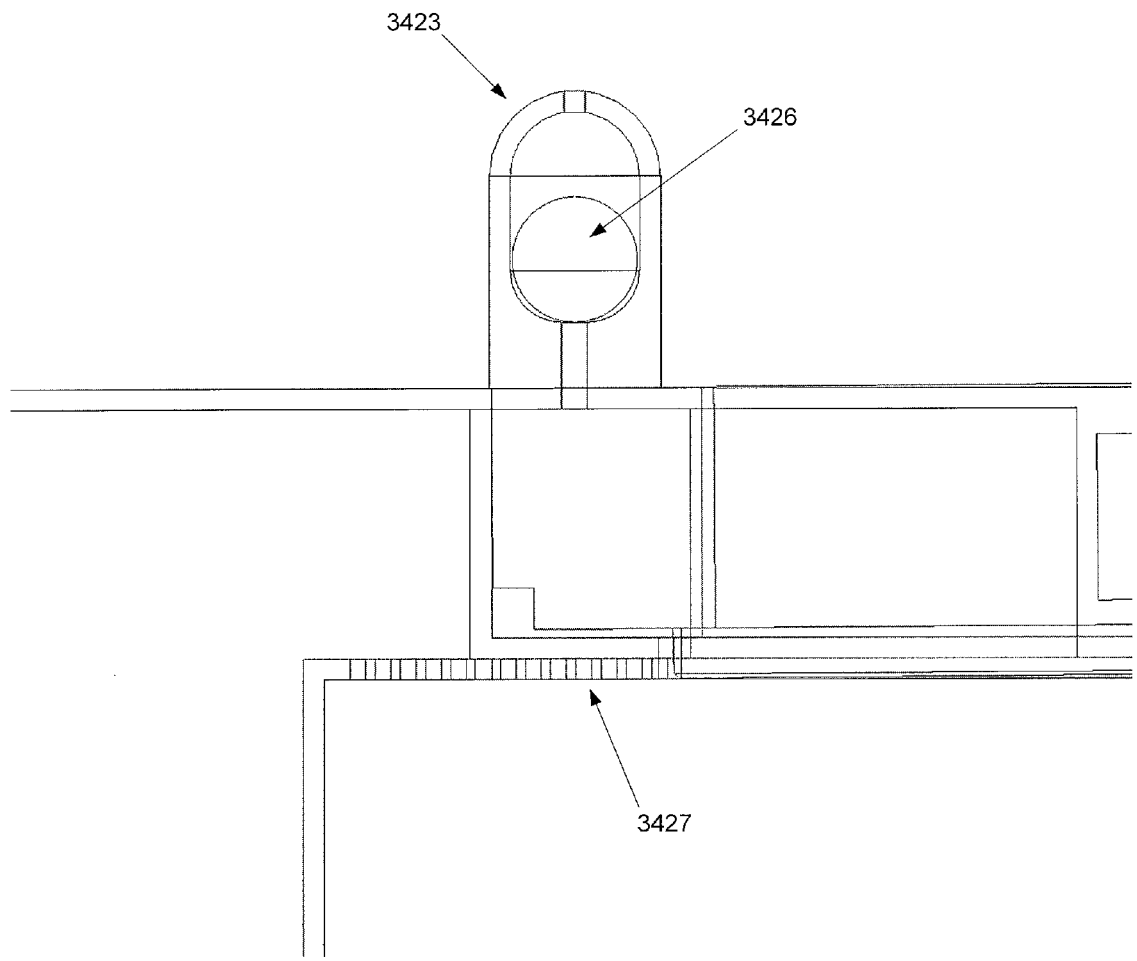
FIG. 34C illustrates a side cross sectional view of a pressure-relief valve according to the embodiment illustrated in FIG. 34A.
Figure 34D:
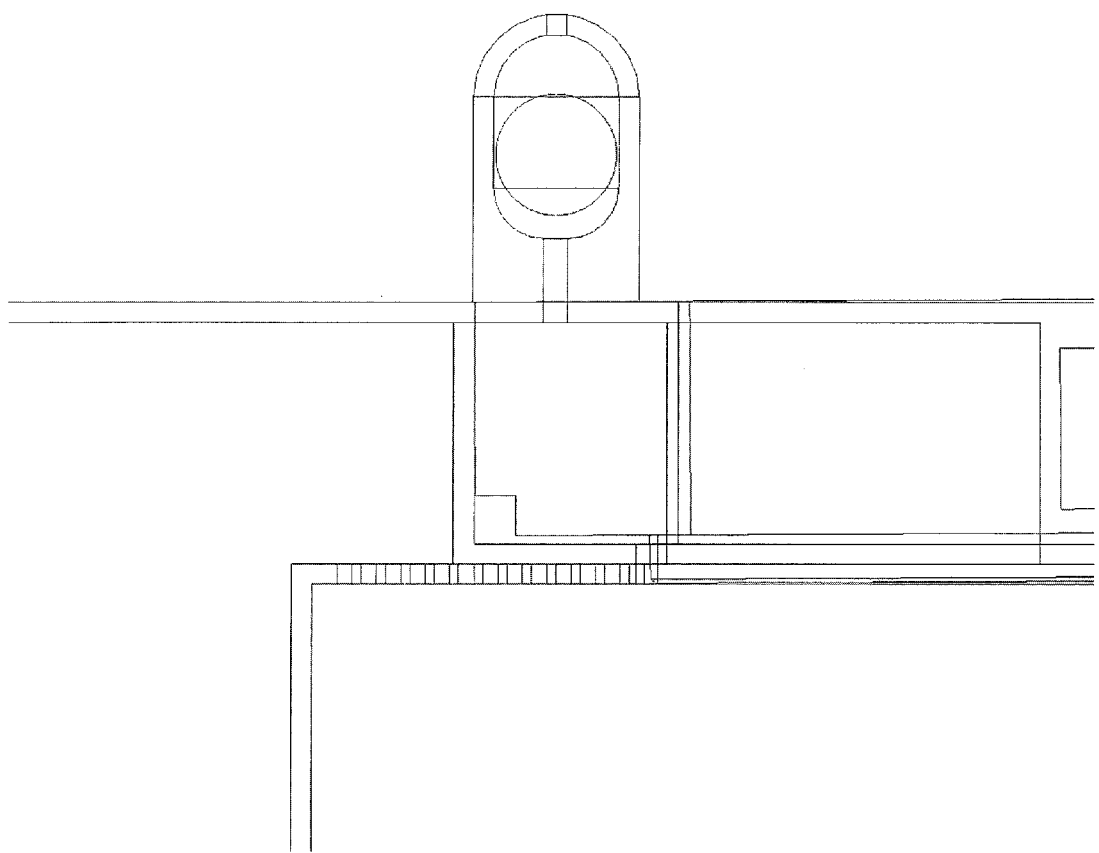
FIG. 34D illustrates another side cross sectional view of a pressure-relief valve according to the embodiment illustrated in FIG. 34A.

In accordance with other embodiments of the invention, mechanisms may be employed to recycle and/or reuse heated air within the cooking device. With reference to FIG. 30, a heating table 3076 may be employed to facilitate maintaining an elevated temperature of the cooked food after the cooking process. For example, heating table 3076 may be heated by heated air extracted from the cooking device, such as heated air that is removed from the cooking device via a pressure release valve. The heated air may be routed to heating table 3076, and may run through a heat exchanger and/or series of tubes within heating table 3076 to facilitate elevating the temperature of heating table 3076. In other embodiments, cover 3016 may comprise a heat exchanger 3092 on the inside surface of cover 3016. During the cooking process, a liquid within heat exchanger 3092 may be heated, and this heated liquid may then flow through a heat exchanger in heating table 3076 as discussed above. Such a configuration may be desirable in a commercial environment where the cooked food is not served immediately after the cooking process is completed. Such a configuration may further be desirable to allow the cooked food to reach a temperature that is safe for consumption, but without cooling to a point that the cooked food is no longer desirable.

Further embodiments of the present invention comprise methods for reducing oil content from fried foods that are more efficient than previously-known methods for reducing oil content. As discussed above, top cover 16 remains closed during the oil removal process, which causes the temperature of the fried food to remain close to the temperature of cooking oil 22. At this elevated temperature, the cooking oil within and covering the fried food is less viscous. Because the oil is less viscous, it is more amenable to separation from the fried food during the oil removal process, thus making the oil removal process more efficient.

A method for automatically frying and reducing the oil content of a fried food according to an embodiment of the invention is now described. It should be understood that any of the cooking device structures disclosed herein (including without limitation lift mechanisms, spinning mechanisms, vibration mechanisms, motors, covers, baskets, basket wells, frame structures, and the like) may be automated, and the following disclosure is only an example according to an embodiment of the present invention. Cooking device 10 is provided, as well as a target food to be fried. A user instructs cooking device 10 with regards to the different variables involved in the frying process. For example, the user may specify a type of food, a quantity of food, a desired frying result (e.g., rare, medium-rare, medium, medium-well, well-done, etc.), an oil temperature, a frying time, an oil removal time (e.g., time for spinning), and the like. Controller 55 accepts the instructions and opens top cover 16 automatically upon the user's signaling that all instructions have been made. In other embodiments, top cover 16 may be manually opened by the user. The user loads the target food into loading chute 445 and instructs cooking device 10 to close top cover 16 and being the frying process. In other embodiments, some of the processes may be performed manually (e.g., manually opening the cover), and in still other embodiments, controller 55 may automatically determine certain operating parameters.

After top cover 16 is closed, cooking device 10 performs the frying process automatically. In certain embodiments, cooking device 10 has a manual override that allows the user to interrupt the automatic frying process. Controller 55 ensures cooking oil 22 is at the appropriate temperature by measuring the temperature and instructing heating element 80 to produce more or less heat. Controller 55 then instructs linear motor 50 to move basket 40 into oil section 20 to begin the frying process and/or perform manual tasks. While basket 40 is in oil section 20, basket 40 may be agitated, rotated, spun and/or otherwise moved in order to prevent the target food from sticking together and/or to facilitate the frying of the target food. Controller 55 may direct the moving of basket 40 in response to input from the user and/or as part of a pre-programmed routine. Controller 55 may communicate with and instruct various cooking device components in order to facilitate the movement of basket 40. For example, spin motor 60, linear motor 50, and/or rotational motor 65 may be instructed to move basket 40.

When controller 55 determines that the target food has been cooked according to the user's specifications, controller 55 instructs linear motor 50 and/or rotational motor 65 to move basket 40 into spinning section 30. Controller 55 further instructs basket 40 to begin spinning by instructing any of linear motor 50, spin motor 60, and/or rotational motor 65 to spin basket 40. A user may predetermine a spinning speed for basket 40 and controller 55 may operate the basket at the predetermined speed. Controller 55 may also automatically determine the required spinning speed depending on other operating conditions. In other embodiments, basket 40 need not spin, but may be moved in other ways that remove excess oil from the target food, for example, by agitation and/or ultrasonic motion. During the spinning process, according to some embodiments, controller 55 monitors the temperature of spinning section 30 and may instruct heating element 80 to increase its heat output in order to increase the temperature of cooking oil 22, thereby increasing the temperature in spinning section 30. During the spinning process, top cover 16 remains closed, thus minimizing the rate of temperature loss within the target food (C, as discussed above).

According to further embodiments, when controller 55 determines that the spinning process should be terminated, controller 55 ceases movement of basket 40 and instructs top cover 16 to open. Controller 55 may control top cover 16 via servo 410, for example. Controller 55 then instructs basket 40 to discharge the target food through discharge chute 440. Various methods of discharging the target food may be employed according to various embodiments of the invention, and one embodiment is disclosed here. For example, cooking device 10 may comprise servo 412 that is attached to discharge arms 414, 415. Discharge arms 414, 415 are configured to interface with basket 40 and to allow servo 412 to rotate basket 40 away from frying vessel 14 so as to discharge the target food through discharge chute 440. Controller 55 then returns basket 40 to frying vessel 14, and, depending on the user's instruction, may instruct cooking oil 22 to cool down. Although this embodiment has been described in terms of automated processes, manual processes may be employed to carry out the present invention.

Although the term "controller" has been used to describe the electronic and/or automated controlling of various processes, it should be appreciated that such functionality may be realized by any number of hardware and/or software components configured to perform the specified functions. For example, various embodiments may employ various integrated circuit components (e.g., memory elements, processing elements, logic elements, look-up tables, and/or the like), which may carry out a variety of functions under the control of one or more microprocessors or other control devices. Similarly, the software elements of the various embodiments may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and/or the like.

The "controllers" discussed herein may also comprise computing systems including a processor configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including cooking, temperature, food type and like data that may be used in association with the present embodiments. As those skilled in the art may appreciate, a user interface for each system described herein may be configured to include an operating system (e.g., Windows NT, 95/98/2000/XP/Vista, Linux, Unix, Solaris, etc.) as well as various conventional support software and drivers typically associated with computers.

Various information and data are described herein as being "stored." In this context, "stored" may mean that the information is kept on a database. In accordance with the various embodiments, a database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Association techniques include common techniques such as using a key field in the tables to speed searches, sequential searches through all the tables and files, and sorting records in the file according to a known order to simplify lookup. In other embodiments, data may not be stored in a database, but may be stored by any other known means for storing data.

In accordance with various embodiments, any suitable data storage technique may be utilized to store data. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

An embodiment of the invention comprises a storage medium configured to provide instructions to a computer processor for carrying out the various cooking processes and steps disclosed herein. As used in this application, "storage medium" may be anything capable of storing information, for example, magnetic tape, RAM, ROM, compact disc media, flash memory, solid state memory, and the like. As mentioned above, a processor may be any device capable of reading and/or accessing the storage medium, and the processor may be configured to be part of the controller. In other embodiments, the processor may be separate from the controller.

In embodiments, the computer processor may be configured to receive a number of inputs from a user, such as food type, cook time, spin time, cook temperature, spin temperature, spin speed, and food result (e.g., rare, medium rare, medium, medium well, well). In some embodiments, the user may provide only some of the above inputs, and the processor may be configured to automatically calculate and/or produce the other inputs. Any inputs relevant to the functionality of the cooking device may be received from a user and/or produced automatically by the processor. The processor may be configured to receive the inputs from a user interface and/or via algorithms, pre-loaded instructions, and/or other processes that do not require user input.

The storage medium may further provide instructions to the processor such that the processor may be configured to (1) open and/or close the fryer drawer and/or lid; (2) move the basket well between the cooking and spinning sections; (3) maintain a desired temperature in the cooking and spinning sections; (4) allow the cooked food to remain in the cooking section for a desired cook time; (5) rotate the basket well and/or food basket in the spinning section for a desired spin time; (6) set speeds for the various motors; and/or (7) perform other functions contemplated within the scope of this disclosure. It should be understood that any of the above functions may be performed automatically by the processor, and/or certain of the functions may be performed by the processor, and others may be performed manually. In further embodiments, the storage medium may be configured to instruct the processor to store a number of pre-configured cooking procedures depending on various types of food, food results, users, operating conditions, and the like. Where such a pre-configured procedure is employed, a user may need to only make one or a limited number of choices, and the processor may then fully automatically complete the cooking process. In other embodiments, the processor may require user input at various times during the cooking process.

In an embodiment, a user may input a food type and a desired food result via a user interface on the frying device. In other embodiments, a user may provide inputs to the cooking device via a network connection, such as via Internet, Ethernet, cellular, wireless, wired satellite, infrared, radio frequency and the like network and/or communications systems.

Figure 5:
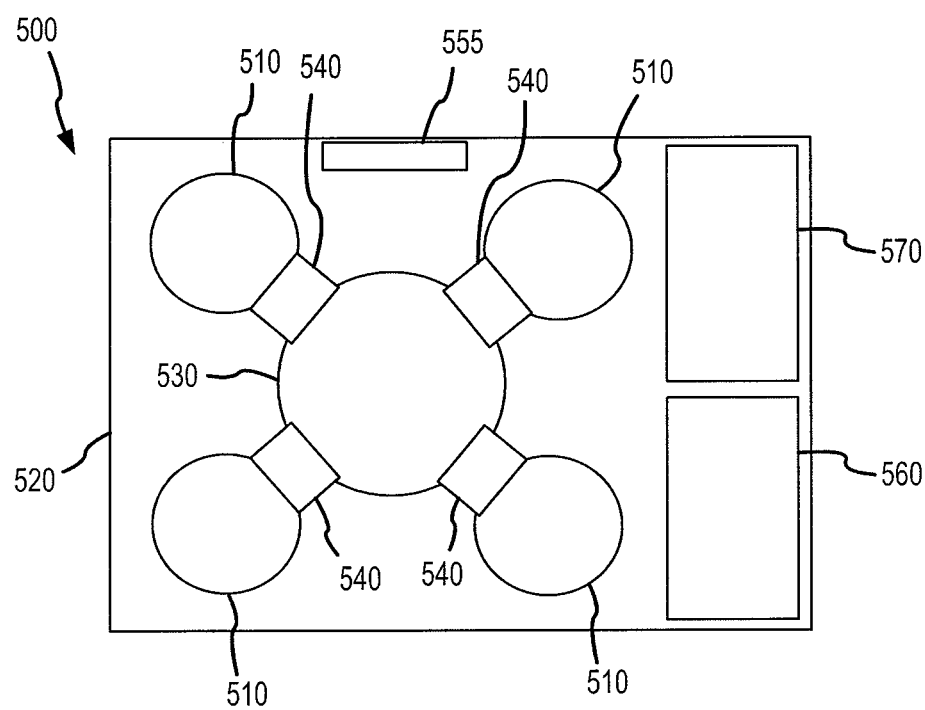
FIG. 5 illustrates a schematic of a cooking system according to an embodiment of the present invention.

In accordance with another embodiment of the present invention, a frying system 500 capable of removing oil content from fried food is now disclosed with reference to FIG. 5. Frying system 500 comprises a system housing 520 which comprises a plurality of cooking devices 510. Cooking devices 510 may be similar in structure and may be operated in a similar manner to cooking device 10 discussed previously. Cooking devices 510 may also be any device capable of frying or otherwise frying food. System housing 520 further comprises a spinner 530 which receives fried food from cooking devices 510 via discharge chutes 540 and/or via manual placement of the fried food in spinner 530 by a user. After cooking devices 510 have cooked the fried food, spinner 530 receives the fried food and processes the fried food in order to remove excess oil content from the food. In certain embodiments, cooking devices 510 may carry out their own spinning and/or oil removal operations prior to depositing the fried food in spinner 530, or they may deposit the fried food directly after frying it in the cooking oil. System housing 520 also comprises a system controller 555 which communicates with and directs operation of the various components in frying system 500.

According to further embodiments, system housing 520 is configured to increase the safety associated with the operation of frying system 500. For example, system housing 520 may comprise a fire suppression system 570. Fire suppression system 570 is operable to automatically detect and extinguish fires within system housing 520. In other embodiments, a user can manually instruct fire suppression system 570 to extinguish a fire and/or a threat of fire within system housing 520. According to other embodiments, system housing 520 further comprises a ventilation system 560 for increased safety, circulation, and/or degree of desirable environmental conditions. In further embodiments of the invention, ventilation system 560 is operable to remove oil-filled, heated air from system 500.

In accordance with another embodiment of the present invention, frying system 500 comprises a frying system cover. The frying system cover reduces temperature loss to the surroundings of the frying system which decreases the cooling rate of the fried food during the spinning process. Frying system 500 may further comprise heating elements such as heat lamps, resistive heating elements, gas burners, and other mechanisms for providing heat. The heating elements within system housing 520 may regulate the temperature within system housing 520 and regulate the temperature of the fried food during the oil removal process.

In certain embodiments of the invention, spinner 530 may be present in system housing 520 and cooking devices 510 may not be present. In such an embodiment, fried food from fryers external to system housing 520 is placed in spinner 530 and then the frying system cover is closed. Spinner 530 removes excess oil from the fried food and frying system 500 maintains the temperature of the fried food during the spinning process.

In still other embodiments of the present invention, cooking devices 510 may be present in system housing 520 and spinner 530 may not be present. In these embodiments, cooking devices 510 are nearly identical to cooking device 10 discussed above. Each cooking device 510 is independently operated and controlled and/or operated and controlled in conjunction with the other cooking devices 510. After the settings for the cooking devices 510 have been inputted by a user. The frying system cover is closed and the cooking devices 510 operate automatically to produce the fried food. The fried food from each of the cooking devices may be deposited within a fried food receptacle within system housing 520, and the fried food may be kept warm in the receptacle by heat lamps, heating elements, and or other devices for heating an enclosed space. When all of the cooking devices 510 are finished, the frying system cover may be opened, and the fried food may be served. Such an embodiment increases the amount of fried food that may be produced and provides a mechanism for maintaining a desirable temperature of the fried food until it is served.

Figure 15B:
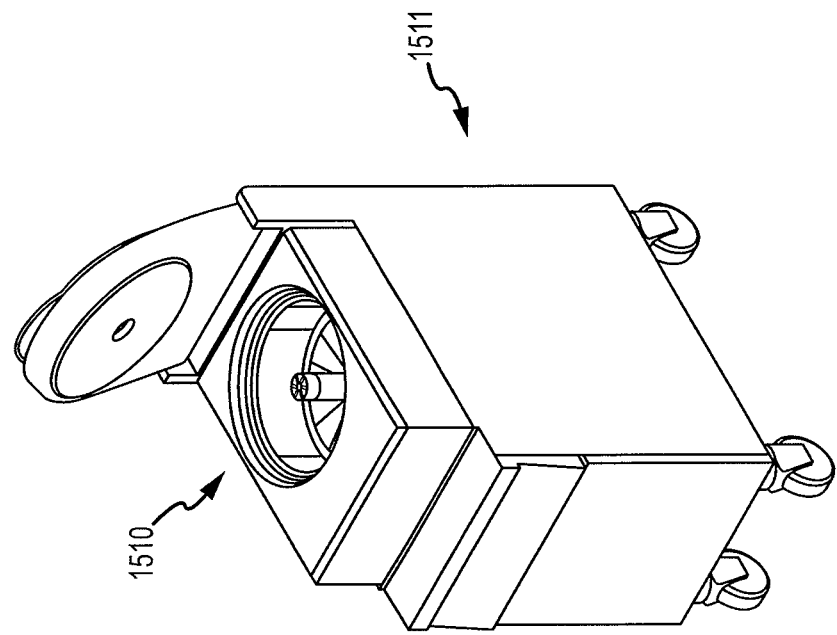
FIG. 15B illustrates a perspective view of a retrofit cooking device according to an embodiment of the present invention.
Figure 15A:
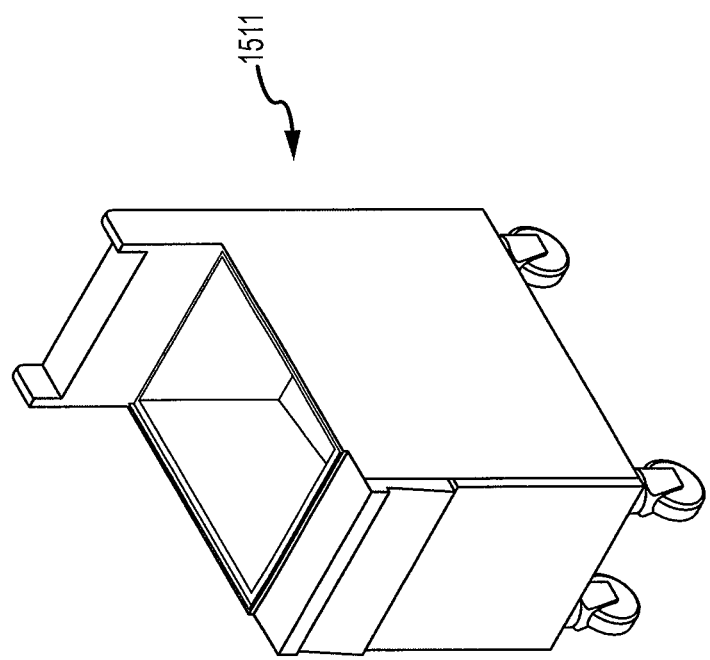
FIG. 15A illustrates a perspective view of a pre-existing cooking device according to an embodiment of the present invention.

In an embodiment, and with reference to FIGS. 15A-15B, retrofit cooking device 1510 may be configured to be retrofitted to a pre-existing cooking device 1511. The pre-existing cooking device 1511 comprises an oil-heating and cooking section where food is cooked, for example, by means of a basket manually lowered into the oil and then manually removed. In an embodiment, a retrofit surface of retrofit cooking device 1510 may be configured to abut and/or be attached or secured to pre-existing cooking device 1511. Retrofit cooking device 1510 may be configured to accept food into a basket, lower it into pre-existing frying vessel 1511 to fry the food, and then raise the food up for spinning in a heated, enclosed environment.

Exemplary retrofit cooking devices as disclosed here may further comprise a retrofit housing, and the retrofit housing may comprise a spinning section for removing oil from cooked food, and may comprise the retrofit surface. The retrofit housing may be configured to comprise several components, such as the frame, motors, bearings, guide shafts, and/or gears. These components may reside exclusively within the retrofit housing, or some of them may reside exclusively in the housing, and others may be extendable into the cooking section of the pre-existing fryer. It is desirable to keep some of the components out of the cooking section of the pre-existing fryer in order to protect them from the cooking fluid, such as oil, that is present in the cooking section of the pre-existing fryer. For example, with reference to FIGS. 6A-C, basket well 642 may be configured to extend below the retrofit surface and into the cooking section of the pre-existing fryer in order to enable the food to be cooked. But guide shafts 691, slider 693, slider track 692, motor 662, gear 604, and/or other components may not extend outside of the retrofit housing, or they may only partially extend outside of the retrofit housing.

Pre-existing fryers such as pre-existing cooking device 1511 generally already contain the frying vessel, oil section, and necessary heating element(s). A substantial amount of space may have been allocated for such devices, which tend to be large and expensive. Instead of completely replacing the pre-existing fryers at a substantial cost, this invention allows the pre-existing fryers to be used in conjunction with retrofit cooking device 1510 in order to provide the various advantages associated with the present invention.

It should be noted that while any of the cooking devices disclosed herein may be configured to be retrofitted to pre-existing cooking devices, an embodiment of retrofit cooking device 1510 does not comprise any component other than the basket well that needs to be submerged into the cooking oil of pre-existing cooking device 1511. For example, with reference to FIGS. 1 and 2, cooking device 10 comprises a shaft 90 that runs through oil section 20. However, with reference to FIGS. 8, 9, and 12, there are no components that reside within and/or pass through the oil section; rather, substantially all the components (with the exception, for example, of the heating elements) are located within the spinning section. Therefore, the embodiments illustrated in FIGS. 8, 9, and 12 would be more amenable to retrofitting because they would not require the insertion of any components other than the basket well into the oil section of pre-existing cooking device 1511. Retrofit cooking device 1510 according to these embodiments would sit on top of and/or be attached to the top of pre-existing cooking device 1511.

In accordance with further embodiments of the invention, a commercial-type frying device comprises an oil section where a food item is fried, a spinning section where excess oil, grease, fat and the like are removed from the food, and a conveyor system for moving the fried food to the spinning section. In various embodiments, the food is fried within a frying vessel and then either removed and transported to the spinning section, or the food is moved to a combined spinning section and conveyor system, which removes oil and transports the food simultaneously. In other embodiments, the conveyor system is integrated with the oil removal section, for example, while traveling through the conveyor system, oil may be removed from the food. The conveyor system may be automatically or manually operable. Additionally, in accordance with various embodiments of the present invention, a food freezing and/or packaging system may also be present. Furthermore, the conveyor system and oil removal section may be suitably maintained at an elevated temperature (in accordance with C as discussed above) to aid in reducing cooling of the food during transport and oil removal, for example, a heating element may be used in these sections. Additionally, various controllers may regulate, among other aspects, the movement of the conveyor.

In various embodiments, the food frying system may comprise a plurality of oil removal devices located within the conveyor system. For example, the oil removal devices may be connected to a conveyor belt, each capable of independent rotation, and all contained within a housing configured to maintain an elevated temperature as noted above.

Figure 36A:
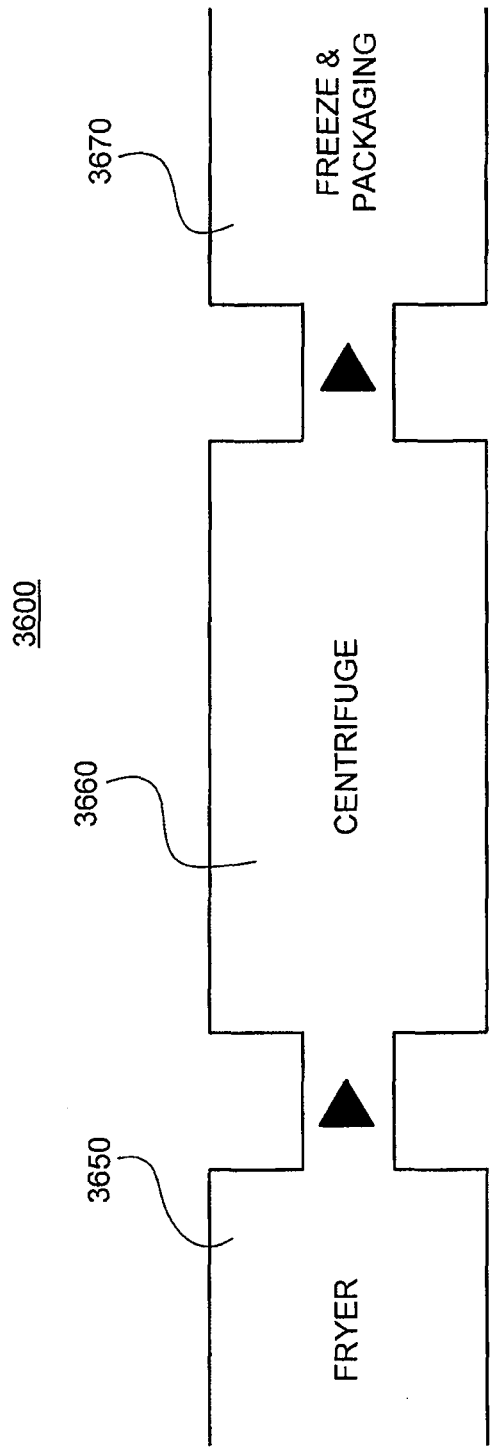
FIG. 36A illustrates a schematic diagram of a cooking device with a conveyor apparatus according to the present invention.

With reference to FIG. 36A, an exemplary embodiment of the frying device is described. Frying device 3600 comprises a fryer section 3650, a combined conveyor and cooking oil removal section 3660, and a freeze and/or package section 3670. The frying section 3650 houses and/or heats cooking oil for frying the food, and a mechanism for heating cooking oil is also provided. In exemplary embodiments, this mechanism may comprise a heating element in thermal contact with the cooking oil, operable to heat the cooking oil. In other embodiments of the invention, a thermally conductive material may be present between the heating element and the cooking oil.

For example, the heating element may be located outside of, but in thermal contact with the fryer section 3650, which may have thermally conductive walls, or may have a partially thermally conductive wall proximate the heating element. In yet other embodiments, where the heating element is located within fryer section 3650, fryer section 3650 may be thermally insulated in order to aid in maintaining the outside of frying device 3600 at a safe operating temperature. The heating element is operable to be driven by electricity, gas, solar power, and the like.

In other embodiments, the heating element, or additional heating elements, may be located within a section other than fryer section 3650 and/or may be located both within the spinning and oil sections. In still other embodiments, two or more heating elements may be used. For example, one heating element may be used to heat the oil in the oil section, and a second heating element may be used to aid in maintaining a desirable temperature in the conveyor/oil removal sections. Employing a second heating element for heating the conveyer/oil removal sections aids in increasing the amount of oil removed from the fried food. The higher the temperature during, for example, a spinning process, the less viscous the oil is so it is easier to spin off, and the higher the temperature, the less oil has been drawn to the center of the fried food. Thus, where spinning occurs at higher temperatures, more oil is available to be spun off the fried food.

In the presently described embodiment, with continuing reference to FIG. 36A, upon completion of frying, food is transported to the conveyor/removal section 3660, where oil is removed from the fried food for example, by a horizontal decanting centrifuge or a spinning basket containing the fried food, preferably at an elevated temperature. After oil removal, the food is deposited into the freezing/packaging section 3670. The frying device 3600 and/or the various components thereof may be automatically or manually operable.

In various embodiments, in the frying section 3650, the food is fried in vessels suitable for containing heated oil and food and/or in baskets. Likewise, in the oil removal section 3660, oil may be removed from fried foods placed in baskets or similar vessels suitable for oil extraction.

Figure 36B:
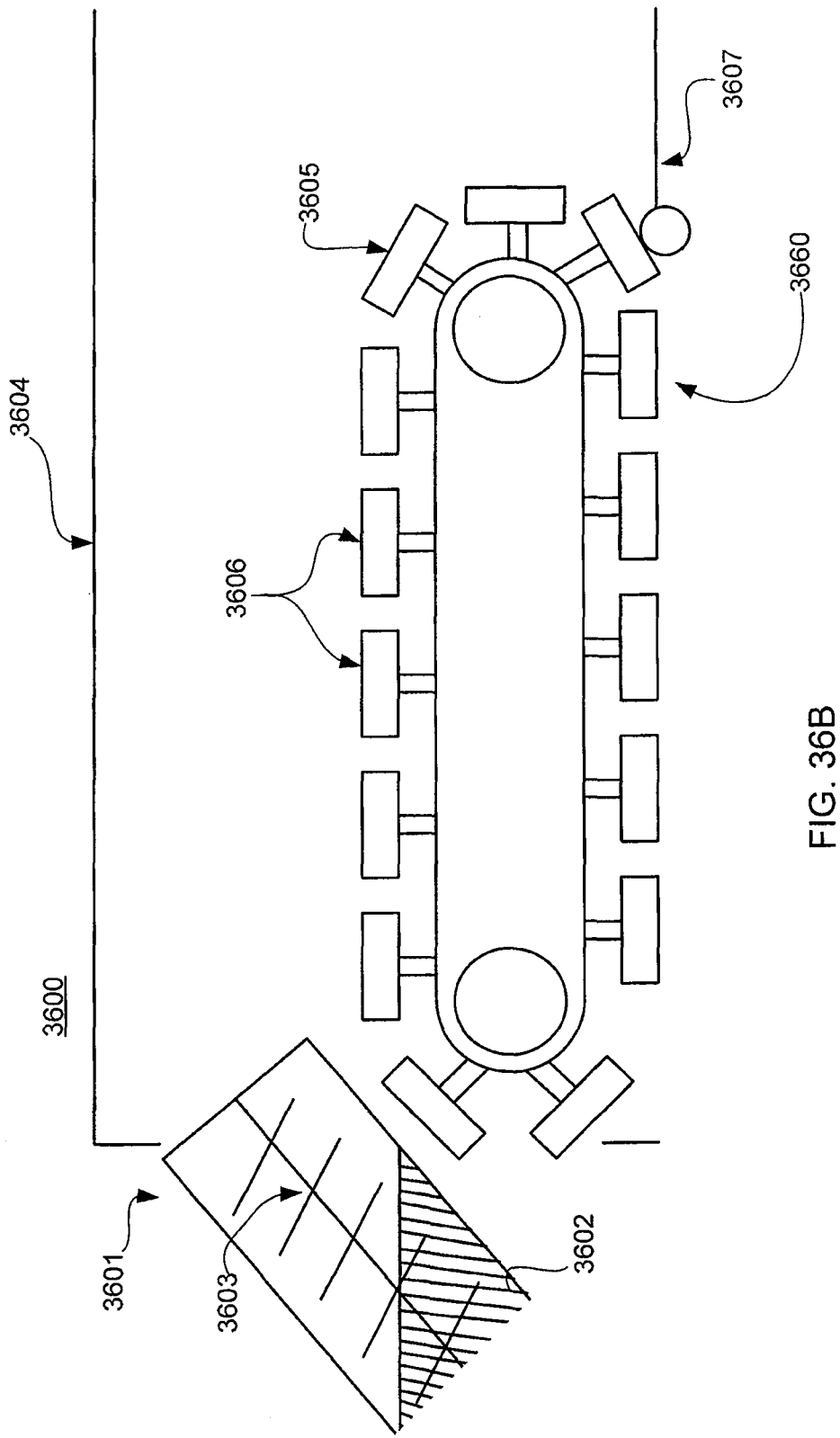
FIG. 36B illustrates a cross section of a cooking device according to an embodiment of the present invention.
Figure 36C:
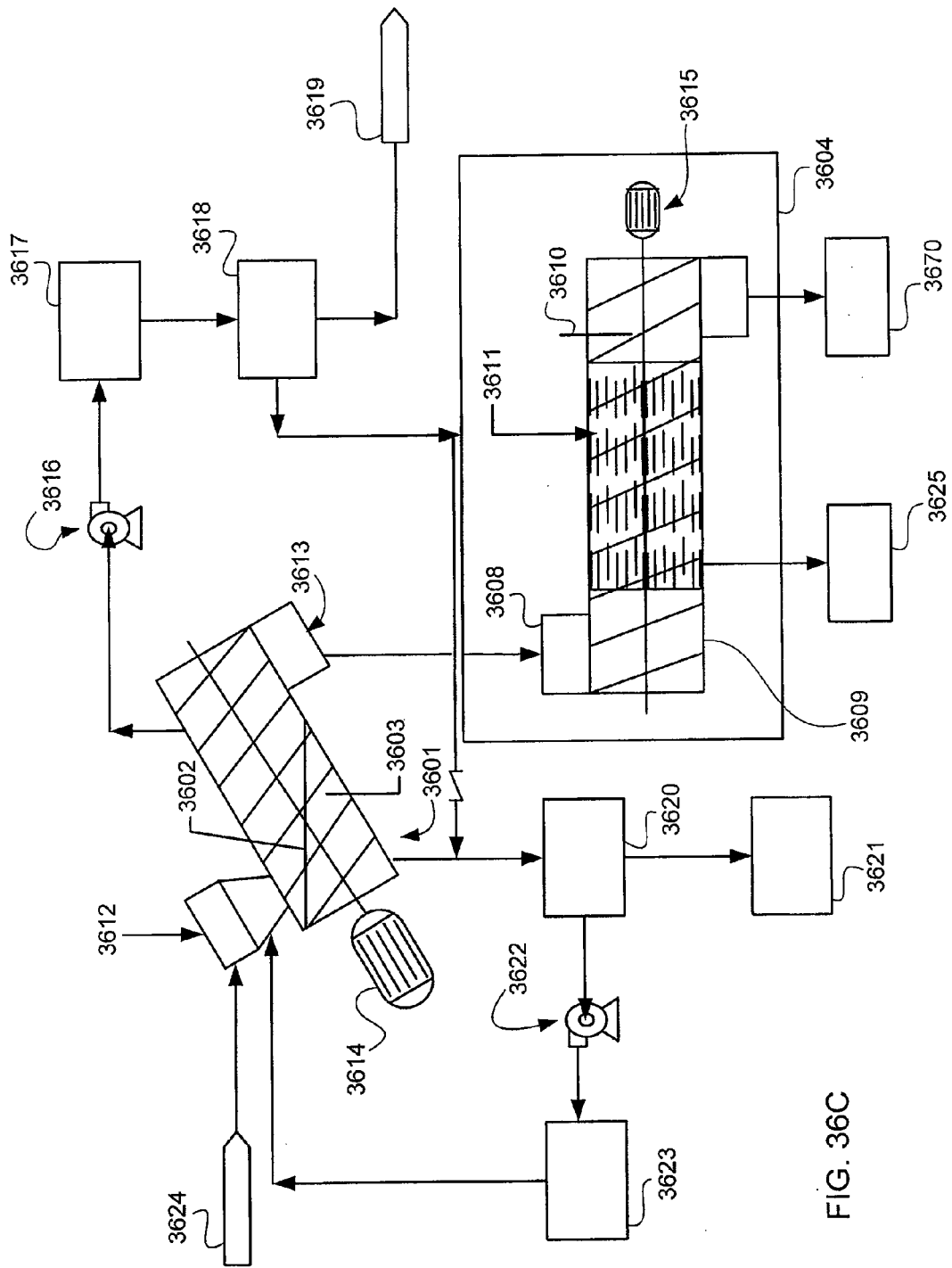
FIG. 36C illustrates a cross-section of a cooking device in accordance with a further embodiment of the present invention.
Figure 37A:
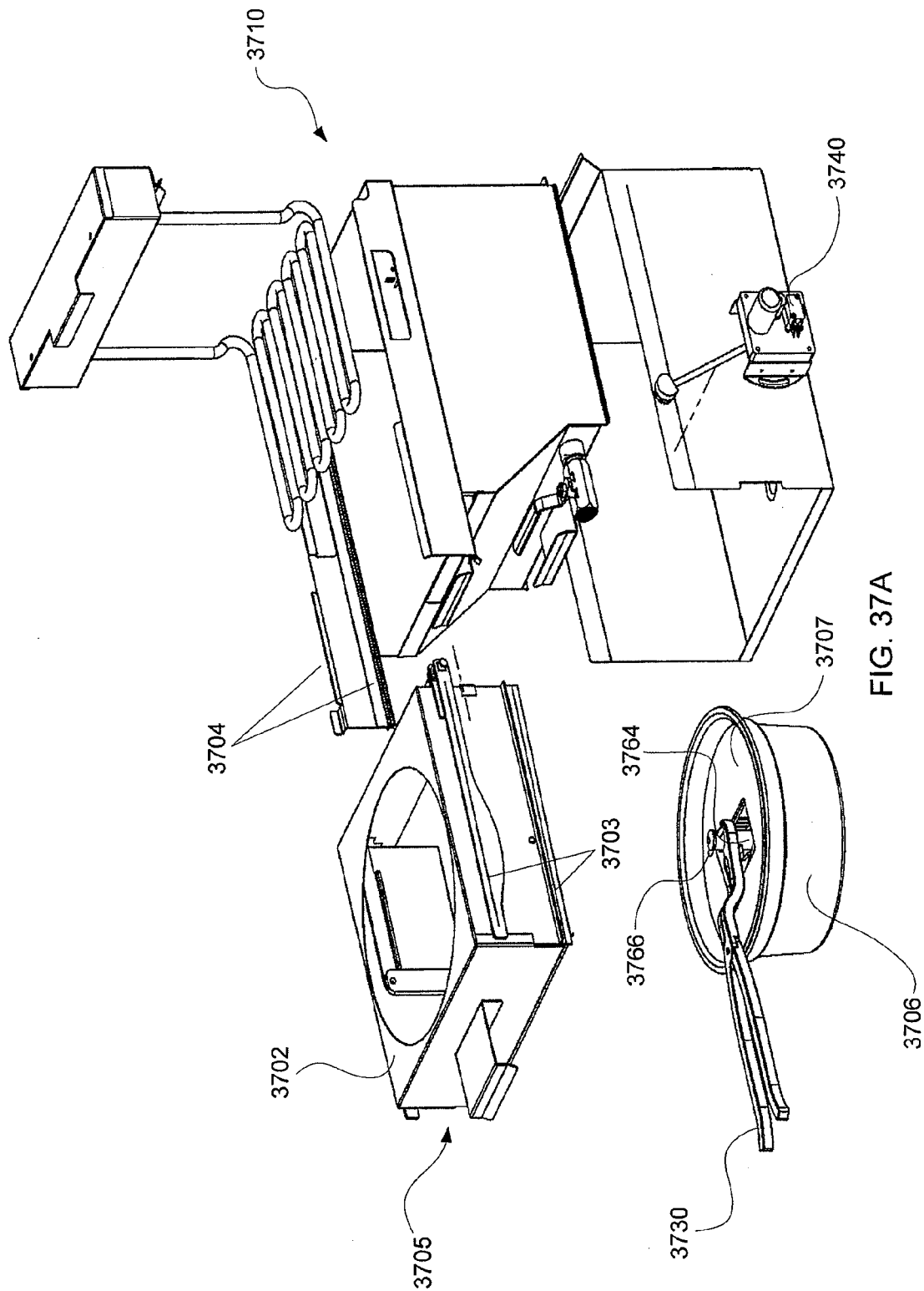
FIG. 37A illustrates an exploded, perspective view of a cooking device with a slidable drawer according to an embodiment of the present invention.
Figure 37B:
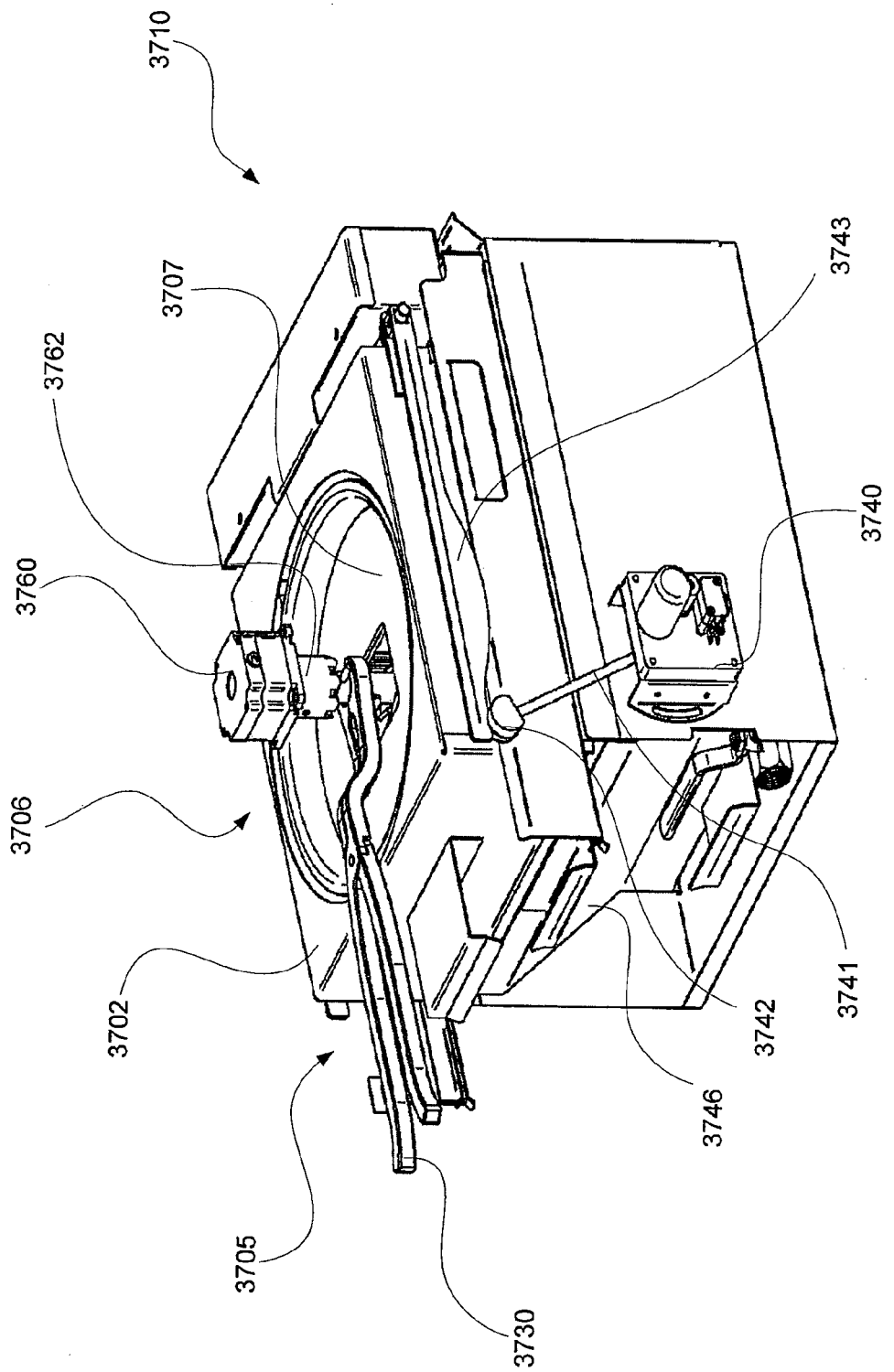
FIG. 37B illustrates a perspective view of the cooking device of FIG. 37A.
Figure 37D:
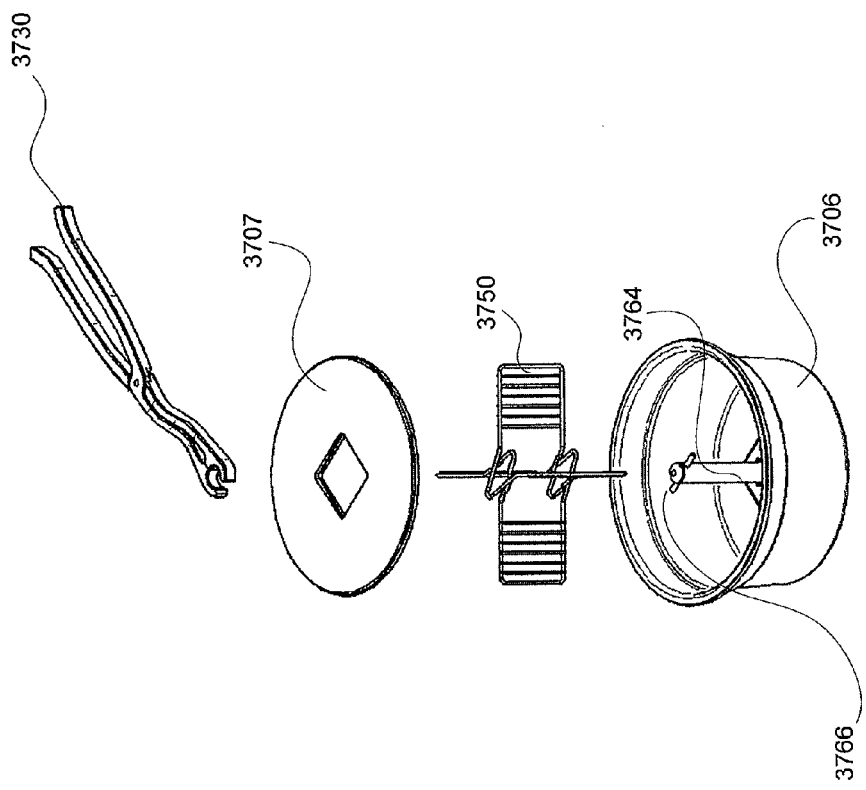
FIG. 37D illustrates an exploded, perspective view of a rotatable basket with a distribution mechanism according to an embodiment of the present invention.

For example, with reference to FIGS. 36B and 36C, exemplary embodiments of the present invention are illustrated. In these embodiments, fryer section 3650 comprises a vessel 3601 containing heated frying oil 3602. Preferably vessel 3601 is cylindrical in shape, though numerous alternative shapes (e.g., rectangular, ovoid, etc.) may likewise be employed. In the presently described embodiment, vessel 3601 contains a mechanism for moving and/or agitating food therein, such as a transport auger 3603. For example, transport auger 3603 suitably is configured as a screw type mechanism, driven by a motor 3614, which as it rotates relative to vessel 3601, causes food to be moved axially along vessel 1001. Additionally, in various embodiments, by timing rotation of auger 3603, the length of time food remains in oil 3601 can be controlled. Alternatively, those skilled in the art will appreciate that other mechanisms for agitation and/or removal of food from vessel 3601 likewise may fall within the scope of the present invention.

With continued reference to FIGS. 36B and 36C, food enters vessel 3601 through an entry opening 3612 and is fried while being transported by auger 3603. When food reaches a distal end of vessel 3601, food may be deposited from vessel 3601 into the conveyer/oil removal section 3660. Such removal may be assisted mechanically or otherwise simply occur based on a "gravity feed" arrangement. For example, through a discharge chute 3613. As described in more detail below in connection with personal use type fryers, oil temperature, time of cooking and other factors are suitably determined depending on the particular application involved, but generally include conventional parameters used in frying devices.

With reference to FIG. 36B, vessel 3601 is suitably in communication with a housing 3604 which encloses a conveyor system 3605 and a mechanism for the removal of oil. As described in more detail below, among other features, housing 3604 suitably maintains food that has been fried at elevated temperatures and with appropriate moisture levels (e.g., through thermal and moisture insulation) in order to aid in the oil removal process.

In the exemplary embodiment of FIG. 36B, after leaving vessel 3601, food is deposited into any of numerous individual baskets 3606 or similar vessels located on conveyor system 3605. As described below, baskets 3606 are configured to spin so that oil is removed (thrown off) the fried food. Conveyor system 3605 transports baskets 3606 though housing 3604 from vessel 3601 along an upper portion of conveyor system 3605 to freezing/packaging section 3670, where the food is deposited either directly into the freezer/packaging section 3670, or alternatively, onto another conveyor system 3607 which transports the food to the freezer/packaging section 3670. After depositing the food, baskets 3606 are returned to vessel 3601 along a lower portion of conveyor system 3605 to retrieve more fried food.

In embodiments such as those of FIG. 36B, and as also described below in the context of individual frying devices, baskets 3606 are suitably configured to rotate at speeds sufficient to remove oil from the food. In accordance with various embodiments of the invention, spinning of baskets 3606 removes excess oil from the surface of the fried food at an elevated temperature. In such an embodiment, basket 3606 may be a food spinner wherein the fried food is spun to remove the excess oil. In various embodiments, as the oil is removed from the food, the removed oil returns to fryer section 3650 for further use in frying, for removal from frying device 3600 and/or for filtering in order to reclaim the used oil.

With reference now to FIG. 36C, in an alternative embodiment of the present invention, after leaving vessel 3601, food is deposited into a hopper 3608 or similar mechanism for collection and direction of fried food from fryer section 3650 to conveyor/oil removal section 3660. From hopper 3608, the fried food enters a horizontal decanting centrifuge 3609 for oil removal.

Centrifuge 3609 is suitably configured with a high speed auger 3610, typically driven by a motor 3615, which rotates and agitates the fried food, as well as translates the food laterally (similar to the above described conveyor system) to packaging/freezer section 3670. Surrounding auger 3610 is a screen mechanism 3611 configured to rotate (generally slower) than auger 3610, and in the opposite direction, as well as to maintain the fried food within a volume surrounding auger 3610, and additionally to allow the passage of oil through the screen 3611 and away from the fried food as the auger 3610 spins the food therein. In accordance with various embodiments, oil passing through screen may be collected by an oil discharge mechanism/collector 3625, and optionally filtered to remove water, solids and other contaminants, and then re-circulated to vessel 3601

In embodiments such as those of FIGS. 36B and 36C, and as described below in the context of individual frying devices, baskets 3606 and centrifuges 3609 are suitably configured to rotate at speeds sufficient to remove oil from the food. These embodiments (and others which use spinning to remove oil) are described in the context of "baskets" hereinbelow.

The spinning of baskets removes excess oil from the surface of the fried food at an elevated temperature. In such an embodiment, the basket may be a food spinner wherein the fried food is spun to remove the excess oil. In such embodiments, the basket may be considered a centrifugal oil removal device, because the rotation of the basket aids in removing oil from the fried food.

Thus, in a commercial conveyor embodiment, after food has been cooked in fryer section 3650, food is moved to basket 3606 and is spun to remove excess oil from the cooked food. In various embodiments, as the oil is removed from the food, the removed oil returns to fryer section 3650 for further use in frying, for removal from frying device 3600 and/or for filtering in order to reclaim the used oil.

Additionally, in various embodiments, a controller may regulate, among other aspects, the amount of time for frying the food, the movement of the conveyor, the amount of time for removing oil from the food, and the movement of baskets in the frying section and/or oil removal section, movement of fried foods from one section to another, any of the baskets' rotational speeds, and the freezing and packaging of the fried foods, all according to input from a user.

The user may also define other operating parameters that are carried out by the controller. For example, while the food is being cooked in the oil, the food may be agitated in order to prevent the food items that are cooking from sticking together. When the food has been cooked for a specified time, the controller directs the motor to automatically move the fried food to a conveyor system to the oil removal section where the fried food/basket is rotated for a specified time at a predetermined speed in order to reduce the oil content of the food by spinning the oil out through centrifugal forces.

In various embodiments, during the frying and oil removal processes, various additional covers may be provided in order to prevent heat and moisture loss from the device and/or help contain the oil within the apparatus.

As noted above, the conveyor system and oil removal section are suitably maintained at an elevated temperature to aid in reducing cooling of the food during transport and oil removal. For example, a heating element may be used in these sections. Thus, embodiments of the present invention allow the food to be cooked in a more desirable manner without cooling off such that the taste, texture and desirability of the food are not adversely effected.

In the various embodiments of the present invention, one or more motors are employed to control operation of the frying device and the systems therein. For example, in certain embodiments, one motor controls the movement of the food/basket in the frying section (when applicable), another motor controls the conveyor system, and another motor controls the spinning of the basket (or horizontal decanting centrifuge). In various embodiments, the frying device has various lids and doors which are closed during operation until the frying, conveying and spinning processes are complete.

In addition to the aspects described above, in accordance with various additional and/or optional aspects of the present invention, various components my be incorporated into the frying device to change and improve performance.

For example, with reference to FIG. 36C, vessel 3601 is suitably hermetically sealed, but configured with various operable mechanisms to vent or introduce gases. For example, a blanket of inert gas 3624, such as nitrogen may be introduced into the system, for example, at entry chute 3612. An inert gas blanket suitably aids in maintaining heat and moisture of the food as it goes into and through the centrifuge. Additionally, blanketing may reduce the risk of fire, improves operational efficiency, reduces emissions and lowers the costs of product loss, and, because moist air is kept out, tank corrosion is reduced.

Embodiments of the present invention may also vent gases from vessel 3601, for example, by a venting line operated by a vacuum pump 3616. In various embodiments, gases moved by pump 3616 may first be passed through one or more filters such as a cooled coalescing filter 3617, prior to venting to atmosphere. In such embodiments, the cooled coalescing filter 3617 captures oil and water, while allowing gases to pass. The oil/water mixture can then be passed to an oil water separator mechanism 3618 which separates oil and water, discharging the water through a discharge pipe 3619.

The separated oil can then be reintroduced into the system by sending the oil to an oil solid separator 3620, where remaining solids in the captured oil are removed and discharged 3621. The now clean oil can be returned to vessel 3601 for re-use. In this regard, oil can be pumped by and oil recirculation pump 3622 directly to vessel 3601, or first heated by an oil heater 3623, prior to re-introduction to vessel 3601.

Various embodiments of the invention allow different combinations of motors to produce the movement of individual and/or multiple fryer devices and/or oil removal devices and food transport mechanisms in accordance with the conveyor system discussed above.

Various principles of the present invention have been described in embodiments. However, many combinations and modifications of the above-described structures, arrangements, proportions, elements, materials, and components, used in the practice of the invention, in addition to those not specifically described, can be varied without departing from those principles. Various embodiments have been described as comprising automatic processes, but these process may be performed manually without departing from the scope of the present invention. Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

What is claimed is:

1. A cooking device, comprising:
   a cooking section configured to maintain a cooking liquid for cooking a food;
   a liquid removal section configured to at least partially remove the cooking liquid from the food;
   a centrifugal liquid removal device which rotates on an axis, the centrifugal liquid removal device locatable within the liquid removal section and configured to hold and spin the food to remove at least a portion of the cooking liquid;
   a transport mechanism configured to move the centrifugal liquid removal device from the cooking section to the liquid removal section;
   a slidable drawer for moving the centrifugal liquid removal device into and out of a housing; and
   a frame disposed within the slidable drawer, wherein the frame houses the centrifugal liquid removal device.

2. The cooking device of claim 1, wherein the transport mechanism further comprises a translational motor to move the centrifugal liquid removal device from the cooking section to the liquid removal section when the slidable drawer positions the centrifugal liquid removal device in the housing.

3. The cooking device of claim 1, further comprising a hinged door that is in a closed position when the centrifugal liquid removal device is in the housing, wherein the hinged door is in an open position when the centrifugal liquid removal device is out of the housing.

4. The cooking device of claim 1, further comprising a spin motor coupled to a drive shaft in the centrifugal liquid removal device for spinning the centrifugal liquid removal device.

5. The cooking device of claim 4, further comprising a spin motor gear coupled to the spin motor for spinning the drive shaft via a drive shaft key, wherein the drive shaft key couples to the spin motor gear via electromagnetic coupling.

6. The cooking device of claim 1, further comprising a drawer motor for automatically moving the slidable drawer into and out of the housing.

7. The cooking device of claim 1, further comprising a cover disposed on the centrifugal liquid removal device.

8. The cooking device of claim 1, further comprising a food distribution mechanism for distributing the food when the centrifugal liquid removal device is in the spinning section.

9. The cooking device of claim 4, wherein the drive shaft is configured to facilitate removal of the centrifugal liquid removal device using a basket removal tool.

10. The cooking device of claim 1, further comprising a vibration motor that induces sonic vibration in the cooking device to prevent sticking of the food in the centrifugal liquid removal device.

11. The cooking device of claim 1, wherein the slidable drawer comprises a cam surface.

12. The cooking device of claim 11, further comprising an arm coupled to a cam, wherein the cam slides along the cam surface to facilitate raising and lowering the slidable drawer when the slidable drawer moves into and out of the housing.

* * * * *